United States Patent
Kitazato et al.

(10) Patent No.: US 10,321,183 B2
(45) Date of Patent: Jun. 11, 2019

(54) RECEPTION APPARATUS, RECEPTION METHOD, TRANSMISSION APPARATUS, AND TRANSMISSION METHOD FOR CONTROLLING USE OF BROADCAST RESOURCE REQUESTED BY APPLICATION

(71) Applicant: SONY CORPORATION, Tokyo (JP)

(72) Inventors: Naohisa Kitazato, Tokyo (JP); Yoshiharu Dewa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 60 days.

(21) Appl. No.: 15/310,326

(22) PCT Filed: May 8, 2015

(86) PCT No.: PCT/JP2015/063268
§ 371 (c)(1),
(2) Date: Nov. 10, 2016

(87) PCT Pub. No.: WO2015/178218
PCT Pub. Date: Nov. 26, 2015

(65) Prior Publication Data
US 2017/0142474 A1    May 18, 2017

(30) Foreign Application Priority Data
May 22, 2014  (JP) ................. 2014-106129

(51) Int. Cl.
*H04N 7/173*    (2011.01)
*H04N 21/438*    (2011.01)
(Continued)

(52) U.S. Cl.
CPC ......... *H04N 21/438* (2013.01); *H04N 21/235* (2013.01); *H04N 21/2362* (2013.01);
(Continued)

(58) Field of Classification Search
CPC ..................................... H04N 21/262
See application file for complete search history.

(56) References Cited

U.S. PATENT DOCUMENTS

| 2008/0163323 A1* | 7/2008 | Lee ................. H04H 20/91 725/115 |
| 2012/0082266 A1* | 4/2012 | Kitazato .......... H04N 21/23614 375/316 |

(Continued)

FOREIGN PATENT DOCUMENTS

| JP | 2011-066556 A | 3/2011 |
| JP | 2013-150089 | 8/2013 |

(Continued)

OTHER PUBLICATIONS

Extended European Search Report dated Nov. 24, 2017 in corresponding European Patent Application No. 15795422.3, 11 pages.

(Continued)

*Primary Examiner* — Gigi L Dubasky
(74) *Attorney, Agent, or Firm* — Oblon, McClelland, Maier & Neustadt, L.L.P.

(57) ABSTRACT

[Object] The present technology relates to a reception apparatus, a reception method, a transmission apparatus, and a transmission method capable of limiting use of broadcast resources by a predetermined application. [Solving Means] There is provided a reception apparatus including: a control information obtaining unit that obtains first control information for controlling an operation of a first application, the first application being capable of requesting use of a broadcast resource transmitted via a digital broadcasting signal; and an application controller that controls, when the first application requests use of the broadcast resource, the use of the broadcast resource by the first application on the basis of the first control information.

20 Claims, 33 Drawing Sheets

(51) Int. Cl.
- *H04N 21/235* (2011.01)
- *H04N 21/435* (2011.01)
- *H04N 21/2362* (2011.01)
- *H04N 21/434* (2011.01)
- *H04N 21/4722* (2011.01)
- *H04N 21/4782* (2011.01)
- *H04N 21/61* (2011.01)
- *H04N 21/8545* (2011.01)
- *H04N 21/858* (2011.01)

(52) U.S. Cl.
CPC ....... *H04N 21/435* (2013.01); *H04N 21/4345* (2013.01); *H04N 21/4349* (2013.01); *H04N 21/4722* (2013.01); *H04N 21/4782* (2013.01); *H04N 21/6112* (2013.01); *H04N 21/6125* (2013.01); *H04N 21/8545* (2013.01); *H04N 21/8586* (2013.01)

(56) References Cited

U.S. PATENT DOCUMENTS

| | | | | |
|---|---|---|---|---|
| 2013/0282752 | A1* | 10/2013 | Day-Richter | G06F 21/62 707/769 |
| 2014/0214967 | A1* | 7/2014 | Baba | H04N 7/173 709/205 |
| 2014/0237531 | A1* | 8/2014 | Kitahara | H04H 60/14 725/110 |

FOREIGN PATENT DOCUMENTS

| | | |
|---|---|---|
| JP | 2014-64308 | 4/2014 |
| JP | 2014-064308 A | 4/2014 |
| WO | WO 2013/080450 A1 | 6/2013 |
| WO | 2013-179570 A1 | 12/2013 |
| WO | WO 2013/179570 A1 | 12/2013 |
| WO | WO 2014/030284 A1 | 2/2014 |
| WO | 2014-045893 A1 | 3/2014 |
| WO | WO 2014/045893 A1 | 3/2014 |

OTHER PUBLICATIONS

Anonymous: "umask-Wikipedia", Dec. 24, 2013, XP055426191, Retrieved from the Internet: URL:https://en.wikipedia.org/w/index.php?title=Umask&oldid=587515710, pp. 1-8.

Etsi: "Hybrid Broadcast Broadband TV", ETSI TS 102 796, v1.1.1, Jun. 1, 2010, XP055148388, pp. 1-75.

Japanese Office Action dated Dec. 27, 2018 in JP application No. 2016-521030 (no English translation), 4 pages.

Japanese Office Action dated Mar. 7, 2019 in Application No. 2016-521030 with English translation, 8 pages.

* cited by examiner

```
<tpt id= "abc.tv/300"  tptVersion= "1" >
    <Application appID= "1"  globalID=abc.tv/100>
        <URL entry= "true" >http://abc.com/app1</URL>
        <Event eventID= "1"  action= "prep" />
        <Event eventID= "2"  action= "exec" />
        <Event eventID= "3"  action= "susp" />
        <Event eventID= "4"  action= "kill" />
    </Application>
    <Application appID= "2" globalID=abc.tv/101>
        <URL entry= "true" >http://abc.com/app2</URL>
        <Event eventID= "11" action= "exec" />
        <Event eventID= "12" action= "kill" />
    </Application>
</tpt>
```

FIG.5

| Element/Attribute(with @) | Cardinality | Data Type | Description and Value |
|---|---|---|---|
| TPT | | | |
| @majorProtocolVersion | 0..1 | integer 0..15 | Major Protocol Version, default="1" |
| @minorProtocolVersion | 0..1 | integer 0..15 | Minor Protocol Version, default="0" |
| @id | 1 | anyURI | segment_id=domain_name/program_id |
| @tptVersion | 1 | unsignedByte | Data Version of this TPT |
| @expireDate | 0..1 | dateTime | Date after which this TPT will not be used |
| @updatingTime | 0..1 | unsignedShort | Time interval to check for TPT updates |
| @serviceID | 0..1 | unsignedShort | NRT service_id |
| @baseURL | 0..1 | anyURI | Base URL for all relative URLs in TPT |
| Capabilities | 0..1 | nrt:CapabilitiesType | Essential capabilities for the segment associated with this TPT |
| LiveTrigger | 0..1 | | Info on Internet live trigger delivery |
| @URL | 1 | anyURI | URL of server for live triggers |
| @pollPeriod | 0..1 | unsignedByte | Short polling period in seconds |
| Application | 1..N | | TDO(app) for the segment associated with this TPT |
| @appID | 1 | unsignedShort | Application ID of this app, unique within the scope of this TPT |
| @appType | 0..1 | integer 1..15 | Application type (default value = "app") |
| @appName | 0..1 | string | Display name (for viewer launch consent) |
| @globalID | 0..1 | anyURI | Globally Unique app ID |
| @appVersion | 0..1 | unsignedByte | Version of this app |
| @cookieSpace | 0..1 | unsignedByte | Persistent storage needed, default=0 |
| @frequencyOfUse | 0..1 | integer 0..15 | Code values per Table 7.3 |
| @expireDate | 0..1 | dateTime | Expire date for caching this app |
| @testApp | 0..1 | boolean | Flag for test app; default="false" |
| @availInternet | 0..1 | boolean | Default="true" |
| @availBroadcast | 0..1 | boolean | Default="true" |
| URL | 1..N | anyURI | App URL(s) |
| @entry | 0..1 | boolean | Indicator of entry point; default="false" |
| Capabilities | 0..1 | nrt:CapabilitiesType | Essential capabilities to present this app |
| ApplicationBoundary | 0..1 | | Extension to app boundary |
| OriginURL | 1..N | anyURI | Origin to be added to app boundary |
| ContentItem | 0..N | | Content item used by this app |
| URL | 1..N | anyURI | URL(s) of content item |
| @entry | 0..1 | boolean | Indicator of entry point; default="false" |
| @updatesAvail | 0..1 | boolean | Default="false" |
| @pollPeriod | 0..1 | unsignedByte | Short polling period in seconds |
| @size | 0..1 | 24-bit integer | Size of content item in kilobytes |
| @availInternet | 0..1 | boolean | Default="true" |
| @availBroadcast | 0..1 | boolean | Default="true" |
| Event | 1..N | | Event targeted to this app |
| @eventID | 1 | unsignedShort | Unique identifier of this Event element within the scope of the app element |
| @action | 1 | string | Allowed values are "prep", "exec", "susp", and "kill" |
| @destination | 0..1 | unsignedByte | Device to which the event is directed (primary screen, second screen, or both) |
| @diffusion | 0..1 | unsignedByte | Period for applying diffusion, in seconds |
| Data | 1..N | base64Binary | Data to be used for this event |
| @dataID | 1 | unsignedShort | Unique identifier of this Data |

FIG.6

```
<tpt id= "abc.tv/300" tptVersion= "1" independent= "1" >
 <Application appID= "1" globalID=abc.tv/100 context= "app" >
  <URL entry= "true" >http://abc.com/app1</URL>
 </Application>
</tpt>
```

FIG.11

| Element /Attribute (with @) | Cardinality | Description & Value |
|---|---|---|
| tpt | | |
| @majorProtocolVersion | 0..1 | Major protocol version default="1" |
| @minorProtocolVersion | 0..1 | Minor protocol version default="1" |
| @id | 1 | Segment_id=domain_name/Program_id |
| @independent | 1 | "0":broadcast dependent "1" broadcast independent default "0" |
| @tptVersion | 1 | Data Version of this TPT |
| @expireDate | 0..1 | Expire date for caching TPT document.(only for type="static") |
| @baseURL | 0..1 | Base URL for all relative URLs in TPT |
| Capabilities | 0..1 | Essential capabilities for the segment associated with this TPT |
| Application | 1 | TDO(app) for the segment associated with this TPT |
| @appID | 1 | Application ID of this app unique within the scope of this TPT |
| @appType | 0..1 | Application type(default !="app") |
| @appName | 0..1 | Display name 8 for viewer launch consent |
| @globalId | 1 | Globally Unique Id |
| @appVersion | 0..1 | Version of this app |
| @cookieSpace | 0..1 | Persistent storage needed default=0 |
| @expireDate | 0..1 | Expire date for caching this app |
| @context | 0..1 | Context indication "app" , "broadcast" |
| URL | 1..M | App URL |
| @entry | 0..1 | Indicator of entry point default="false" |
| ApplicationBoundary | 0..1 | Extension to app boundary |
| OriginalURL | 1..M | Origin to be added to app boundary |
| ContentItem | 0..M | Content item used by this app |
| URL | 1..M | URL(s) of content item |
| @entry | 0..1 | Indicator of entry point default="false" |
| @size | 0..1 | Size of content item in kilobyte |

FIG.12

| Element /Attribute (with @) n | Cardinality | Description & Value |
|---|---|---|
| tpt | | |
| @majorProtocolVersion | 0..1 | Major protocol version default="1" |
| @minorProtocolVersion | 0..1 | Minor protocol version default="1" |
| @id | 1 | Segment.id=domain.name/Program.id |
| @independent | 1 | "0":broadcast dependent "1" broadcast independent default "0" |
| @tptVersion | 1 | Data Version of this TPT |
| @expireDate | 0..1 | Expire date for caching TPT document, (only for type= "static") |
| @baseURL | 0..1 | Base URL for all relative URLs in TPT |
| Capabilities | 0..1 | Essential capabilities for the segment associated with this TPT |
| Application | 1 | TDO (app) for the segment associated with this TPT |
| @appID | 1 | Application ID of this app unique within the scope of this TPT |
| @appType | 0..1 | Application type (default 1="app") |
| @appName | 0..1 | Display name & for viewer launch consent |
| @gidUaId | 1 | Globally Unique id |
| @appVersion | 0..1 | Version of this app |
| @cookieSpace | 0..1 | Persistent storage needed default=0 |
| @expireDate | 0..1 | Expire date for caching this app |
| @context | 0..1 | Context indication "app", "broadcast" |
| BroadcastPermission | 1..N | Broadcast Service |
| URL | 1..N | App URL |
| @entry | 0..1 | indicator of entry point default="false" |
| ApplicationBoundary | 0..1 | Extension to app boundary |
| OriginalURL | 1..N | Origin to be added to app boundary |
| ContentItem | 0..N | Content item used by this app |
| URL | 1..N | URL(s) of content item |
| @entry | 0..1 | Indicator of entry point default="false" |
| @size | 0..1 | Size of content item in kilobyte |
| Signature | 0..1 | XML_signature |

FIG.17

BroadcastPermission element

| Element/Attribute | Cardinality | Description &Value |
|---|---|---|
| BroadcastPermission | 1..N | |
| @RFChannelId | 0..1 | RF channel ID |
| @BBPStreamId | 0..1 | BBP stream ID |
| @ServiceId | 0..1 | Service ID |
| Permission | 1 | Permission bitmap |

FIG.18

RECEPTION APPARATUS, RECEPTION METHOD, TRANSMISSION APPARATUS, AND TRANSMISSION METHOD FOR CONTROLLING USE OF BROADCAST RESOURCE REQUESTED BY APPLICATION

CROSS REFERENCE TO RELATED APPLICATIONS

This application is a U.S. National Phase of International Patent Application No. PCT/JP2015/063268 filed on May 8, 2015, which claims priority benefit of Japanese Patent Application No. JP 2014-106129 filed in the Japan Patent Office on May 22, 2014. Each of the above-referenced applications is hereby incorporated herein by reference in its entirety.

TECHNICAL FIELD

The present technology relates to a reception apparatus, a reception method, a transmission apparatus, and a transmission method and more particularly to a reception apparatus, a reception method, a transmission apparatus, and a transmission method capable of limiting use of broadcast resources by a predetermined application.

BACKGROUND ART

In recent years, there are provided receiver apparatuses capable of not only receiving AV content transmitted via digital broadcasting signals but also receiving applications and VOD (Video On Demand) content distributed via the Internet (for example, see Patent Document 1).

Patent Document 1: Japanese Patent Application Laid-open No. 2011-66556号

SUMMARY

Problem to be Solved

Meanwhile, according to an envisaged operation of this type of receiver apparatus, when an application obtained in an environment, which is different from a broadcast service in which a broadcasting station provides apps via broadcast waves, such as distribution via the Internet, for example, is going to use broadcast resources such as AV content, use of broadcast resources by a predetermined application may be limited. However, such a technological system for limiting use of broadcast resources by a predetermined application is not established.

The present technology has been made in view of the above-mentioned circumstances, and it is desirable to limit use of broadcast resources by a predetermined application.

Means for Solving the Problem

According to a first aspect of the present technology, a reception apparatus includes: a reception unit that receives a digital broadcasting signal; an application obtaining unit that obtains a first application, the first application being capable of requesting use of a broadcast resource transmitted via the digital broadcasting signal; a control information obtaining unit that obtains first control information for controlling an operation of the first application; and an application controller that controls, when the first application requests use of the broadcast resource, the use of the broadcast resource by the first application on the basis of the first control information.

The control information obtaining unit may further obtain second control information for controlling an operation of a second application, the second application being activated in a broadcast service, and the application controller may limit the use of the broadcast resource by the first application when continuation of the operation using the broadcast resource by the first application is not permitted on the basis of a result of checking the first control information against the second control information.

The application controller may continue the operation of the first application and does not display the broadcast resource when the continuation of the operation using the broadcast resource by the first application is not permitted.

The application controller may terminate the operation of the first application and displays the broadcast resource in a normal status when the continuation of the operation using the broadcast resource by the first application is not permitted.

The application controller may continue the operation of the first application when the continuation of the operation using the broadcast resource by the first application is permitted, the first application being operated as the second application.

The reception apparatus may further include a trigger information obtaining unit that obtains trigger information for controlling the operation of the second application, in which the control information obtaining unit may obtain the second control information on the basis of the trigger information.

The application controller may limit the use of the broadcast resource by the first application when the first application has no authority to access the broadcast resource on the basis of broadcast permission information indicating authority to access each broadcast service, the first control information including the broadcast permission information.

The application controller may continue the operation of the first application and may not display the broadcast resource when the first application has no authority to access the broadcast resource.

The application controller may terminate the operation of the first application and displays the broadcast resource in a normal status when the first application has no authority to access the broadcast resource.

The application obtaining unit may obtain the first application when signature information is verified by using a predetermined certificate, the first control information including the signature information.

The broadcast permission information may be specified for each broadcast service in a bitmap format.

According to the first aspect of the present technology, the reception apparatus may be an independent apparatus or may be an internal block configuring a single apparatus.

A reception method according to the above-mentioned first aspect of the present technology is a reception method corresponding to the reception apparatus according to the first aspect of the present technology.

In the reception apparatus according to the first aspect of the present technology and a reception method, the reception apparatus receives a digital broadcasting signal; obtains a first application, the first application being capable of requesting use of a broadcast resource transmitted via the digital broadcasting signal; obtains first control information for controlling an operation of the first application; and controls the use of the broadcast resource by the first application on the basis of the first control information when the first application requests use of the broadcast resource.

According to a second aspect of the present technology, a transmission apparatus includes: a control information generator that generates first control information for controlling an operation of a first application, the first application being capable of requesting use of a broadcast resource transmitted via a digital broadcasting signal, the first control information being used when the broadcast resource is used by the first application; and a transmission unit that transmits the first control information via a network in response to a request from a receiver apparatus.

The first control information may be used for checking against second control information for controlling an operation of a second application when the broadcast resource is used by the first application, the second application being activated in a broadcast service.

The first control information may include information indicating, when continuation of the operation using the broadcast resource by the first application is not permitted, to continue the operation of the first application and not to display the broadcast resource or to terminate the operation of the first application and display the broadcast resource in a normal status.

The first control information may include broadcast permission information indicating authority to access each broadcast service.

The first control information may include information indicating, when the first application has no authority to access the broadcast resource, to continue the operation of the first application and not to display the broadcast resource or to terminate the operation of the first application and display the broadcast resource in a normal status.

The first control information may include signature information, the signature information being used for verification using a predetermined certificate when obtaining the first application.

The broadcast permission information may be specified for each broadcast service in a bitmap format.

According to the second aspect of the present technology, the transmission apparatus may be an independent apparatus or may be an internal block configuring a single apparatus.

A transmission method according to the above-mentioned second aspect of the present technology is a transmission method corresponding to the transmission apparatus according to the second aspect of the present technology.

In the transmission apparatus according to the second aspect of the present technology and a transmission method, the transmission apparatus generates first control information for controlling an operation of a first application, the first application being capable of requesting use of a broadcast resource transmitted via a digital broadcasting signal, the first control information being used when the broadcast resource is used by the first application; and transmits the first control information via a network in response to a request from a receiver apparatus.

Effects

According to the first aspect and the second aspect of the present technology, it is possible to limit use of broadcast resources by a predetermined application.

It should be noted that the effect described here is not necessarily limitative and may be any effect described in the present disclosure.

BRIEF DESCRIPTION OF DRAWINGS

FIG. 5 A diagram showing a description example of the TPT for broadcast related app.

FIG. 6 A diagram showing an example of a TPT syntax for the broadcast related app.

FIG. 11 A diagram showing a description example of the TPT for broadcast independent app.

FIG. 12 A diagram showing an example of a TPT syntax for the broadcast independent app.

FIG. 17 A diagram showing an example of a TPT syntax for the broadcast independent app.

FIG. 18 A diagram showing the content of BroadcastPermission element in detail.

DESCRIPTION OF PREFERRED EMBODIMENTS

Hereinafter, embodiments of the present technology will be described with reference to the drawings. Note that descriptions will be made in the following order.
1. Broadcast Related Application
2. Broadcast Independent Application
(1) First Embodiment
(2) Second Embodiment
3. System Configuration
4. Flows of Processing Executed by Apparatuses
5. Modification Example
6. Configuration of Computer
 <1. Broadcast Related Application>
Broadcast Related Application is an application activated in a broadcast service that a broadcasting station provides via broadcast waves. Herein, the broadcast related application executed by a receiver apparatus capable of receiving digital broadcasting signals will be described.

Note that the broadcast related application contains, for example, HTML (HyperText Markup Language) files and the like. In the following description, the broadcast related application will be referred to as "broadcast related app". Further, Broadcast Related Application will be sometimes abbreviated to "Broadcast Related App".

Figure 1:
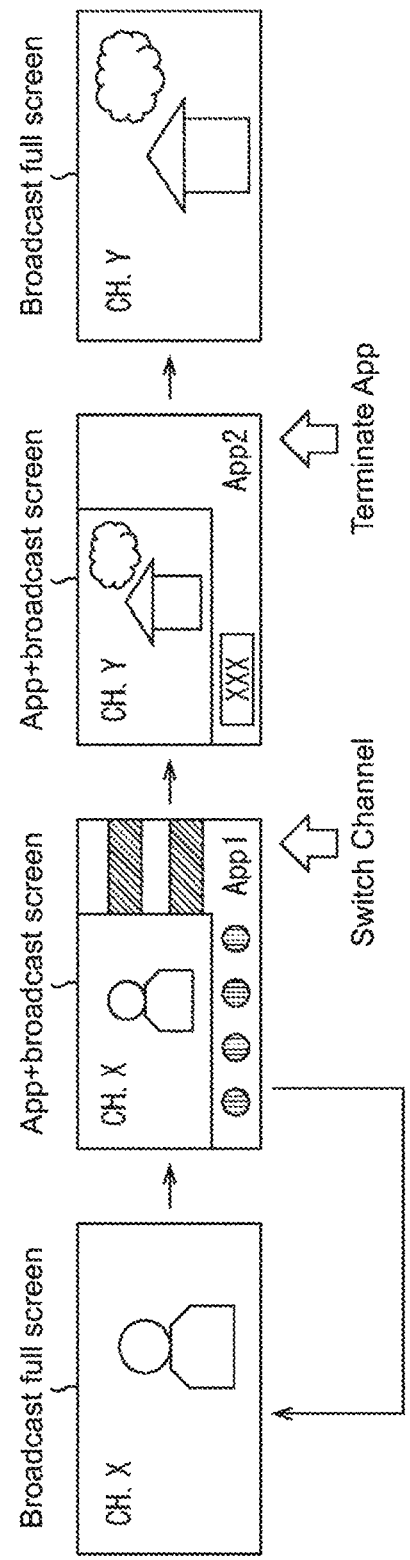
FIG. 1 A diagram showing transition of the screen of the broadcast related app.

(Transition of the Screen of the Broadcast Related App)
FIG. 1 is a diagram showing transition of the screen of the broadcast related app.

In FIG. 1, a screen on which only AV (Audio Video) content such as a broadcast program is reproduced will be referred to as "broadcast full screen". A screen on which AV content is reproduced and the broadcast related app is executed at the same time will be referred to as "app+broadcast screen". Note that the same names of the screens are applied to the other diagrams to be described later.

When the receiver apparatus is powered on, the receiver apparatus displays the image of the broadcast program of the channel X on the "broadcast full screen". Further, when the broadcast related app App1 for the broadcast program of the channel X is activated while the receiver apparatus displays the image of the broadcast program of the channel X on the "broadcast full screen", the screen makes a transition from the "broadcast full screen" to the "app+broadcast screen". The "app+broadcast screen" is an L-style screen, in which the image of the broadcast program of the channel X is zoomed out and information on the broadcast related app App1 is displayed on the margin. In other words, the image of the broadcast program of the channel X is displayed on the sub-screen.

Note that when the broadcast related app App1 is terminated while the "app+broadcast screen" is displayed, the screen makes a transition from the "app+broadcast screen" to the "broadcast full screen". The image of the broadcast program of the channel X displayed on the sub-screen is returned to the normal size.

Here, when a user switches the channel from X to Y while the "app+broadcast screen" is displayed, the image displayed on the sub-screen of the "app+broadcast screen" is switched from the image of the broadcast program of the channel X to the image of the broadcast program of the channel Y. Further, the receiver apparatus terminates the broadcast related app App1 for the broadcast program of the channel X, and activates the broadcast related app App2 for the broadcast program of the channel Y. As a result, the "app+broadcast screen" is an L-style screen, in which the image of the broadcast program of the channel Y is zoomed out and information on the broadcast related app App2 is displayed on the margin.

After that, when a user instructs to terminate the broadcast related app App2, the broadcast related app App2 is terminated, the screen makes a transition from the "app+broadcast screen" to the "broadcast full screen". The image of the broadcast program of the channel Y displayed on the sub-screen is returned to the normal size and displayed.

Figure 2:
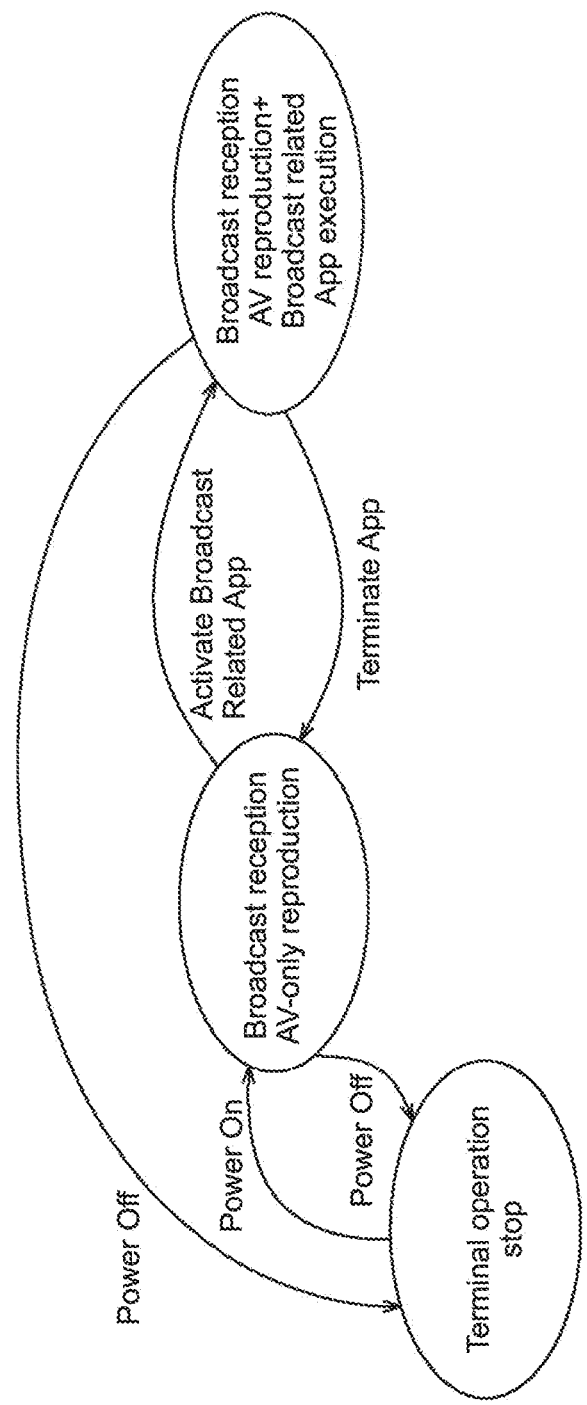
FIG. 2 A diagram showing the status transition of the receiver apparatus that executes the broadcast related app.

(Status Transition of Receiver Apparatus)
FIG. 2 is a diagram showing the status transition of the receiver apparatus that executes the broadcast related app. As shown in FIG. 2, it is defined that the receiver apparatus makes a transition to the "terminal operation stop" status, the "broadcast reception (AV-only reproduction)" status, or the "broadcast reception (AV reproduction+broadcast related app execution)" status.

The "terminal operation stop" status means that the receiver apparatus is powered off. The "broadcast reception (AV-only reproduction)" status means that only AV content such as a broadcast program is reproduced. The receiver apparatus, which has made a transition to this status, displays the "broadcast full screen" (FIG. 1). The "broadcast reception (AV reproduction+broadcast related app execution)" status means that AV content such as a broadcast program is reproduced and the broadcast related app is executed at the same time. The receiver apparatus, which has made a transition to this status, displays the "app+broadcast screen" (FIG. 1).

When the receiver apparatus has made a transition to the "terminal operation stop" status and is powered on, the status makes a transition to the "broadcast reception (AV-only reproduction)" status. Further, when the receiver apparatus has made a transition to the "broadcast reception (AV-only reproduction)" status and the broadcast related app is activated, the status makes a transition to the "broadcast reception (AV reproduction+broadcast related app execution)" status. Note that, when the receiver apparatus has made a transition to the "broadcast reception (AV-only reproduction)" status and is powered off, the status makes a transition to the "terminal operation stop" status.

When the receiver apparatus has made a transition to the "broadcast reception (AV reproduction+broadcast related app execution)" status and execution of the broadcast related app is terminated, the status makes a transition to the "broadcast reception (AV-only reproduction)" status. Note that, when the receiver apparatus has made a transition to the "broadcast reception (AV reproduction+broadcast related app execution)" status and is powered off, the status makes a transition to the "terminal operation stop" status.

Figure 3:
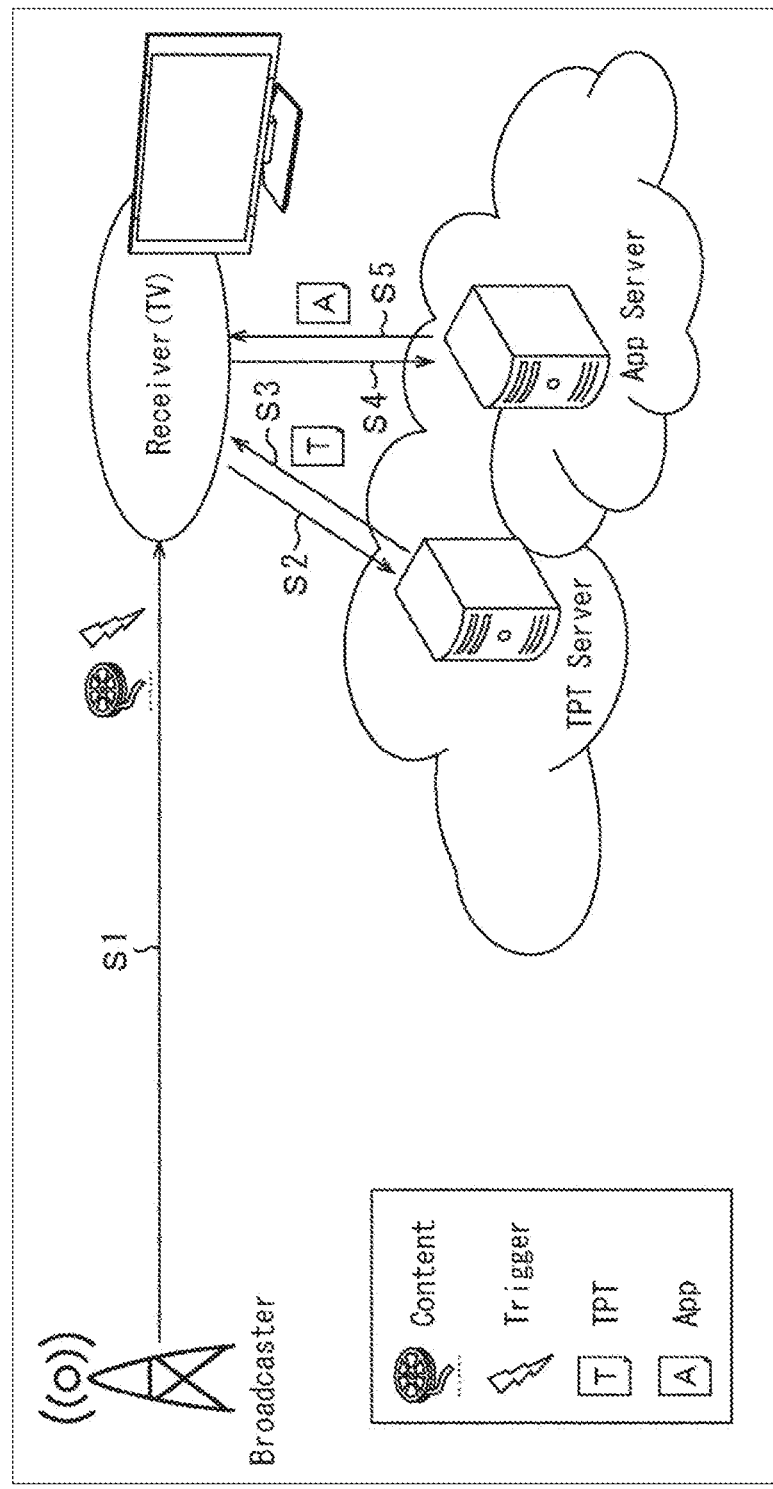
FIG. 3 A diagram showing the operation of the receiver apparatus that executes the broadcast related app.

(Operation of Receiver Apparatus)
FIG. 3 is a diagram showing the operation of the receiver apparatus that executes the broadcast related app. In other words, FIG. 3 shows the operation of the receiver apparatus, which has made a transition to the "broadcast reception (AV reproduction+broadcast related app execution)" status of FIG. 2.

In FIG. 3, the transmitting apparatus (Broadcaster) of the broadcasting station transmits digital broadcasting signals of AV content ("Content" of FIG. 3) including trigger information ("Trigger" of FIG. 3) (S1). The receiver apparatus (Receiver) obtains the trigger information transmitted together with the AV content, and determines whether to obtain the TPT (Trigger Parameters Table) or not on the basis of the trigger information. Then, when the receiver apparatus determines to obtain the TPT, the receiver apparatus accesses the TPT server via a network and requests the TPT (S2).

The TPT server (TPT Server) transmits the TPT ("TPT" of FIG. 3) to the receiver apparatus via the network in response to the request from the receiver apparatus (S3). The receiver apparatus receives and holds the TPT transmitted from the TPT server. Then, when the receiver apparatus obtains the trigger information transmitted from the transmitting apparatus, the receiver apparatus determines, with reference to the TPT that the receiver apparatus holds, a valid command corresponding to the event ID when the event ID of the trigger information is consistent with the event ID defined in the TPT.

The receiver apparatus accesses the application server via the network and requests the broadcast related app on the basis of the command determination result using the TPT (S4). The application server (App Server) transmits the broadcast related app ("App" of FIG. 3) to the receiver apparatus via the network in response to the request from the receiver apparatus (S5). The receiver apparatus receives and activates the broadcast related app transmitted from the application server.

Further, every time the receiver apparatus obtains trigger information transmitted from the transmitting apparatus, a command corresponding to the trigger information is determined on the basis of the TPT in order. Further, in response to the determined command, the receiver apparatus suspends, resumes, or terminates the broadcast related app being executed.

As described above, when the receiver apparatus has made a transition to the "broadcast reception (AV reproduction+broadcast related app execution)" status of FIG. 2, the receiver apparatus cooperates with the TPT server and the application server on the basis of the trigger information from the transmitting apparatus, and thereby obtains the broadcast related app executed with the AV content being reproduced and executes the obtained broadcast related app.

(Correspondence Between Trigger Information and TPT)

Figure 4:
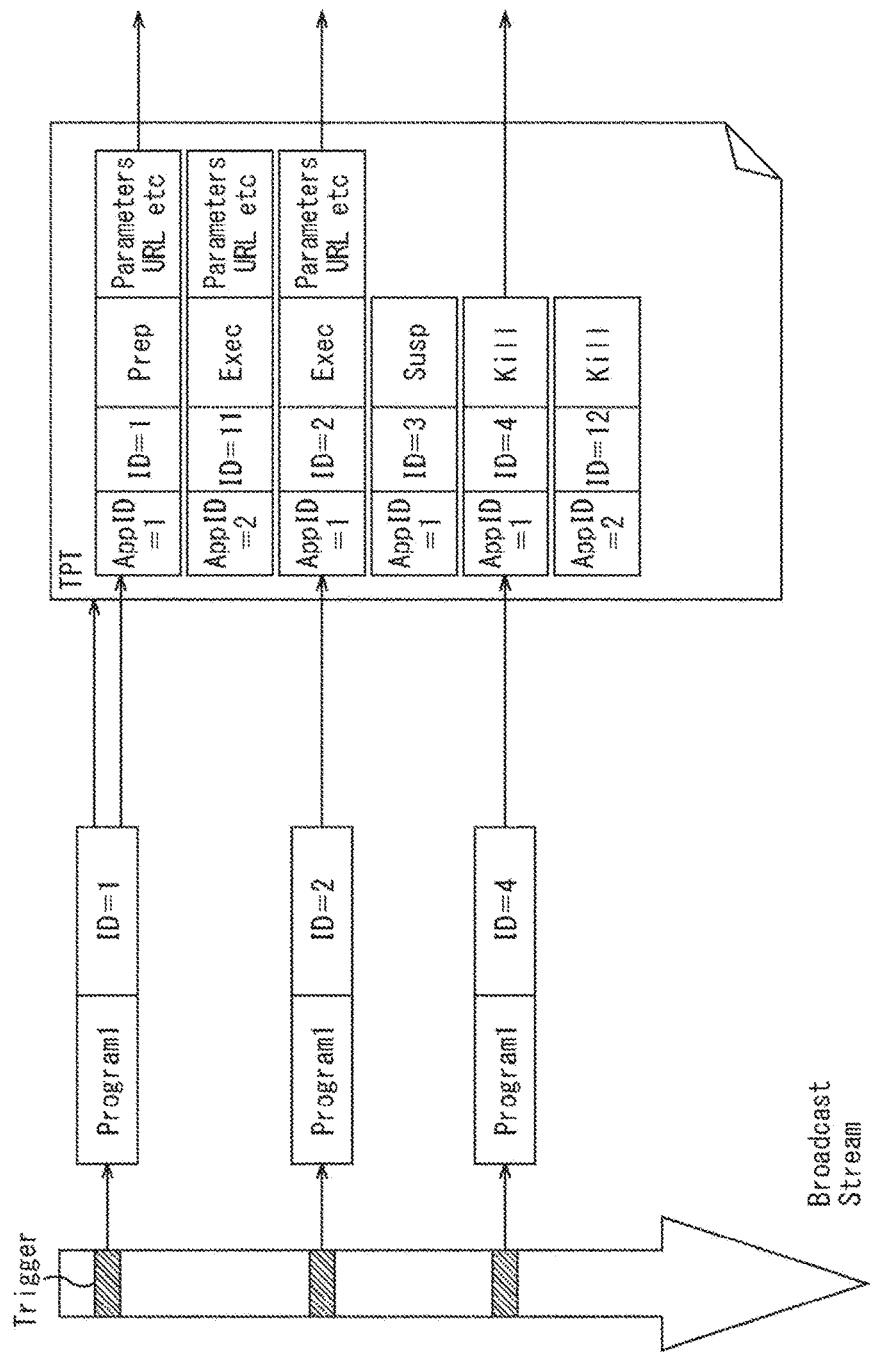
FIG. 4 A diagram showing correspondence between trigger information for controlling the operation of the broadcast related app and TPT.

FIG. 4 is a diagram showing correspondence between trigger information for controlling the operation of the broadcast related app and TPT.

In FIG. 4, when the receiver apparatus obtains the trigger information via a broadcast stream, the receiver apparatus determines whether to obtain the TPT from the TPT server or not on the basis of the trigger information. Herein, in FIG. 4, URL (Uniform Resource Locator) including domain_name and program_id is specified in "program1" contained in the trigger information. So, for example, the receiver apparatus determines to obtain the TPT when the program_id value is changed.

When the receiver apparatus determines to obtain the TPT, the receiver apparatus accesses the TPT server via the network on the basis of the URL including domain_name and program_id, and obtains the TPT. As a result, the receiver apparatus holds the updated TPT (FIG. 4).

To make the description simple, FIG. 4 only shows some elements and some attributes of the TPT. In other words, in the TPT of FIG. 4, a command (for example, "Prep", "Exec", "Susp", "Kill") identified by an event ID (ID) is defined for each broadcast related app identified by an application ID (AppID).

Here, for example, when the receiver apparatus obtains trigger information having event ID (ID)="1", the receiver apparatus determines a prepare command ("Prep") for the broadcast related app (application ID="1") corresponding to event ID (ID)="1" with reference to the TPT. In response to the prepare command, the receiver apparatus accesses the application server via the network, obtains the broadcast related app, and registers the broadcast related app.

Further, when the receiver apparatus obtains trigger information having event ID (ID)="2", the receiver apparatus determines an execute command ("Exec") for the broadcast related app (application ID="1") corresponding to event ID (ID)="2" with reference to the TPT. In response to the execute command, the receiver apparatus activates the obtained broadcast related app.

Further, when the receiver apparatus obtains trigger information having event ID (ID)="4", the receiver apparatus determines a kill command ("Kill") for the broadcast related app (application ID="1") corresponding to event ID (ID) ="4" with reference to the TPT. In response to the kill command, the receiver apparatus terminates the broadcast related app being executed.

As described above, every time the receiver apparatus obtains trigger information via a broadcast stream, a command corresponding to the trigger information is determined on the basis of the TPT in order. In response to the determined command, the receiver apparatus controls the operation of the broadcast related app.

(Description Example of TPT for Broadcast Related App)

FIG. 5 is a diagram showing a description example of the TPT for broadcast related app of FIG. 4.

In FIG. 5, "abc.tv/300" is specified for id attribute of tpt element. For example, this description means the TPT for AV content (program_id="300") broadcasted by the abc broadcasting station (domain_name="abc.tv"). Further, "1" is specified for tptVersion attribute as a version of the TPT.

Further, two Application elements are described in tpt element. Application ID="1" is specified by appID attribute and global ID="abc.tv/100" is specified by globalID attribute for the broadcast related app specified by the first Application element. Note that global ID is specified by URI (Uniform Resource Identifier), which is globally identifiable.

Further, URL element is described in Application element, and "http://abc.com/app1" is specified as URL, from which the broadcast related app is obtained. Further, "true" specified for entry attribute of the URL element means that this URL is entered. Event elements are described between the start tag and the end tag of Application element. EventId attribute and action attribute are described in each Event element.

Event ID="1" is specified by eventId attribute and the prepare command ("prep") is specified by action attribute for the first Event element. In other words, in the TPT of FIG. 5, the prepare command for the broadcast related app having application ID="1" is defined for trigger information having event ID="1".

Event ID="2" is specified by eventId attribute and the execute command ("exec") is specified by action attribute for the second Event element. In other words, in the TPT of FIG. 5, the execute command for the broadcast related app having application ID="1" is defined for trigger information having event ID="2".

Event ID="3" is specified by eventId attribute and the suspend command ("susp") is specified by action attribute for the third Event element. In other words, in the TPT of FIG. 5, the suspend command for the broadcast related app having application ID="1" is defined for trigger information having event ID="3".

Event ID="4" is specified by eventId attribute and the kill command ("kill") is specified by action attribute for the fourth Event element. In other words, in the TPT of FIG. 5, the kill command for the broadcast related app having application ID="1" is defined for trigger information having event ID="4".

Further, application ID="2" is specified by appID attribute and global ID="abc.tv/101" is specified by globalID attribute for the broadcast related app specified by the second Application element. Further, "http://abc.com/app2" is specified as URL, from which the broadcast related app is obtained, by using URL element. Event elements are described between the start tag and the end tag of Application element.

Event ID="11" is specified by eventId attribute and the execute command ("exec") is specified by action attribute for the first Event element. In other words, in the TPT of FIG. 5, execute command for the broadcast related app having application ID="2" is defined for trigger information having event ID="11".

Event ID="12" is specified by eventId attribute and the kill command ("kill") is specified by action attribute for the second Event element. In other words, in the TPT of FIG. 5, kill command for the broadcast related app having application ID="2" is defined for trigger information having event ID="12".

(TPT Syntax for Broadcast Related App)

FIG. 6 is a diagram showing an example of a TPT syntax for the broadcast related app. The TPT of FIG. 6 is described in a markup language such as XML (Extensible Markup Language), for example.

In FIG. 6, TPT element is described as a root element of the TPT. In TPT element, information such as an event for controlling the operation of the broadcast related app is described.

TPT element is a parent element of majorProtocolVersion attribute, minorProtocolVersion attribute, id attribute, tptVersion attribute, expireDate attribute, updatingTime attribute, serviceId attribute, baseURL attribute, Capabilities element, LiveTrigger element, and Application element.

Information indicating the major version of the spec defined in the TPT is specified for majorProtocolVersion attribute. Information indicating the minor version of the spec defined in the TPT is specified for minorProtocolVersion attribute.

ID for identifying the TPT is specified for id attribute. For example, a text string, in which domain_name and program_id are connected with "/", is specified for id attribute. Note that program_id is an ID for identifying AV content and corresponds to segment_id.

Information indicating the version of the TPT is specified for tptVersion attribute. Information indicating the expire date of the TPT is specified for expireDate attribute. Information indicating the updating time period of the TPT is specified for updatingTime attribute.

A service ID is specified for serviceId attribute. The service ID indicates a service, by which the broadcast related app is transmitted, out of services transmitted via digital broadcasting signals. For example, when the broadcast related app is transmitted by an NRT service, the service ID of the NRT service is specified for serviceId attribute.

Note that, according to the NRT (Non-Real Time) service, NRT content transmitted by using a FLUTE (File Delivery over Unidirectional Transport) session is once stored in storage of the receiver apparatus and then is reproduced. When the NRT service is used in transmitting applications, the broadcast related app is transmitted instead of NRT content.

URL, which is the base of URL specified in the TPT, is specified for baseURL attribute. In other words, a relative path on the basis of the base URL may be specified for each of the other URLs specified in the TPT.

Information indicating a function, which is required for the receiver apparatus when using the TPT, is specified for Capabilities element. In other words, when the receiver apparatus has the function specified by Capabilities element, the receiver apparatus determines that the receiver apparatus is capable of using the TPT. Meanwhile, when the receiver apparatus does not have the function specified by Capabilities element, the receiver apparatus ignores the TPT.

LiveTrigger element is a child element of TPT element. Information about trigger information, which is used by a broadcaster or the like to execute an event at a desired timing when live-broadcasting AV content, is described for LiveTrigger element. In other words, the trigger information is active trigger information (Activation Trigger). LiveTrigger element includes URL attribute and pollPeriod attribute.

URL used for accessing a trigger server for providing trigger information is described in URL attribute. The time indicating the interval of making an inquiry to the trigger server about trigger information is specified for pollPeriod attribute. The time is specified by seconds, for example.

Application element is a child element of TPT element. Information about the broadcast related app is described in Application element. Application element is a parent element of appID attribute, appType attribute, appName attribute, globalId attribute, appVersion attribute, cookieSpace attribute, frequencyOfUse attribute, expireDate attribute, testApp attribute, availInternet attribute, availBroadcast attribute, URL element, Capabilities element, ApplicationBoundary element, ContentItem element, and Event element.

Application ID for identifying the broadcast related app is specified for appID attribute. Information about a file attribute and the like of the broadcast related app is specified for appType attribute. Information indicating the name of the broadcast related app is specified for appName attribute. For example, when a plurality of the broadcast related apps can be activated, their names are shown to a user to be selected, and the desired broadcast related app is thus activated.

A global ID globally-identifiable the broadcast related app is specified for globalId attribute. Global ID is specified by using URI, for example. Information indicating the version of the broadcast related app is specified for appVersion attribute. Information indicating the storage volume necessary to execute the broadcast related app is specified for cookieSpace attribute.

Information indicating the frequency of use of the broadcast related app is specified for frequencyOfUse attribute. for example, the frequency of use is specified by time or day. It is possible to cache the broadcast related app having higher frequency of use with higher priority. Information indicating the expire date of the broadcast related app is specified for expireDate attribute.

TestApp attribute is specified when the broadcast related app is used for the purpose of product-development tests, for example. So testApp attribute is ignored in general operations. Information indicating whether the broadcast related app is distributed via the Internet or not is specified for availInternet attribute. Information indicating whether the broadcast related app is distributed via broadcasting or not is specified for availBroadcast attribute.

URL, from which the broadcast related app is obtained, is specified for URL element. For example, URL of the application server is specified for URL element. Note that a relative path on the basis of the above-mentioned base URL may be specified when the base URL is specified.

URL element is a parent element of entry attribute. Information indicating whether URL is entered or not is specified for entry attribute. For example, a file, which is necessary to obtain first, such as index.html is entered when URLs are specified for URL element. Then it is possible to obtain resource related thereto collectively.

Information indicating a function required for the receiver apparatus to execute the broadcast related app is specified for Capabilities element. In other words, when the receiver apparatus has the function specified by Capabilities element, the receiver apparatus determines that the receiver apparatus is capable of executing the broadcast related app.

Information indicating the range of URL that the broadcast related app is operable is specified for ApplicationBoundary element. ApplicationBoundary element is a parent element of OriginURL element. A URL that the broadcast related app is operable is specified for OriginURL element.

ContentItem element is a child element of Application element. Information about cache of a file (for example, HTML file and JPEG file) of the broadcast related app is described in ContentItem element. ContentItem element is a parent element of URL element, updatesAvail element, pollPeriod attribute, size attribute, availInternet attribute, and availBroadcast attribute.

URL of a file to be cached is specified for URL attribute. URL element is a parent element of entry attribute. Information indicating whether URL is entered or not is specified for entry attribute. Information about update of the file to be cached is specified for updatesAvail attribute. The time indicating the interval of making an inquiry to a server about a file to be cached is specified for pollPeriod attribute.

Information indicating the size of the file to be cached is specified for size attribute. Information indicating whether the file to be cached is distributed via the Internet or not is specified for availInternet attribute. Information indicating whether the file to be cached is distributed via broadcasting or not is specified for availBroadcast attribute.

Event element is a child element of Application element. Event information for controlling the operations of the broadcast related app is described in Event element. Event element is a parent element of eventId attribute, action attribute, destination attribute, diffusion attribute, and Data element.

Event ID for identifying an event is specified for eventId attribute. A command specified by event ID such as "prep", "exec", "susp", or "kill" is specified for action attribute.

Prepare command ("prep": prepare command) is a command to instruct obtain or register the broadcast related app. Herein, to register the broadcast related app means to record the priority and the expire date in relation to the obtained broadcast related app.

Execute command ("exec": execute command) is a command to instruct to obtain or activate the broadcast related app. Further, execute command is a command to resume execution of the broadcast related app when the specified broadcast related app is suspended.

Suspend command ("susp": suspend command) is a command to stop and suspend the broadcast related app being executed. Kill command ("kill": kill command) is a command to terminate the broadcast related app being executed.

An event-target apparatus that controls the broadcast related app is specified for destination attribute. Herein, an external apparatus is specified as an event-target apparatus instead of the receiver apparatus when the external apparatus is connected to the receiver apparatus, for example.

Information for stochastically diffusing timing, at which a receiver apparatus applies an event, is specified for diffusion attribute. Since the information is set, receiver apparatuses access the application server to obtain the broadcast related app not at a time but in a diffused manner.

Data referred to when applying an event is specified for Data element. Data element is a parent element of dataID attribute. Data ID for identifying data is specified for dataID attribute.

Note that the TPT syntax for the broadcast related app of FIG. 6 is merely an example, and elements and attributes may be added and deleted depending on the operations. For example, independent attribute may be added to TPT element, and information indicating whether TPT is for broadcast related app or for broadcast independent application (broadcast independent app) (described later) may be specified for independent attribute. In this case, for example, "0" is specified for the TPT of FIG. 6 for the broadcast related app.

Further, in FIG. 6, with respect to the frequency of occurrence (Cardinality), one element or attribute is always specified when "1" is specified, and the element or attribute is specified arbitrarily when "0 . . . 1" is specified. Further, one or more elements or attributes are specified when "1 . . . N" is specified, and one or more elements or attributes are specified arbitrarily when "0 . . . N" is specified. The definitions of the frequency of occurrence is similar in other syntaxes (described later).

Hereinabove, the broadcast related application (broadcast related app) executed by the receiver apparatus capable of at least receiving digital broadcasting signals has been described.

<2. Broadcast Independent Application>

Broadcast independent application is an application obtained in an environment, which is different from a broadcast service in which a broadcasting station provides apps via broadcast waves, such as distribution via the Internet, for example. Herein, the broadcast independent application executed by a receiver apparatus capable of not only receiving digital broadcasting signals but also receiving applications distributed via the Internet will be described.

Note that the broadcast independent application contains, for example, files and the like. In the following description, the broadcast independent application will be referred to as "broadcast independent app". Further, Broadcast Independent Application will be sometimes abbreviated to "Broadcast Independent App".

(Transition of the Screen of the Broadcast Independent App)

Figure 7:
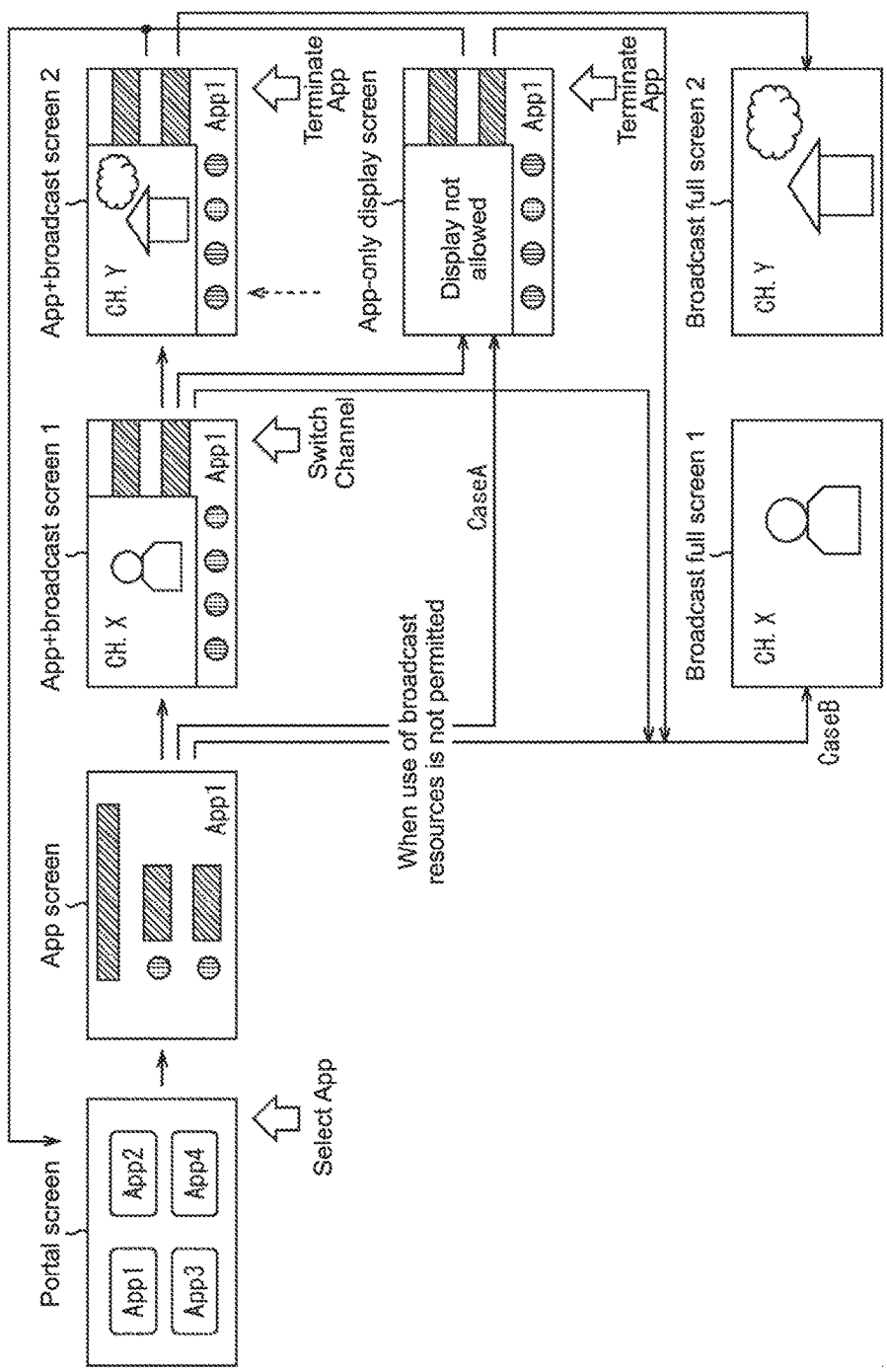
FIG. 7 A diagram showing transition of the screen of the broadcast independent app.

FIG. 7 is a diagram showing transition of the screen of the broadcast independent app.

FIG. 7 shows, in addition to the "broadcast full screen", i.e., a screen on which only AV content is reproduced, the "app+broadcast screen", i.e., a screen on which AV content is reproduced and the broadcast independent app is executed at the same time, the "portal screen", the "app screen", and the "app-only display screen".

Here, the "portal screen" is a screen on which a portal site capable of providing the broadcast independent app such as an application store, for example, is displayed. The "app screen" is a screen on which the broadcast independent app is executed. The "app-only display screen" is a screen on which only the broadcast independent app is displayed without an image of AV content being displayed.

When the receiver apparatus is powered on and is instructed to display the "portal screen", the receiver apparatus displays the "portal screen". Further, when a user selects an icon displayed on the "portal screen" to instruct to activate the desired broadcast independent app App1, the receiver apparatus displays the "app screen" corresponding to the selected broadcast independent app App1.

Further, when the broadcast program of the channel X is selected in the broadcast independent app App1 being executed, the receiver apparatus determines whether use of the selected broadcast program of the channel X is permitted or not. In other words, when the broadcast independent app obtained in an environment, which is different from a broadcast service in which a broadcasting station provides apps via broadcast waves, is going to use broadcast resources provided in the broadcast service, it is determined whether use of the broadcast resource is permitted or not in the determining process.

When use of the broadcast program of the channel X by the broadcast independent app App1 is permitted, the screen of the receiver apparatus makes a transition from the "app screen" to the "app+broadcast screen 1". The "app+broadcast screen 1" is an L-style screen, in which the image of the broadcast program of the channel X is zoomed out and information on the broadcast independent app App1 is displayed on the margin. In other words, the image of the broadcast program of the channel X is displayed on the sub-screen.

Note that the broadcast independent app, which is permitted to use broadcast resources, is, in other words, the broadcast related app, which is permitted to continue the operations by a broadcaster who provides AV content such as broadcast programs. After that, the broadcast independent app may operate as the broadcast related app.

Here, when a user switches the channel from X to Y while the "app+broadcast screen 1" is displayed, it is determined whether use of the broadcast program of the channel Y after switching by the broadcast independent app App1 is permitted or not. When use of the broadcast program of the channel Y by the broadcast independent app App1 is permitted, the screen of the receiver apparatus makes a transition from the "app+broadcast screen 1" to the "app+broadcast screen 2". The image displayed on the sub screen of the screen is switched from the image of the broadcast program of the channel X to the image of the broadcast program of the channel Y. In other words, the image of the broadcast program of the channel Y is displayed on the sub screen.

As described above, when use of broadcast resources by the broadcast independent app is permitted, the screen makes a transition to the "app+broadcast screen" and the broadcast independent app and the image of the broadcast resources are displayed together since the broadcast independent app can coexist with broadcast resources. To the contrary, when use of broadcast resources by the broadcast independent app is not permitted, the screen-before-transition makes a transition to the "app-only display screen" or the "broadcast full screen". In the following description, transition from the screen-before-transition to the "app-only display screen" will be referred to as "Case A", and transition from the screen-before-transition to the "broadcast full screen" will be referred to as "Case B".

In FIG. 7, when the broadcast program of the channel X is selected by the broadcast independent app App1 with the "app screen" being displayed and when use of the broadcast program of the channel X by the broadcast independent app App1 is not permitted, the screen of the receiver apparatus makes a transition from the "app screen" to the "app-only display screen" or the "broadcast full screen 1".

Here, when the screen of the receiver apparatus makes a transition from the "app screen" to the "app-only display screen", i.e., in the Case A of FIG. 7, information on the broadcast independent app App1 is displayed and a message indicating that the image of the broadcast program of the channel X cannot be displayed is displayed instead of the image of the broadcast program of the channel X to be displayed on the sub screen in the L-style "app-only display screen". As described above, in the "app-only display screen" displayed when use of broadcast resources by the broadcast independent app is not permitted, the broadcast independent app does not coexist with the broadcast resources, and use of broadcast resources is limited.

Note that, in the description with reference to FIG. 7, the "app-only display screen" is an L-style screen. Alternative display modes such as a C-style screen, a U-style screen, and an overlay display screen may be employed, for example, as long as the screen is capable of informing a user that broadcast resources cannot be used without displaying the image of the broadcast resources.

Further, when the screen of the receiver apparatus makes a transition from the "app screen" to the "broadcast full screen 1", i.e., in the Case B of FIG. 7, the image of the broadcast program of the channel X is displayed in the normal size in the "broadcast full screen", and the broadcast independent app App1 is terminated. As described above, in the "broadcast full screen" displayed when use of broadcast resources by the broadcast independent app is not permitted, the broadcast independent app does not coexist with broadcast resources, and use of broadcast resources is limited.

Similarly, when the broadcast program of the channel Y is selected by the broadcast independent app App1 with the "app+broadcast screen 1" being displayed and when use of the broadcast program of the channel Y by the broadcast independent app App1 is not permitted, the screen of the receiver apparatus makes a transition from the "app+broadcast screen 1" to the "app-only display screen" or the "broadcast full screen 1".

Here, when the screen of the receiver apparatus makes a transition from the "app+broadcast screen 1" to the "app-only display screen", i.e., in the Case A of FIG. 7, information on the broadcast independent app App1 is displayed and a message indicating that the image of the broadcast program of the channel Y cannot be displayed is displayed instead of the image of the broadcast program of the channel Y to be displayed on the sub screen in the L-style "app-only display screen".

Further, when the screen of the receiver apparatus makes a transition from the "app+broadcast screen 1" to the "broadcast full screen 1", i.e., in the Case B of FIG. 7, the image of the broadcast program of the channel X is displayed in the normal size in the "broadcast full screen 1", and the broadcast independent app App1 is terminated. Note that the screen may make a transition to not the "broadcast full screen 1" but the "broadcast full screen 2" in this case, and the image of the broadcast program of the channel Y may be displayed in the normal size.

As described above, in the "app-only display screen" or the "broadcast full screen" displayed when use of broadcast resources by the broadcast independent app is not permitted, the broadcast independent app does not coexist with broadcast resources, and use of broadcast resources is limited.

Note that, when the receiver apparatus is instructed to terminate the broadcast related app App1 with the "app+broadcast screen 2" being displayed, the receiver apparatus terminates the broadcast related app App1 and the screen makes a transition from the "app+broadcast screen 2" to the "portal screen" or the "broadcast full screen 2". Further, when the receiver apparatus is instructed to terminate the broadcast related app App1 with the "app-only display screen" being displayed, the receiver apparatus terminates the broadcast related app App1 and the screen makes a transition from the "app-only display screen" to the "portal screen" or the "broadcast full screen 1". Note that the screen may make a transition to not the "broadcast full screen 1" but the "broadcast full screen 2" in this case.

According to the above-mentioned screen transition, when broadcast resources are to be used by the broadcast independent app and the broadcast independent app cannot coexist with the broadcast resources, use of the broadcast resources by the predetermined broadcast independent app can be limited.

For example, when social networking service (SNS) application is activated as the broadcast independent app and use of broadcast resources by the application is not permitted, the "app-only display screen" of the Case A is displayed and thereby the social networking service application can be displayed with higher priority.

Further, for example, when application that supports to watch AV content is activated as the broadcast independent app and use of the broadcast resource by the application is not permitted, the "broadcast full screen" of the Case B is displayed and thereby AV content is displayed with higher priority.

Hereinafter, a first embodiment and a second embodiment will be described in order as embodiments to realize the screen transition of FIG. 7.

(1) First Embodiment (Processing Flow of Entire System)

Figure 8:
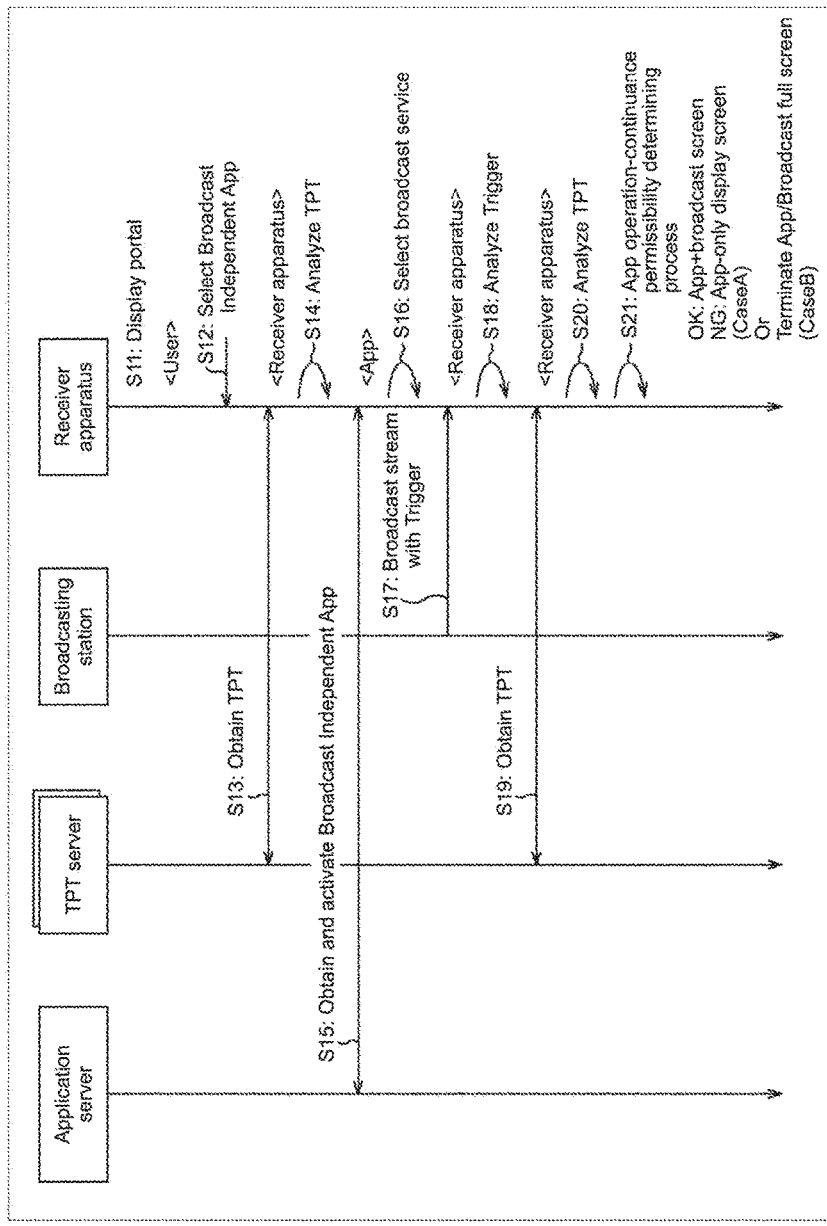
FIG. 8 A diagram showing the processing flow of the entire system of the first embodiment.

FIG. 8 is a diagram showing the processing flow of the entire system of the first embodiment.

FIG. 8 shows the processing flow executed by the receiver apparatus, the transmitting apparatus of the broadcasting station, the TPT server, and the application server.

The receiver apparatus displays the "portal screen" (FIG. 7) (S11), and a user selects the broadcast independent app on the "portal screen" (S12). Then, when the broadcast independent app is selected, the receiver apparatus accesses the TPT server, and obtains and analyzes the TPT for broadcast independent app (S13, S14).

The receiver apparatus accesses the application server on the basis of the TPT for broadcast independent app, and obtains and activates the broadcast independent app (S15). As a result, the receiver apparatus displays the "app screen" (FIG. 7). Further, when a broadcast service (for example, broadcast program) is selected by the broadcast independent app being executed, the receiver apparatus obtains and analyzes trigger information transmitted via a broadcast stream (S17, S18).

The receiver apparatus accesses the TPT server on the basis of the trigger information, and obtains and analyzes the TPT for broadcast related app (S19, S20). Further, the receiver apparatus performs operation-continuance permissibility determining process. In the operation-continuance permissibility determining process, the receiver apparatus compares the content described in the TPT for broadcast independent app (obtained and analyzed in S13, S14) with the content described in the TPT for broadcast related app (obtained and analyzed in S19, S20), and thereby determines whether continuation of the operation using broadcast resources by the broadcast independent app is permitted or not (S21).

Specifically, use of broadcast resources by the broadcast independent app is permitted when the broadcast related app is described in the TPT for broadcast related app, where the global ID value of the broadcast related app is the same as the global ID value of the broadcast independent app that selects a broadcast service, where the value of a URL (where entry="true") from which the broadcast related app is obtained is the same as the value of a URL from which the broadcast independent app is obtained, and where execute command ("exec") is specified for an event of the broadcast related app at this time.

When use of broadcast resources by the broadcast independent app is permitted and continuation of the operation of the broadcast independent app is permitted in the determining process of Step S21, the receiver apparatus displays the "app+broadcast screen" (FIG. 7). Note that the above-mentioned broadcast independent app, which is permitted to continue the operations on the basis of the TPT for broadcast related app, is, in other words, the broadcast related app, which is permitted to continue the operations by a broadcasting station (broadcaster). So, after that, the broadcast independent app will operate as the broadcast related app.

Further, when use of broadcast resources by the broadcast independent app is not permitted because the above-mentioned conditions are not satisfied, the receiver apparatus displays the "app-only display screen" (FIG. 7) of the Case A or the "broadcast full screen" (FIG. 7) of the Case B on the basis of context attribute (see FIG. 11 or FIG. 12 (described later)) of Application element described in the TPT for broadcast independent app.

As described above, in the first embodiment, when broadcast resources are to be used by the broadcast independent app, the content described in the TPT for broadcast independent app is checked against the content described in the TPT for broadcast related app. Then, depending on the check result, the "app+broadcast screen" (FIG. 7) is displayed when use of broadcast resources is permitted, and the "app-only display screen" (FIG. 7) or the "broadcast full screen" (FIG. 7) is displayed when use of broadcast resources is not permitted.

As a result, broadcast resources cannot be used when use of broadcast resources by the broadcast independent app is not permitted. So it is possible to limit use of broadcast resources by the predetermined broadcast independent app.

(Status Transition of Receiver Apparatus)

Figure 9:
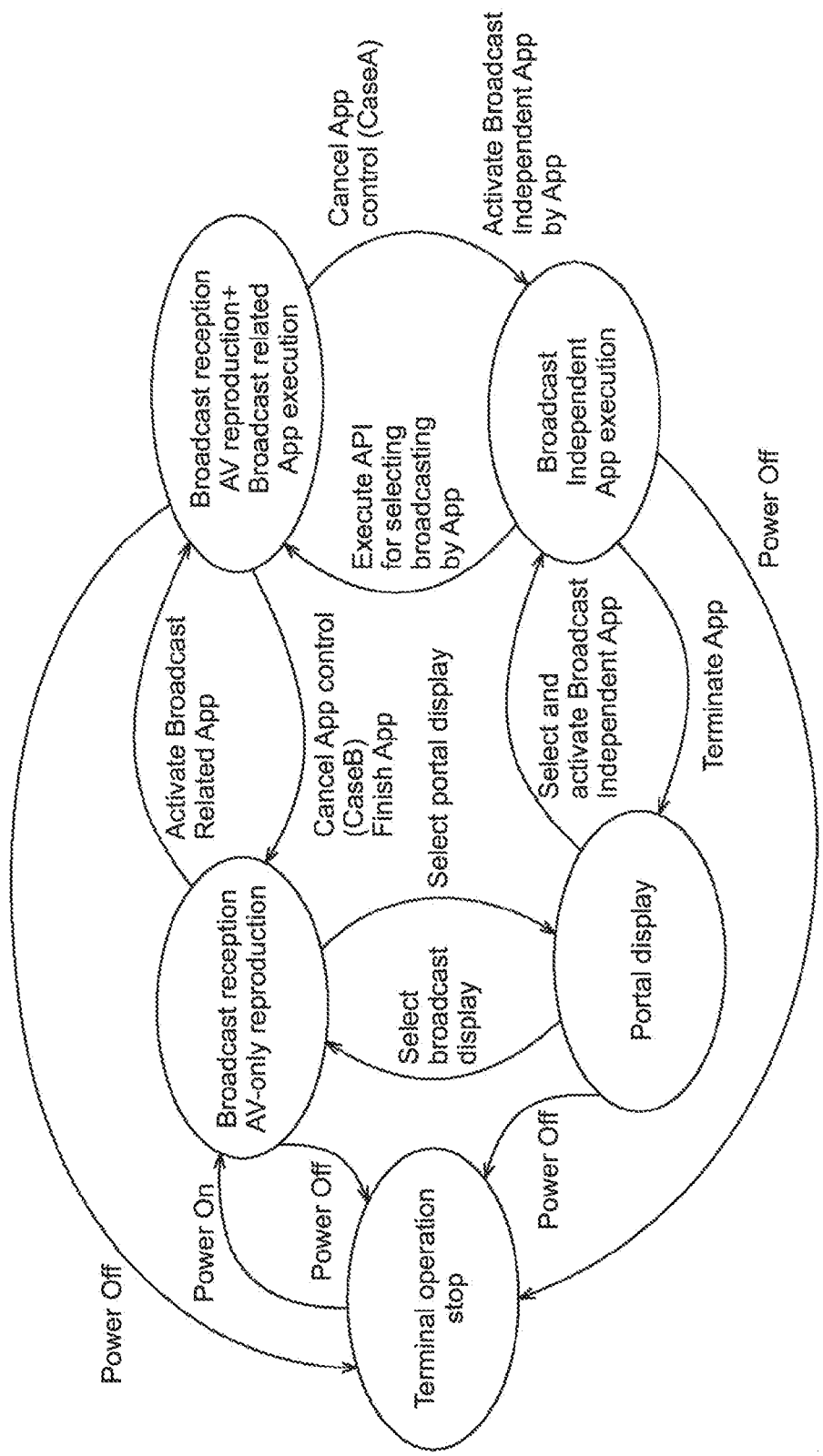
FIG. 9 A diagram showing the status transition of the receiver apparatus that executes the broadcast independent app.

FIG. 9 is a diagram showing the status transition of the receiver apparatus that executes the broadcast independent app. As shown in FIG. 9, it is defined that the receiver apparatus makes a transition to the "terminal operation stop" status, the "broadcast reception (AV-only reproduction)" status, the "broadcast reception (AV reproduction+broadcast related app execution)" status, the "portal display" status, or the "broadcast independent app execution" status.

The "terminal operation stop" status means that the receiver apparatus is powered off. The "broadcast reception (AV-only reproduction)" status means that only AV content such as a broadcast program is reproduced. The receiver apparatus, which has made a transition to this status, displays the "broadcast full screen" (FIG. 7).

The "broadcast reception (AV reproduction+broadcast related app execution)" status means that AV content is reproduced and the broadcast related app (broadcast independent app) is executed at the same time. In other words, this status includes not only a case where the broadcast related app is activated directly but also a case where the broadcast independent app operates substantially as the broadcast related app when the broadcast independent app uses broadcast resources and continuation of the operation is permitted on the basis of the TPT for broadcast related app. The receiver apparatus, which has made a transition to this status, displays the "app+broadcast screen" (FIG. 7).

The "portal display" status means that a portal site on which the broadcast independent app can be selected is displayed. The receiver apparatus, which has made a transition to this status, displays the "portal screen" (FIG. 7). The "broadcast independent app execution" status means that the broadcast independent app is executed, or means that use of AV content is limited and only the broadcast independent app is executed. The receiver apparatus, which has made a transition to this status, displays the "app screen" or the "app-only display screen" (FIG. 7).

When the receiver apparatus has made a transition to the "terminal operation stop" status and is powered on, the status makes a transition to the "broadcast reception (AV-only reproduction)" status. Further, when the receiver apparatus has made a transition to the "broadcast reception (AV-only reproduction)" status and the broadcast related app is activated, the status makes a transition to the "broadcast reception (AV reproduction+broadcast related app execution)" status. Note that, when the receiver apparatus has made a transition to the "broadcast reception (AV-only reproduction)" status and is powered off, the status makes a transition to the "terminal operation stop" status.

When the receiver apparatus has made a transition to the "broadcast reception (AV reproduction+broadcast related app execution)" status and execution of the broadcast related app is terminated, the status makes a transition to the "broadcast reception (AV-only reproduction)" status. Note that, when the receiver apparatus has made a transition to the "broadcast reception (AV reproduction+broadcast related app execution)" status and is powered off, the status makes a transition to the "terminal operation stop" status.

Further, when the receiver apparatus has made a transition to the "broadcast reception (AV-only reproduction)" status and to display the "portal screen" (FIG. 7) is selected, the status makes a transition to the "portal display" status. When the receiver apparatus has made a transition to the "portal display" status and the broadcast independent app is activated, the status makes a transition to the "broadcast independent app execution" status. Note that, when the receiver apparatus has made a transition to the "portal display" status and to display broadcasting is selected, the status makes a transition to the "broadcast reception (AV-only reproduction)" status. When the receiver apparatus is powered off, the status makes a transition to the "terminal operation stop" status.

When the receiver apparatus has made a transition to the "broadcast independent app execution" status and the broadcast independent app executes the API (Application Programming Interface) for selecting broadcasting to use broadcast resources, the status makes a transition to the "broadcast reception (AV reproduction+broadcast related app execution)" status. In other words, in this case, the operation-continuance permissibility determining process of the broadcast independent app is executed by using the TPT for broadcast related app. When continuation of the operation is permitted, the "broadcast reception (AV reproduction+broadcast related app execution)" status is remained, and the broadcast independent app continues the operations as if it is the broadcast related app.

To the contrary, when continuation of the operation is not permitted in the operation-continuance permissibility determining process, the status makes a transition to the "broadcast independent app execution" status or the "broadcast reception (AV-only reproduction)" status. In other words, in this case, use of broadcast resources by the broadcast independent app is not permitted. So, in the Case A, the receiver apparatus makes a transition to the "broadcast independent app execution" status, and displays the "app-only display screen" (FIG. 7). Further, in the Case B, the receiver apparatus makes a transition to the "broadcast reception (AV-only reproduction)" status, and displays the "broadcast full screen" (FIG. 7).

Note that, when the receiver apparatus has made a transition to the "broadcast independent app execution" status and the broadcast independent app is terminated, the status makes a transition to the "portal display" status. Further, when the receiver apparatus has made a transition to the "broadcast independent app execution" status and is powered off, the status makes a transition to the "terminal operation stop" status.

(Operations of Receiver Apparatus)

Figure 10:
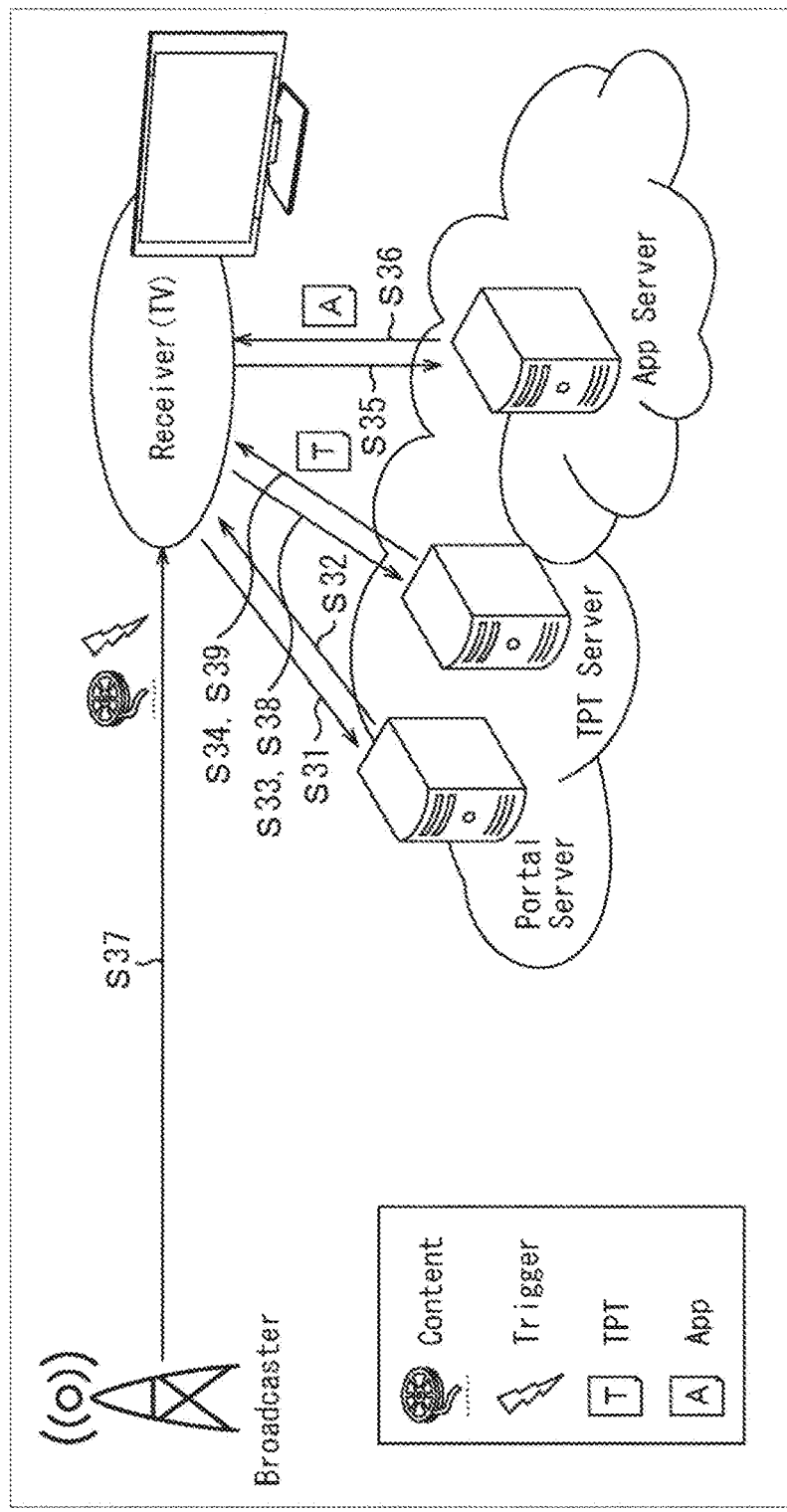
FIG. 10 A diagram showing the operations of the receiver apparatus that executes the broadcast independent app.

FIG. 10 is a diagram showing operations of the receiver apparatus that executes the broadcast independent app.

In FIG. 10, when the receiver apparatus is instructed to display a portal site, the receiver apparatus accesses the portal server via the network, and requests a web page of the portal site (S31). In response to the request from the receiver apparatus, the portal server transmits the web page of the portal site to the receiver apparatus via the network (S32). The receiver apparatus displays the web page of the portal site received from the portal server.

When the broadcast independent app is selected on the portal site, the receiver apparatus accesses the TPT server via the network, and requests the TPT for broadcast independent app (S33). In response to the request from the receiver apparatus, the TPT server transmits the TPT for broadcast independent app ("TPT" of FIG. 10) to the receiver apparatus via the network (S34). The receiver apparatus receives and holds the TPT for broadcast independent app transmitted from the TPT server.

Further, the receiver apparatus accesses the application server via the network on the basis of the TPT for broadcast independent app, and requests the broadcast independent app (S35). In response to the request from the receiver apparatus, the application server transmits the broadcast independent app ("App" of FIG. 10) to the receiver apparatus via the network (S36). The receiver apparatus receives and activates the broadcast independent app transmitted from the application server.

Here, when a broadcast service (for example, broadcast program) is selected by the broadcast independent app being executed, the receiver apparatus obtains trigger information ("Trigger" of FIG. 10), which is transmitted together with AV content ("Content" of FIG. 10) by the transmitting apparatus of the broadcasting station (S37).

The receiver apparatus accesses the TPT server via the network on the basis of the trigger information, and requests the TPT for broadcast related app (S38). In response to the request from the receiver apparatus, the TPT server transmits the TPT for broadcast related app ("TPT" of FIG. 10) to the receiver apparatus via the network (S39). The receiver apparatus receives and obtains the TPT for broadcast related app transmitted from the TPT server.

Further, the receiver apparatus performs the operation-continuance permissibility determining process to determine whether continuation of the operation using broadcast resources by the broadcast independent app is permitted or not on the basis of the TPT for broadcast independent app and the TPT for broadcast related app.

When use of broadcast resources by the broadcast independent app is permitted in the operation-continuance permissibility determining process, the receiver apparatus makes a transition to the "broadcast reception (AV reproduction+broadcast related app execution)" status of FIG. 9, and the broadcast independent app continues the operations as the broadcast related app. In this case, the receiver apparatus displays the "app+broadcast screen" (FIG. 7).

To the contrary, when use of broadcast resources by the broadcast independent app is not permitted, the receiver apparatus makes a transition to the "broadcast independent app execution" status of FIG. 9 or the "broadcast reception (AV-only reproduction)" status of FIG. 9, and displays the "app-only display screen" (FIG. 7) in the Case A or the "broadcast full screen" (FIG. 7) in the Case B.

Note that, in the description with reference to FIG. 10, for convenience, the common TPT server provides the TPT for broadcast independent app and the TPT for broadcast related app. However, actually, the TPT for broadcast related app may be provided by a broadcaster, and the TPT for broadcast independent app may be provided by a service provider such as a third party different from the broadcaster. So those TPTs may be provided by different TPT servers.

(Description Example of TPT for Broadcast Independent App)

FIG. 11 is a diagram showing a description example of the TPT for broadcast independent app.

In FIG. 11, "abc.tv/300" is specified for id attribute of tpt element, and "1" is specified for tptVersion attribute. Further, "1" is specified for independent attribute of tpt element, and it means that the TPT of FIG. 11 is the TPT for broadcast independent app.

One Application element is described in tpt element. Application ID="1" is specified by appID attribute and global ID="abc.tv/100" is specified by globalID attribute for the broadcast independent app of Application element. Further, "app" specified for context attribute means that the receiver apparatus continues the operations of the broadcast independent app and displays the "app-only display screen" (FIG. 7) of the Case A when use of broadcast resources by the broadcast independent app is not permitted.

Further, URL element is described in Application element, and "http://abc.com/app1" is specified as URL, from which the broadcast independent app is obtained. Further, "true" specified for entry attribute of the URL element means that this URL is entered.

(TPT Syntax for Broadcast Independent App)

FIG. 12 is a diagram showing an example of a TPT syntax for the broadcast independent app. The TPT of FIG. 12 is described in a markup language such as XML, for example.

In FIG. 12, TPT element is described as a root element of TPT. In TPT element, information for obtaining the broadcast independent app is described.

TPT element is a parent element of majorProtocolVersion attribute, minorProtocolVersion attribute, id attribute, independent attribute, tptVersion attribute, expireDate attribute, baseURL attribute, Capabilities element, and Application element.

Information indicating the major version of the spec defined in the TPT is specified for majorProtocolVersion attribute. Information indicating the minor version of the spec defined in the TPT is specified for minorProtocolVersion attribute. ID for identifying the TPT is specified for id attribute.

Information indicating whether TPT is for broadcast related app or for broadcast independent app is specified for independent attribute. "1" is specified since TPT of FIG. 12 is for the broadcast independent app.

Information indicating the version of the TPT is specified for tptVersion attribute. Information indicating the expire date of the TPT is specified for expireDate attribute. URL, which is the base of URL specified in the TPT, is specified for baseURL attribute. So a relative path on the basis of the base URL may be specified for each of the other URLs specified in the TPT.

Information indicating a function, which is required for the receiver apparatus when using the TPT, is specified for Capabilities element. In other words, when the receiver apparatus has the function specified by Capabilities element, the receiver apparatus determines that the receiver apparatus is capable of using the TPT.

Application element is a child element of TPT element. Information about the broadcast independent app is described in Application element. Application element is a parent element of appID attribute, appType attribute, appName attribute, globalId attribute, appVersion attribute, cookieSpace attribute, expireDate attribute, context attribute, URL element, ApplicationBoundary element, and ContentItem element.

Application ID for identifying the broadcast independent app is specified for appID attribute. Information about a file attribute and the like of the broadcast independent app is specified for appType attribute. Information indicating the name of the broadcast independent app is specified for appName attribute.

A global ID globally-identifiable the broadcast independent app is specified for globalId attribute. Global ID is specified by using URI, for example. Information indicating the version of the broadcast independent app is specified for appVersion attribute. Information indicating the storage volume necessary to execute the broadcast independent app is specified for cookieSpace attribute. Information indicating the expire date of the broadcast independent app is specified for expireDate attribute.

Information indicating whether to continue the operations of the broadcast independent app or not when use of broadcast resources by the broadcast independent app is not permitted is specified for context attribute. For example, when "app" is specified for context attribute, the operations of the broadcast independent app is continued and the "app-only display screen" (FIG. 7) of the Case A is displayed. Further, when "broadcast" is specified for context attribute, the broadcast independent app is terminated and the "broadcast full screen" (FIG. 7) of the Case B is displayed.

URL, from which the broadcast independent app is obtained, is specified for URL element. For example, URL of the application server is specified for URL element. URL element is a parent element of entry attribute. Information indicating whether URL is entered or not is specified for entry attribute. For example, a file, which is necessary to obtain first, such as index.html is entered when URLs are specified for URL element. Then it is possible to obtain resource related thereto collectively.

Information indicating the range of URL that the broadcast independent app is operable is specified for ApplicationBoundary element. ApplicationBoundary element is a parent element of OriginalURL element. A URL that the broadcast independent app is operable is specified for OriginalURL element.

Information about cache of a file (for example, HTML file and JPEG file) of the broadcast independent app is described in ContentItem element. ContentItem element is a parent element of URL element and size attribute. URL of a file to be cached is specified for URL attribute. URL element is a parent element of entry attribute. Information indicating whether URL is entered or not is specified for entry attribute. Information indicating the size of the file to be cached is specified for size attribute.

Note that the TPT syntax for the broadcast independent app of FIG. 12 is merely an example, and elements and attributes may be added and deleted depending on the operations.

Further, comparing the TPT for broadcast independent app of FIG. 12 with the TPT for broadcast related app of FIG. 6, the TPT for broadcast independent app is a subset of the TPT for broadcast related app where independent attribute and context attribute of Application element are added to the TPT for broadcast independent app. Further, only one Application element is described since the TPT for broadcast independent app of FIG. 12 is the TPT for the predetermined broadcast independent app. In addition, description of an event is omitted since only an execute command ("exec") is prepared as a command.

(2) Second Embodiment
(Processing Flow of Entire System)

Figure 13:
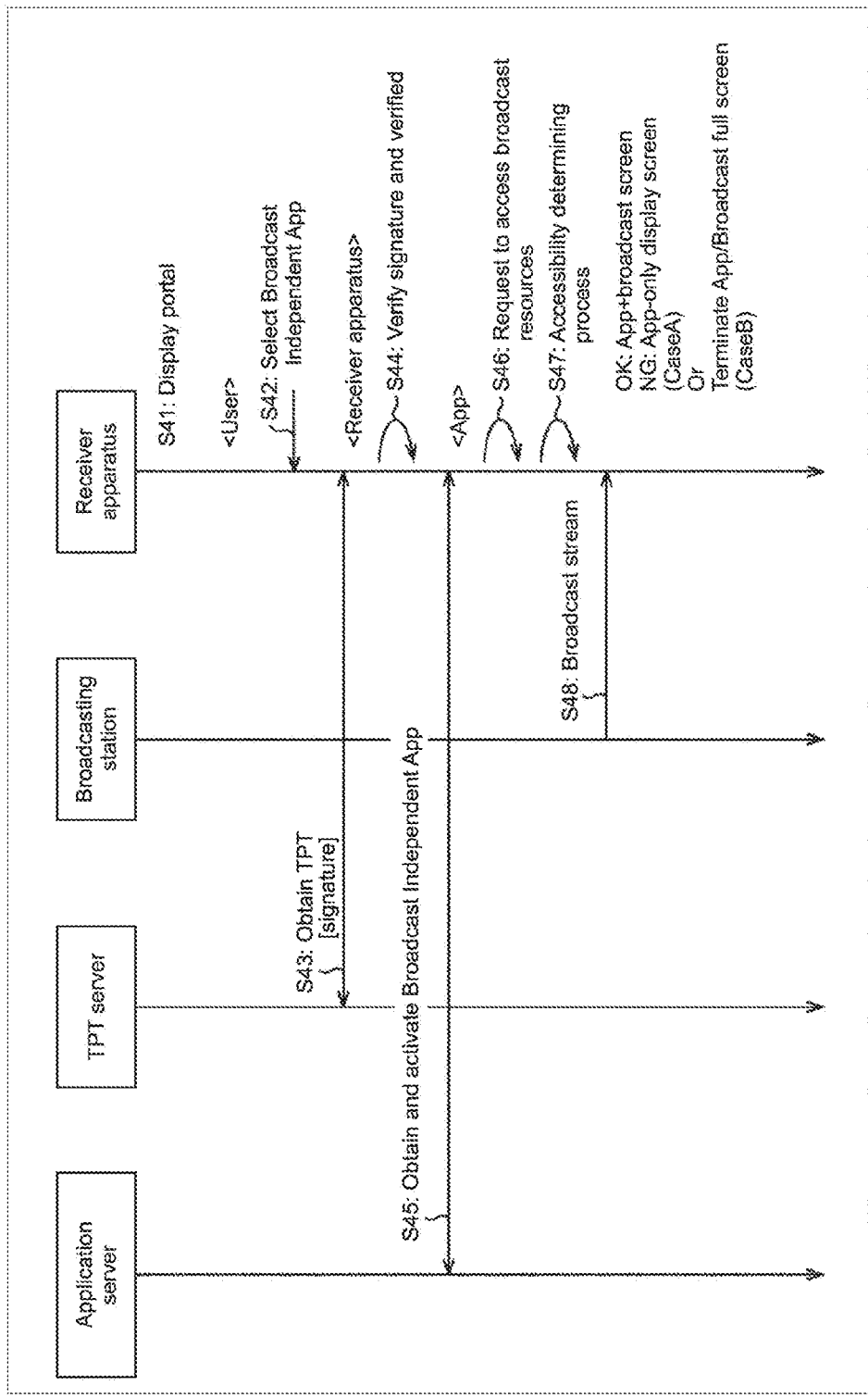
FIG. 13 A diagram showing the processing flow of the entire system of the second embodiment.

FIG. 13 is a diagram showing the processing flow of the entire system of the second embodiment.

FIG. 13 shows the processing flow executed by the receiver apparatus, the transmitting apparatus of the broadcasting station, the TPT server, and the application server.

The receiver apparatus displays the "portal screen" (FIG. 7) (S41), and a user selects the broadcast independent app on the "portal screen" (S42). Then, when the broadcast independent app is selected, the receiver apparatus accesses the TPT server, and obtains the TPT for broadcast independent app (S43).

The receiver apparatus holds a broadcasting station public key certificate in advance, and verifies the electronic signature described in the TPT for broadcast independent app by using the broadcasting station public key certificate (S44). When the receiver apparatus verified the electronic signature in Step S44, the receiver apparatus accesses the application server on the basis of the TPT for broadcast independent app, and obtains and activates the broadcast independent app (S45). As a result, the receiver apparatus displays the "app screen" (FIG. 7).

After that, when the broadcast independent app being executed requests to access broadcast resources, e.g., to select a broadcast service, (S46), the receiver apparatus performs accessibility determining process. In the accessibility determining process, the receiver apparatus determines whether to permit use of broadcast resources by the broadcast independent app or not on the basis of the TPT for broadcast independent app (S47).

Specifically, the accessibility determining process is performed as follows. For example, access authority (hereinafter sometimes referred to as "broadcast permission information".) is described for each broadcasting station (broadcast service) in the TPT for broadcast independent app. On the basis of the description, it is determined whether the broadcast independent app that selects a broadcast service has authority to access a broadcast service, of which selection is instructed, or not.

When it is determined that the broadcast independent app has authority to access a broadcast service in the determining process of Step S47, use of broadcast resources by the broadcast independent app is permitted, and the receiver apparatus displays the "app+broadcast screen" (FIG. 7).

Further, when it is determined that the broadcast independent app does not have authority to access a broadcast service in the determining process of Step S47, use of broadcast resources by the broadcast independent app is not permitted. In this case, the receiver apparatus displays the "app-only display screen" (FIG. 7) of the Case A or the "broadcast full screen" (FIG. 7) of the Case B on the basis of context attribute (see FIG. 16 or FIG. 17 (described later)) of Application element described in the TPT for broadcast independent app.

As described above, in the second embodiment, when broadcast resources are to be used by the broadcast independent app, it is determined whether the broadcast independent app has authority to access a broadcast service or not by using broadcast permission information described in the TPT for broadcast independent app. Further, the "app+broadcast screen" (FIG. 7) is displayed when the broadcast independent app has authority to access broadcast resources, and the "app-only display screen" (FIG. 7) or the "broadcast full screen" (FIG. 7) is displayed when the broadcast independent app does not have authority to access broadcast resources.

As a result, broadcast resources cannot be used when the broadcast independent app does not have authority to access broadcast resources. So it is possible to limit use of broadcast resources by the predetermined broadcast independent app.

(Status Transition of Receiver Apparatus)

Figure 14:
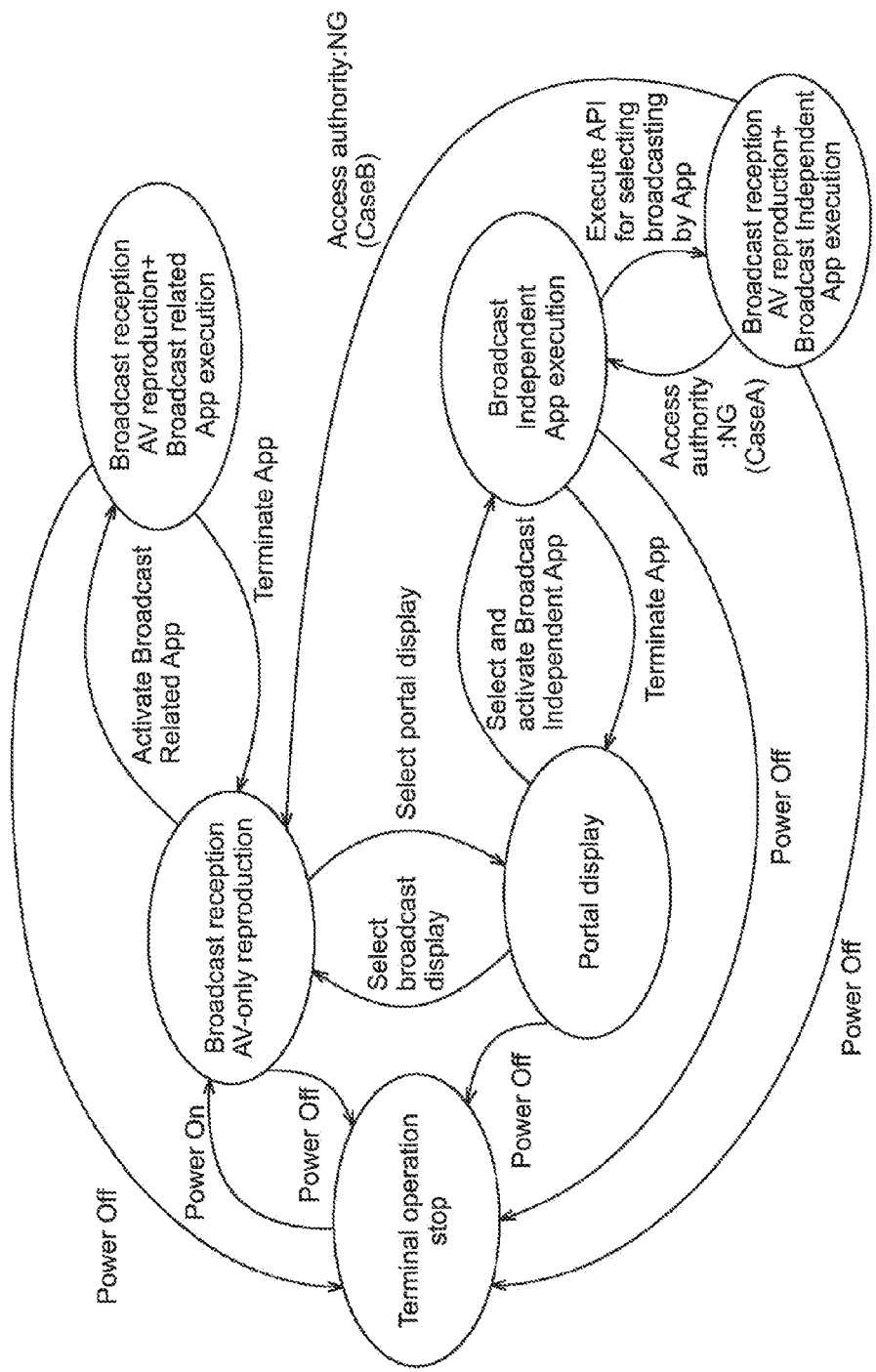
FIG. 14 A diagram showing the status transition of the receiver apparatus that executes the broadcast independent app.

FIG. 14 is a diagram showing the status transition of the receiver apparatus that executes the broadcast independent app. As shown in FIG. 14, it is defined that the receiver apparatus makes a transition to the "terminal operation stop" status, the "broadcast reception (AV-only reproduction)" status, the "broadcast reception (AV reproduction+broadcast related app execution)" status, the "portal display" status, the "broadcast independent app execution" status, or the "broadcast reception (AV reproduction+broadcast independent app execution)" status.

The "terminal operation stop" status means that the receiver apparatus is powered off. The "broadcast reception (AV-only reproduction)" status means that only AV content such as a broadcast program is reproduced. The receiver apparatus, which has made a transition to this status, displays the "broadcast full screen" (FIG. 7). The "broadcast reception (AV reproduction+broadcast related app execution)" status means that AV content is reproduced and the broadcast related app is executed at the same time. The receiver apparatus, which has made a transition to this status, displays the "app+broadcast screen" (FIG. 7).

The "portal display" status means that a portal site on which the broadcast independent app can be selected is displayed. The receiver apparatus, which has made a transition to this status, displays the "portal screen" (FIG. 7).

The "broadcast independent app execution" status means that the broadcast independent app is executed, or means that use of AV content is limited and only the broadcast independent app is executed. The receiver apparatus, which has made a transition to this status, displays the "app screen" or the "app-only display screen" (FIG. 7).

The "broadcast reception (AV reproduction+broadcast independent app execution)" status means that AV content is reproduced and the broadcast independent app is executed at the same time. The receiver apparatus, which has made a transition to this status, displays the "app+broadcast screen" (FIG. 7).

When the receiver apparatus has made a transition to the "terminal operation stop" status and is powered on, the status makes a transition to the "broadcast reception (AV-only reproduction)" status. Further, when the receiver apparatus has made a transition to the "broadcast reception (AV-only reproduction)" status and the broadcast related app is activated, the status makes a transition to the "broadcast reception (AV reproduction+broadcast related app execution)" status. Further, when the receiver apparatus has made a transition to the "broadcast reception (AV reproduction+ broadcast related app execution)" status and execution of the broadcast related app is terminated, the status makes a transition to the "broadcast reception (AV-only reproduction)" status.

Note that, when the receiver apparatus has made a transition to the "broadcast reception (AV-only reproduction)" status or the "broadcast reception (AV reproduction+broadcast related app execution)" status and is powered off, the status makes a transition to the "terminal operation stop" status.

Further, when the receiver apparatus has made a transition to the "broadcast reception (AV-only reproduction)" status and to display the "portal screen" (FIG. 7) is selected, the status makes a transition to the "portal display" status. When the receiver apparatus has made a transition to the "portal display" status and the broadcast independent app is activated, the status makes a transition to the "broadcast independent app execution" status. Note that, when the receiver apparatus has made a transition to the "portal display" status and to display broadcasting is selected, the status makes a transition to the "broadcast reception (AV-only reproduction)" status. When the receiver apparatus is powered off, the status makes a transition to the "terminal operation stop" status.

When the receiver apparatus has made a transition to the "broadcast independent app execution" status and the API for selecting broadcasting is executed to use broadcast resources, the status makes a transition to the "broadcast reception (AV reproduction+broadcast independent app execution)" status. In other words, in this case, the determining process of accessibility to broadcast resources by the broadcast independent app is executed by using the TPT for broadcast independent app. When the broadcast independent app has access authority, the "broadcast reception (AV reproduction+broadcast independent app execution)" status is remained, and the broadcast independent app continues the operations.

To the contrary, when the broadcast independent app does not have access authority in the accessibility determining process, the status makes a transition to the "broadcast independent app execution" status or the "broadcast reception (AV-only reproduction)" status. In other words, in this case, use of broadcast resources by the broadcast independent app is not permitted. So, in the Case A, the receiver apparatus makes a transition to the "broadcast independent app execution" status, and displays the "app-only display screen" (FIG. 7). Further, in the Case B, the receiver apparatus makes a transition to the "broadcast reception (AV-only reproduction)" status, and displays the "broadcast full screen" (FIG. 7).

Note that, when the receiver apparatus has made a transition to the "broadcast independent app execution" status and the broadcast independent app is terminated, the status makes a transition to the "portal display" status. Further, when the receiver apparatus has made a transition to the "broadcast independent app execution" status or the "broadcast reception (AV reproduction+broadcast independent app execution)" status and is powered off, the status makes a transition to the "terminal operation stop" status.

(Operations of Receiver Apparatus)

Figure 15:
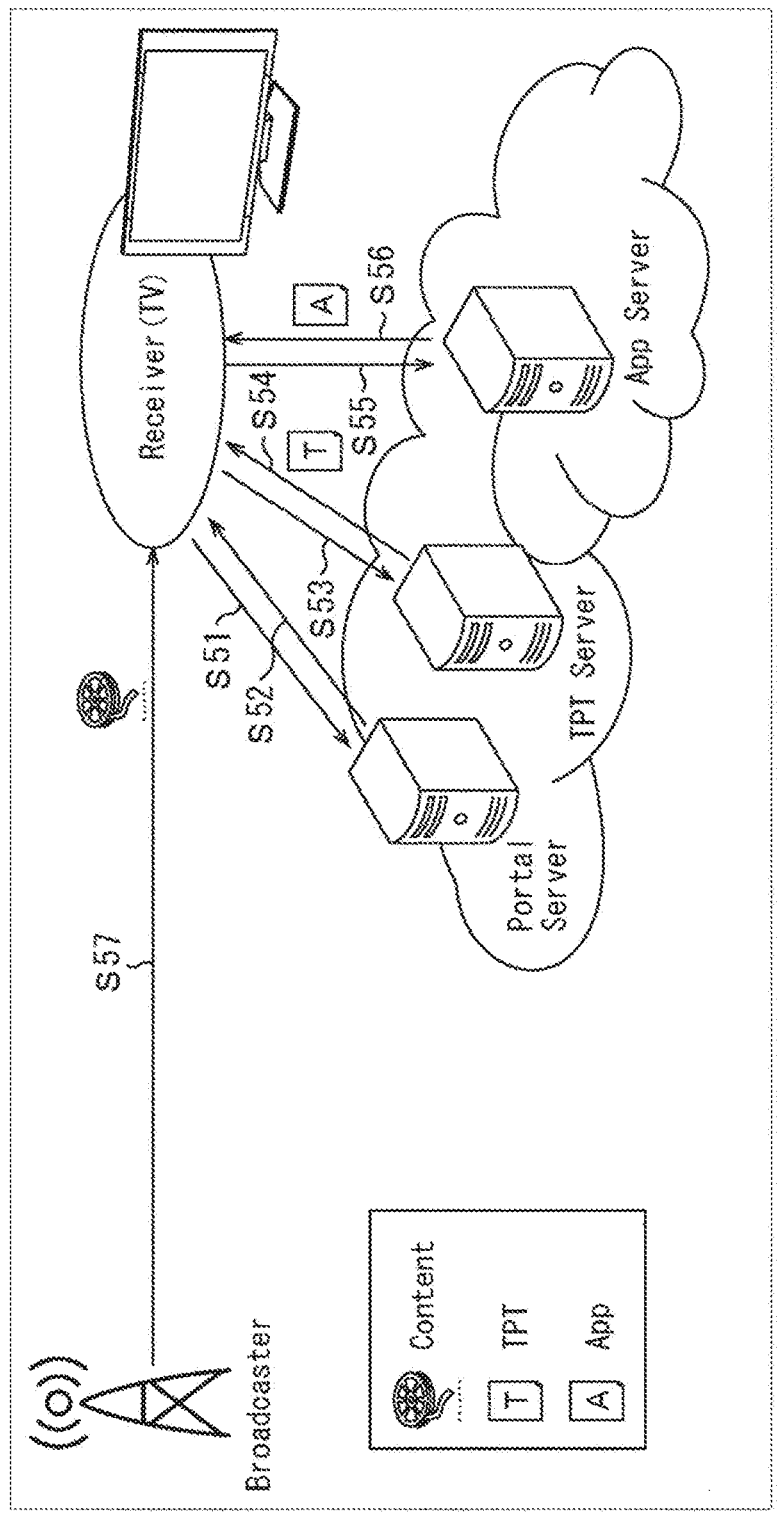
FIG. 15 A diagram showing the operations of the receiver apparatus that executes the broadcast independent app.

FIG. 15 is a diagram showing operations of the receiver apparatus that executes the broadcast independent app.

In FIG. 15, when the receiver apparatus is instructed to display a portal site, the receiver apparatus accesses the portal server via the network, and requests a web page of the portal site (S51). In response to the request from the receiver apparatus, the portal server transmits the web page of the portal site to the receiver apparatus via the network (S52). The receiver apparatus displays the web page of the portal site received from the portal server.

When the broadcast independent app is selected on the portal site, the receiver apparatus accesses the TPT server via the network, and requests the TPT for broadcast independent app (S53). In response to the request from the receiver apparatus, the TPT server transmits the TPT for broadcast independent app ("TPT" of FIG. 15) to the receiver apparatus via the network (S54). The receiver apparatus receives and holds the TPT for broadcast independent app transmitted from the TPT server.

The receiver apparatus verifies the electronic signature described in the TPT for broadcast independent app by using the broadcasting station public key certificate that the receiver apparatus holds in advance. Then, when the receiver apparatus verified the electronic signature, the receiver apparatus accesses the application server on the basis of the TPT for broadcast independent app, and requests the broadcast independent app (S55). In response to the request from the receiver apparatus, the application server transmits the broadcast independent app ("App" of FIG. 15) to the receiver apparatus via the network (S56). The receiver apparatus receives and activates the broadcast independent app transmitted from the application server.

Here, when the broadcast independent app being executed requests to access broadcast resources, e.g., to select a broadcast service, the receiver apparatus performs the accessibility determining process. In the accessibility determining process, the receiver apparatus determines whether the broadcast independent app has authority to access broadcast resources, of which selection is instructed, or not on the basis of the broadcast permission information described in the TPT for broadcast independent app.

When authority to access broadcast resources by the broadcast independent app is permitted in the accessibility determining process, the receiver apparatus makes a transition to the "broadcast reception (AV reproduction+broadcast independent app execution)" status of FIG. 14, and displays the "app+broadcast screen" (FIG. 7). To the contrary, when authority to access broadcast resources by the broadcast independent app is not permitted, the receiver apparatus makes a transition to the "broadcast independent app execution" status of FIG. 14 or the "broadcast reception (AV-only reproduction)" status of FIG. 14, and displays the "app-only display screen" (FIG. 7) in the Case A or the "broadcast full screen" (FIG. 7) in the Case B.

(Description Example of TPT for Broadcast Independent App)

Figure 16:
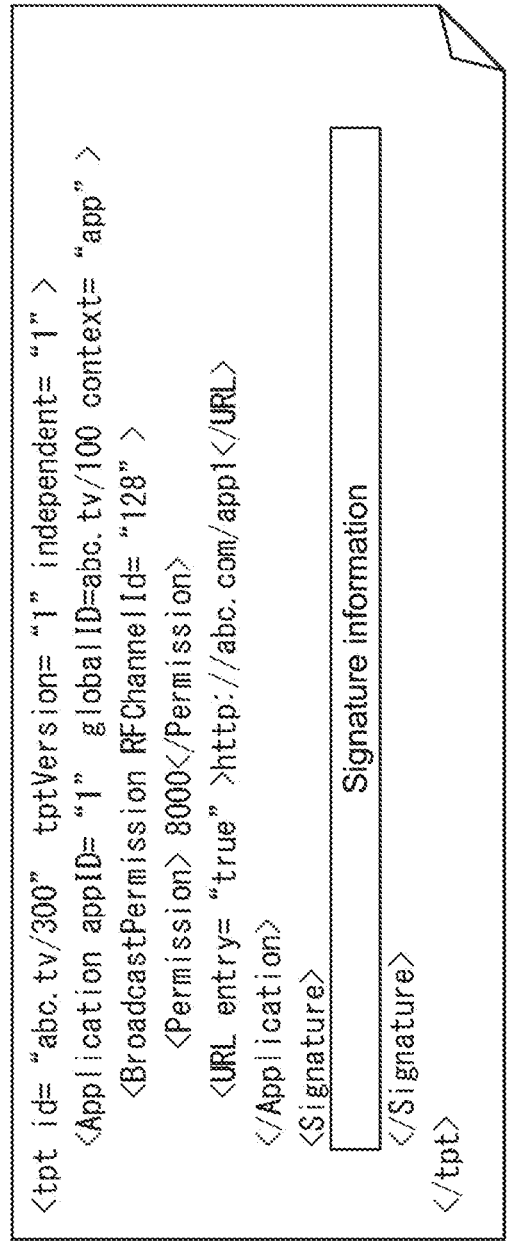
FIG. 16 A diagram showing a description example of the TPT for broadcast independent app.

FIG. 16 is a diagram showing a description example of the TPT for broadcast independent app.

In FIG. 16, "abc.tv/300" is specified for id attribute of tpt element, and "1" is specified for tptVersion attribute. Further, "1" is specified for independent attribute of tpt element, and it means that the TPT of FIG. 16 is the TPT for broadcast independent app.

Application element and Signature element are described in tpt element. Application ID="1" is specified by appID attribute and global ID="abc.tv/100" is specified by globalID attribute for the broadcast independent app of Application element. Further, "app" specified for context attribute means that the receiver apparatus continues the operations of the broadcast independent app and displays the "app-only display screen" (FIG. 7) of the Case A when authority to access broadcast resources by the broadcast independent app is not permitted.

BroadcastPermission element and URL element are described in Application element. "8000" is specified for Permission element in BroadcastPermission element as authority to access each broadcast resource. So the receiver apparatus performs the accessibility determining process by using the broadcast permission information. In the accessibility determining process, the receiver apparatus determines whether independent app has authority to access a broadcast service of a broadcasting station whose RF channel ID is "128".

"http://abc.com/app1" is specified for URL element as URL, from which the broadcast independent app is obtained. Further, "true" specified for entry attribute of the URL element means that this URL is entered.

An electronic signature is described in Signature element as signature information. The electronic signature is used in the verification process executed by the receiver apparatus, which has received TPT of FIG. 16, by using the broadcasting station public key certificate.

(TPT Syntax for Broadcast Independent App)

FIG. 17 is a diagram showing an example of a TPT syntax for the broadcast independent app. The TPT of FIG. 17 is described in a markup language such as XML, for example.

In FIG. 17, TPT element is described as a root element of TPT. In TPT element, in addition to information for obtaining the broadcast independent app, information used in the verification process, the accessibility determining process, and the like, and other information are described.

TPT element is a parent element of majorProtocolVersion attribute, minorProtocolVersion attribute, id attribute, independent attribute, tptVersion attribute, expireDate attribute, baseURL attribute, Capabilities element, Application element, and Signature element.

Information indicating the major version of the spec defined in the TPT is specified for majorProtocolVersion attribute. Information indicating the minor version of the spec defined in the TPT is specified for minorProtocolVersion attribute. ID for identifying the TPT is specified for id attribute.

Information indicating whether TPT is for broadcast related app or for broadcast independent app is specified for independent attribute. "1" is specified since TPT of FIG. 17 is for the broadcast independent app.

Information indicating the version of the TPT is specified for tptVersion attribute. Information indicating the expire date of the TPT is specified for expireDate attribute. URL, which is the base of URL specified in the TPT, is specified for baseURL attribute. So a relative path on the basis of the base URL may be specified for each of the other URLs specified in the TPT.

Information indicating a function, which is required for the receiver apparatus when using the TPT, is specified for Capabilities element. In other words, when the receiver apparatus has the function specified by Capabilities element, the receiver apparatus determines that the receiver apparatus is capable of using the TPT.

Application element is a child element of TPT element. Information about the broadcast independent app is described in Application element. Application element is a parent element of appID attribute, appType attribute, appName attribute, globalId attribute, appVersion attribute, cookieSpace attribute, expireDate attribute, context attribute, BroadcastPermission element, URL element, ApplicationBoundary element, and ContentItem element.

Application ID for identifying the broadcast independent app is specified for appID attribute. Information about a file attribute and the like of the broadcast independent app is specified for appType attribute. Information indicating the name of the broadcast independent app is specified for appName attribute.

A global ID globally-identifiable the broadcast independent app is specified for globalId attribute. Global ID is specified by using URI, for example. Information indicating the version of the broadcast independent app is specified for appVersion attribute. Information indicating the storage volume necessary to execute the broadcast independent app is specified for cookieSpace attribute. Information indicating the expire date of the broadcast independent app is specified for expireDate attribute.

Information indicating whether to continue the operations of the broadcast independent app or not when authority to access broadcast resources by the broadcast independent app is not permitted is specified for context attribute. For example, when "app" is specified for context attribute, the operations of the broadcast independent app is continued and the "app-only display screen" (FIG. 7) of the Case A is displayed. Further, when "broadcast" is specified for context attribute, the broadcast independent app is terminated and the "broadcast full screen" (FIG. 7) of the Case B is displayed.

Broadcast permission information is specified for BroadcastPermission element as authority to access each broadcast resource. Note that content of BroadcastPermission element will be described later in more detail with reference to FIG. 18.

URL, from which the broadcast independent app is obtained, is specified for URL element. For example, URL of the application server is specified for URL element. URL element is a parent element of entry attribute. Information indicating whether URL is entered or not is specified for entry attribute. For example, a file, which is necessary to obtain first, such as index.html is entered when URLs are specified for URL element. Then it is possible to obtain resource related thereto collectively.

Information indicating the range of URL that the broadcast independent app is operable is specified for ApplicationBoundary element. ApplicationBoundary element is a parent element of OriginalURL element. A URL that the broadcast independent app is operable is specified for OriginalURL element.

Information about cache of a file (for example, HTML file and JPEG file) of the broadcast independent app is described in ContentItem element. ContentItem element is a parent element of URL element and size attribute. URL of a file to be cached is specified for URL attribute. URL element is a parent element of entry attribute. Information indicating whether URL is entered or not is specified for entry attribute. Information indicating the size of the file to be cached is specified for size attribute.

Signature element is a child element of TPT element. An electronic signature is described in Signature element as signature information. The electronic signature is used in the verification process executed by the receiver apparatus, which has received TPT, by using the broadcasting station public key certificate.

Note that the TPT syntax for the broadcast independent app of FIG. 17 is merely an example, and elements and attributes may be added and deleted depending on the operations.

Further, comparing the TPT for broadcast independent app of FIG. 17 with the TPT for broadcast related app of FIG. 6, the TPT for broadcast independent app is a subset of the TPT for broadcast related app where independent attribute, context attribute and BroadcastPermission element of Application element, and Signature element are added to the TPT for broadcast independent app. Further, only one Application element is described since the TPT for broadcast independent app of FIG. 17 is the TPT for the predetermined broadcast independent app. In addition, description of an event is omitted since only an execute command ("exec") is prepared as a command.

(Detailed Content of BroadcastPermission Element)

FIG. 18 is a diagram showing the content of BroadcastPermission element of FIG. 17 in detail.

Broadcast permission information is specified for BroadcastPermission element as authority to access each broadcast resource. BroadcastPermission element is a parent element of RFChannelId attribute, BBPStreamId attribute, ServiceIId attribute, and Permission element.

RF channel ID is specified for RFChannelId attribute. RF channel ID is assigned for each broadcaster (broadcasting station) in broadcast waves having a predetermined frequency band in digital broadcasting of the IP (Internet Protocol) transmission system. Further, BBP stream ID is specified for BBPStreamId attribute. BBP stream ID is assigned to BBP stream (Base Band Packet Stream) transmitted via broadcast waves identified by RF channel ID. Service ID is specified for ServiceId attribute. Service ID is assigned to each service including video and audio data transmitted via BBP stream identified by BBP stream ID.

In other words, the ID system of the IP transmission system employs the configuration corresponding to the combination (hereinafter referred to as "triplet".) of a network ID, a transport stream ID, a service ID used in the MPEG2-TS (Moving Picture Expert Group 2—Transport Stream) system. The triplet indicates the BBP stream configuration and the service configuration of a broadcast network. Note that RF channel ID and BBP stream ID of the ID system of the IP transmission system correspond to network ID and transport stream ID of the MPEG2-TS system.

Authority to access each broadcast resource specified by triplet is specified for Permission element by using bitmap. For example, let's say that, as shown in an assignment example of a permission bitmap of FIG. 19, information indicating broadcast program image sub-screen reference permissibility is assigned to the MSB (Most Significant Bit) bit out of 16 bits. In this case, the specified RF channel ID="128" means that independent app has access authority of broadcast program image sub-screen display reference permissibility about a broadcast service of a broadcasting station whose RF channel ID is "128".

Therefore, in this case, when the broadcast independent app being executed requests to access a broadcast service of a broadcasting station whose RF channel ID is "128", the receiver apparatus makes a transition to the "broadcast reception (AV reproduction+broadcast independent app execution)" status of FIG. 14 and displays the "app+broadcast screen" (FIG. 7). In other words, the operations of the broadcast independent app continue and an image of a broadcast program of the broadcasting station whose RF channel ID is "128" is displayed on the sub screen of the "app+broadcast screen" (FIG. 7).

Figure 19:
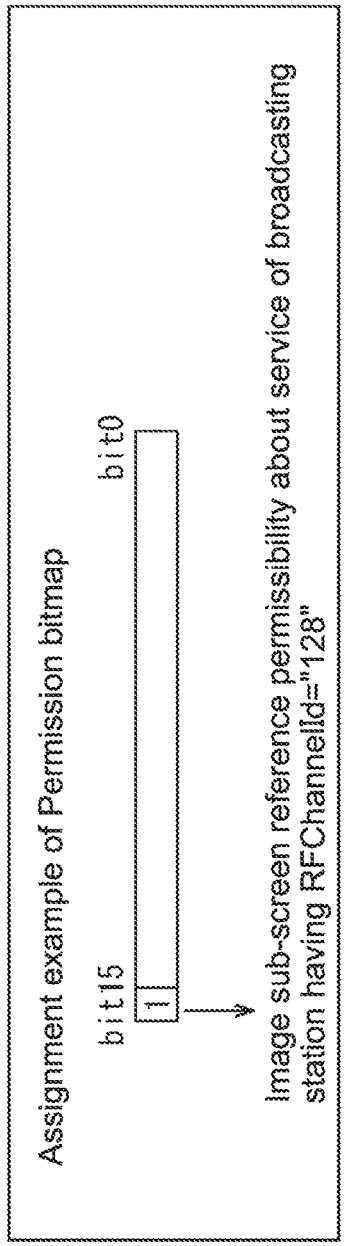
FIG. 19 A diagram showing an example of a permission bitmap.

Note that access authority of broadcast program image sub-screen display reference permissibility has been described with reference to the assignment example of a permission bitmap of FIG. 19. Alternatively, for example, other access authority may be specified such as access authority of overlay display reference permissibility and access authority of electronic service guide (ESG) display reference permissibility.

Hereinabove, the broadcast independent application (broadcast independent app) executed by the receiver apparatus capable of not only receiving digital broadcasting signals but also receiving applications distributed via the Internet has been described.

<3. System Configuration>

(Configuration Example of Broadcast Communication System)

Figure 20:
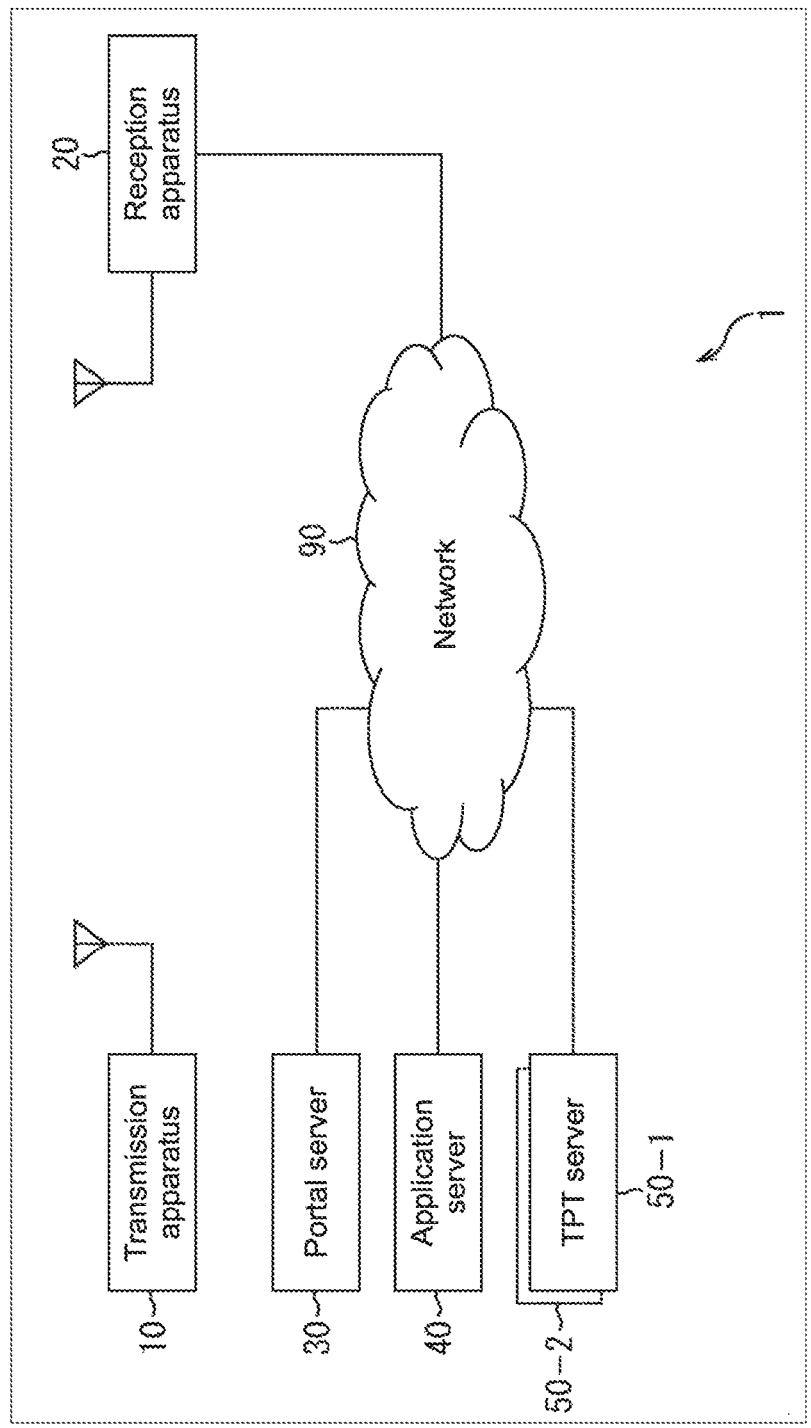
FIG. 20 A diagram showing a configuration example of the broadcast communication system.

FIG. 20 is a diagram showing a configuration example of the broadcast communication system. Note that the system means a group including a plurality of configuration elements (apparatuses and the like).

The broadcast communication system 1 of FIG. 20 has the configuration realizing the above-mentioned first embodiment and second embodiment. In other words, in FIG. 20, the broadcast communication system 1 includes the transmission apparatus 10, the reception apparatus 20, the portal server 30, the application server 40, the TPT server 50-1, and the TPT server 50-2. Further, the reception apparatus 20 is connected to the portal server 30, the application server 40, the TPT server 50-1, and the TPT server 50-2 via the network 90.

The transmission apparatus 10 transmits AV content such as broadcast programs via digital broadcasting signals. Further, the transmission apparatus 10 transmits trigger information for controlling the operations of the broadcast related app, the trigger information being contained in the digital broadcasting signals. Note that the trigger information is inserted in video data or audio data of AV content or is in a stream transmitted via digital broadcasting signals, and is thereby transmitted.

Note that the transmission apparatus 10 corresponds to the above-mentioned transmitting apparatus (for example, "Broadcaster" of FIG. 10 and FIG. 15), is provided by a broadcaster, and is installed in the broadcasting station. Further, the transmission apparatus 10 is capable of transmitting a file of the broadcasting station public key certificate in a FLUTE session.

The reception apparatus 20 receives digital broadcasting signals transmitted from the transmission apparatus 10, and obtains and outputs images and sounds of AV content.

The reception apparatus 20 accesses the portal server 30 via the network 90, and obtains a web page of a portal site. The reception apparatus 20 displays the portal site on the basis of the web page obtained from the portal server 30.

The reception apparatus 20 accesses the application server 40 via the network 90, and obtains the broadcast independent app. The reception apparatus 20 executes the broadcast independent app obtained from the application server 40.

The reception apparatus 20 accesses the TPT server 50-1 via the network 90, and obtains the TPT for broadcast independent app. Further, the reception apparatus 20 accesses the TPT server 50-2 via the network 90, and obtains the TPT for broadcast related app. The reception apparatus 20 controls the operations of the broadcast independent app on the basis of the TPT for broadcast independent app obtained from the TPT server 50-1 or the TPT for broadcast related app obtained from the TPT server 50-2.

Note that the reception apparatus 20 corresponds to the above-mentioned receiver apparatus (for example, "Receiver (TV)" of FIG. 10 and FIG. 15), and is installed in a home or the like. Further, the reception apparatus 20 may not be a television receiver. Alternatively, the reception apparatus 20 may not have a display or a speaker and may be built in an electronic apparatus such as a video recorder.

In response to the request from the reception apparatus 20, the portal server 30 provides the web page of the portal site to the reception apparatus 20 via the network 90. Note that the portal server 30 corresponds to the above-mentioned portal server (for example, "Portal Server" of FIG. 10 and FIG. 15).

In response to the request from the reception apparatus 20, the application server 40 provides the broadcast independent app to the reception apparatus 20 via the network 90. Note that the transmission apparatus 10 corresponds to the above-mentioned application server (for example, "App Server" of FIG. 10 and FIG. 15), and is provided by an application creator, a broadcaster, or another service provider.

In response to the request from the reception apparatus 20, the TPT server 50-1 provides the TPT for broadcast independent app to the reception apparatus 20 via the network 90. Further, in response to the request from the reception apparatus 20, the TPT server 50-2 provides the TPT for broadcast related app to the reception apparatus 20 via the network 90.

Note that the TPT server 50-1 corresponds to the above-mentioned TPT server (for example, "TPT Server" of FIG. 10 and FIG. 15), and is provided by a service provider such as a third party different from the broadcaster. Further, the TPT server 50-2 corresponds to the above-mentioned TPT server (for example, "TPT Server" of FIG. 10 and FIG. 15), and is provided by a broadcaster. Further, in the following description, the TPT server 50-1 and the TPT server 50-2 will be simply referred to as the TPT server 50 when it is not particularly necessary to distinguish between them. Note that the TPT server 50 may also be referred to as a transmission apparatus that transmits the TPT.

The broadcast communication system 1 is configured as described above. Next, configuration examples of the apparatuses of the broadcast communication system 1 of FIG. 20 will be described.

(Configuration Example of Transmission Apparatus)

Figure 21:
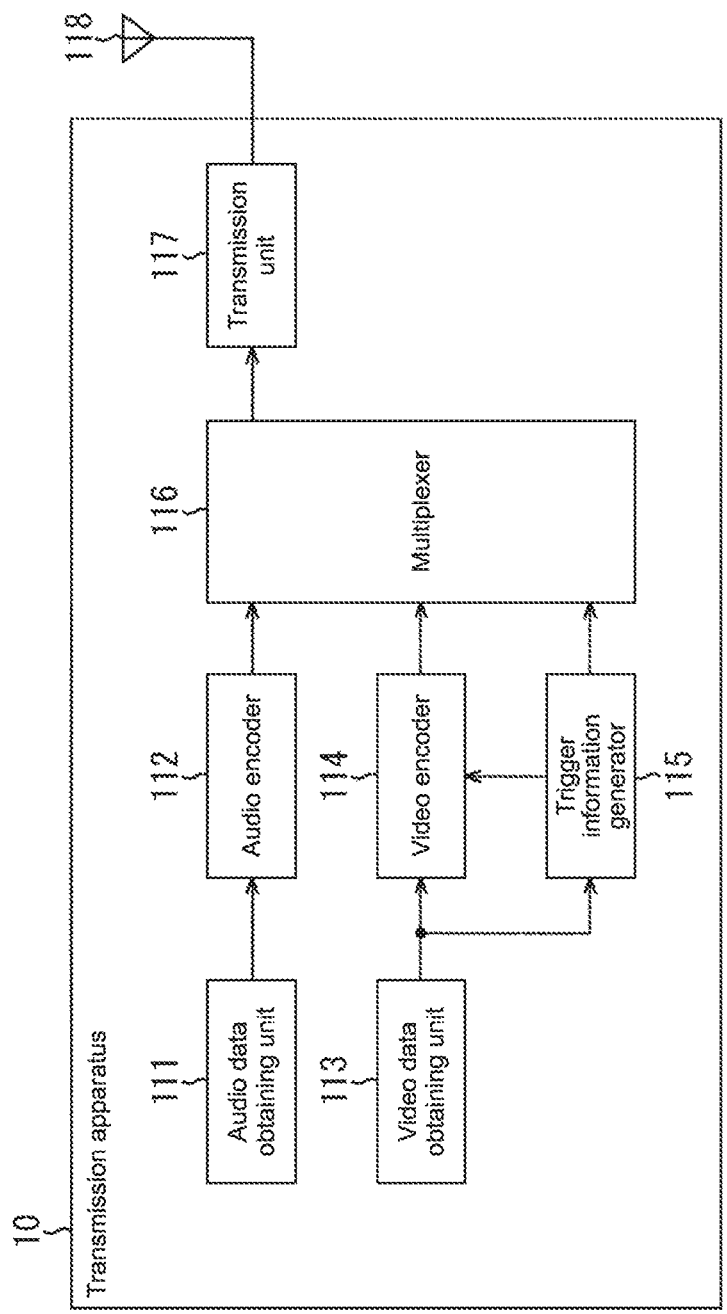
FIG. 21 A diagram showing a configuration example of the transmission apparatus.

FIG. 21 is a diagram showing a configuration example of the transmission apparatus of FIG. 20.

In FIG. 21, the transmission apparatus 10 includes the audio data obtaining unit 111, the audio encoder 112, the video data obtaining unit 113, the video encoder 114, the trigger information generator 115, the multiplexer 116, and the transmission unit 117.

The audio data obtaining unit 111 obtains audio data of AV content from an external server, a microphone, a recording medium, or the like, and supplies the obtained audio data to the audio encoder 112. The audio encoder 112 encodes the audio data supplied from the audio data obtaining unit 111 in compliant with an encoding system such as MPEG (Moving Picture Experts Group), and supplies the encoded audio data to the multiplexer 116.

The video data obtaining unit 113 obtains video data of AV content from an external server, a camera, a recording medium, or the like, and supplies the obtained video data to the video encoder 114 and the trigger information generator 115. The video encoder 114 encodes the video data supplied from the video data obtaining unit 113 in compliant with an encoding system such as MPEG, and supplies the encoded video data to the multiplexer 116.

The trigger information generator 115 generates trigger information with progress of AV content corresponding to the video data supplied from the video data obtaining unit 113, and supplies the generated trigger information to the video encoder 114 or the multiplexer 116. When encoding video data, the video encoder 114 may embed trigger information supplied from the trigger information generator 115 in the video data, and encode the video data.

The multiplexer 116 multiplexes the audio data from the audio encoder 112 and the video data from the video encoder 114, and supplies a stream obtained as the result to the transmission unit 117. Further, when the trigger information is supplied from the trigger information generator 115, the multiplexer 116 multiplexes the audio data, the video data, and the trigger information, and thereby generates a stream.

The transmission unit 117 transmits the stream supplied from the multiplexer 116 via the antenna 118 as a digital broadcasting signal.

Note that, in the example of FIG. 21, the trigger information is embedded in video data or is multiplexed in a stream. Alternatively, the trigger information may be provided according to another method. For example, the trigger information may be embedded in audio data.

(Configuration Example of Reception Apparatus)

Figure 22:
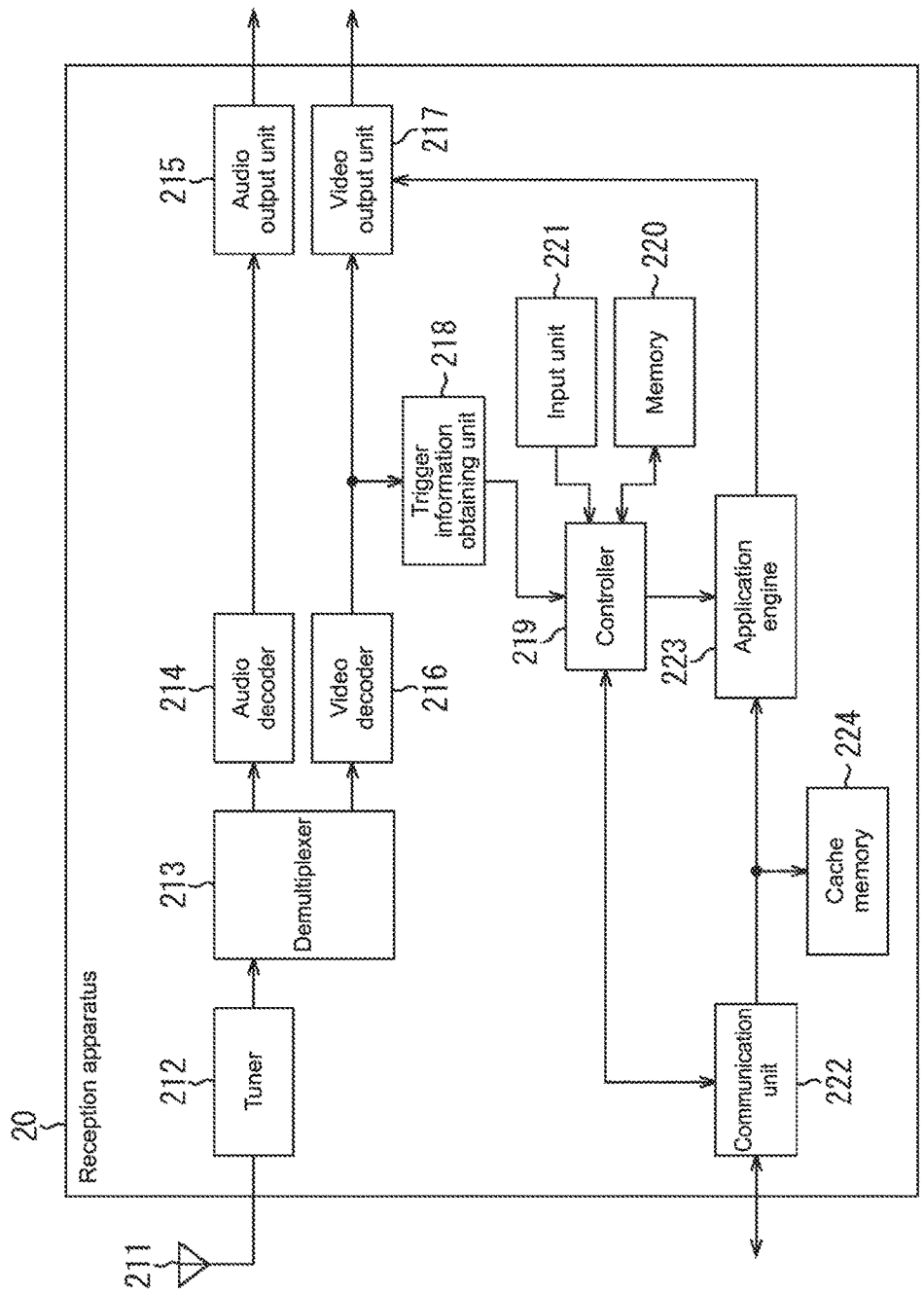
FIG. 22 A configuration example of the reception apparatus.

FIG. 22 is a configuration example of the reception apparatus of FIG. 20.

In FIG. 22, the reception apparatus 20 includes the tuner 212, the demultiplexer 213, the audio decoder 214, the audio output unit 215, the video decoder 216, the video output unit 217, the trigger information obtaining unit 218, the controller 219, the memory 220, the input unit 221, the communication unit 222, the application engine 223, and the cache memory 224.

The tuner 212 selects/demodulates a digital broadcasting signal received via the antenna 211, and supplies the stream obtained as the result to the demultiplexer 213. The demultiplexer 213 demultiplexes the stream supplied from the tuner 212, thereby obtains audio data and video data, and supplies the audio data and the video data to the audio decoder 214 and the video decoder 216.

The audio decoder 214 decodes the audio data supplied from the demultiplexer 213 in compliant with a decoding system corresponding to the encoding system of the audio encoder 112 (FIG. 21), and supplies the audio data obtained as the result to the audio output unit 215.

The audio output unit 215 outputs the audio data supplied from the audio decoder 214 to a speaker (not shown). The speaker outputs sounds corresponding to the audio data supplied from the audio output unit 215.

The video decoder 216 decodes the video data supplied from the demultiplexer 213 in compliant with a decoding system corresponding to the encoding system of the video encoder 114 (FIG. 21), and supplies the video data obtained as the result to the video output unit 217 and the trigger information obtaining unit 218.

The video output unit 217 outputs the video data supplied from the video decoder 216 to a display (not shown). The display outputs images corresponding to the video data supplied from the video output unit 217. As a result, for example, the "broadcast full screen" (FIG. 7) is displayed.

The trigger information obtaining unit 218 always monitors video data supplied from the video decoder 216, obtains trigger information embedded in the video data, and supplies the obtained trigger information to the controller 219. Note that, when trigger information is in a stream, the trigger information obtaining unit 218 monitors a packet containing trigger information, which is obtained by demultiplexing the stream by the demultiplexer 213, and obtains the trigger information from the packet.

The controller 219 controls the operations of the respective units of the reception apparatus 20 on the basis of the operation signals from the input unit 221 and the like. The memory 220 is controlled by the controller 219, and thereby records various kinds of data. The input unit 221 receives the operations by a user, and supplies the operation signals corresponding thereto to the controller 219. Further, the controller 219 controls the communication unit 222 on the basis of the trigger information supplied from the trigger information obtaining unit 218.

The communication unit 222 is controlled by the controller 219, thereby accesses the TPT server 50 via the network 90, and requests the TPT. The communication unit 222 receives the TPT transmitted from the TPT server 50 via the network 90, and supplies the received TPT to the controller 219. The controller 219 obtains the TPT supplied from the communication unit 222, and records the obtained TPT in the memory 220. Further, the controller 219 controls the application engine 223 on the basis of the TPT.

The application engine 223 is controlled by the controller 219, thereby controls the communication unit 222, accesses the application server 40 via the network 90, and requests the broadcast independent app. The communication unit 222 receives the broadcast independent app transmitted from the application server 40 via the network 90, and records the received broadcast independent app in the cache memory 224.

The application engine 223 is controlled by the controller 219, thereby reads the broadcast independent app recorded in the cache memory 224, and executes the broadcast independent app. The video data of the thus executed broadcast independent app is supplied to the video output unit 217.

The video output unit 217 displays images of the video data supplied from the application engine 223 on the display. As a result, for example, the "app screen" (FIG. 7) and the "app-only display screen" (FIG. 7) are displayed. Further, the video output unit 217 synthesizes the video data supplied from the application engine 223 and the video data supplied from the video decoder 216, and displays the thus obtained image on the display. As a result, for example, the "app+broadcast screen" (FIG. 7) is displayed.

Note that the web page of the portal site is obtained from the portal server 30 similar to the broadcast independent app obtained from the application server 40, and the image of the web page is output from the video output unit 217 and displayed on the display. As a result, for example, the "portal screen" (FIG. 7) is displayed.

(Configuration Example of Controller)

Figure 23:
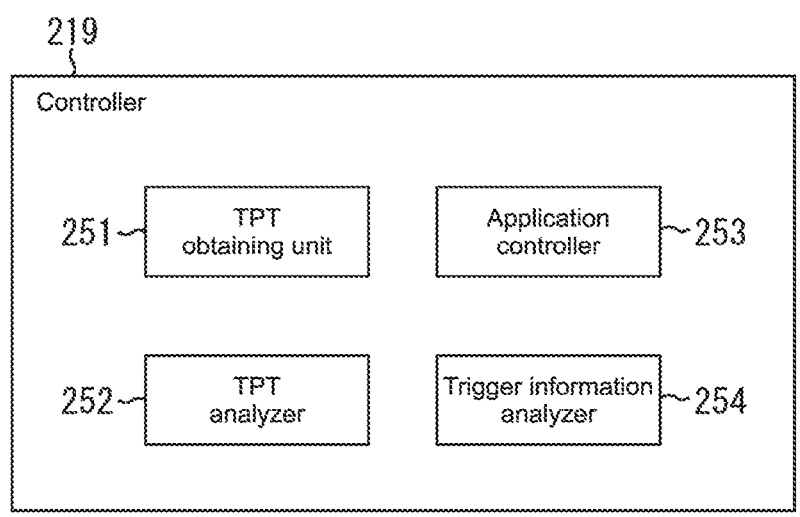
FIG. 23 A diagram showing a configuration example of the controller.

FIG. 23 is a diagram showing a functional configuration example showing part of the controller 219 of FIG. 22, the part performing processing about the broadcast independent app.

In FIG. 23, the controller 219 includes the TPT obtaining unit 251, the TPT analyzer 252, the application controller 253, and the trigger information analyzer 254.

The TPT obtaining unit 251 controls the communication unit 222 (FIG. 22), thereby accesses the TPT server 50-1 via the network 90, obtains the TPT for broadcast independent app, and supplies the obtained TPT for broadcast independent app to the TPT analyzer 252.

Further, the TPT obtaining unit 251 controls the communication unit 222 (FIG. 22) on the basis of the result of analyzing the trigger information supplied from the trigger information analyzer 254 (described later), accesses the TPT server 50-2 via the network 90, obtains the TPT for broadcast related app, and supplies the obtained TPT for broadcast related app to the TPT analyzer 252.

The TPT analyzer 252 analyzes the TPT for broadcast independent app supplied from the TPT obtaining unit 251. Further, the TPT analyzer 252 analyzes the TPT for broadcast related app supplied from the TPT obtaining unit 251. The results of analyzing the TPTs are supplied to the application controller 253.

The application controller 253 controls the application engine 223 (FIG. 22) on the basis of the result of analyzing the TPT for broadcast independent app supplied from the TPT analyzer 252, thereby accesses the application server 40 via the network 90, and obtains the broadcast independent app.

Further, the application controller 253 controls the application engine 223 (FIG. 22) on the basis of the result of analyzing the TPT supplied from the TPT analyzer 252 and the like, and controls the operations of the broadcast independent app.

The trigger information analyzer 254 analyzes the trigger information supplied from the trigger information obtaining unit 218 (FIG. 22), and supplies the analysis result to the TPT obtaining unit 251.

(Configuration Examples of Servers)

Figure 24:
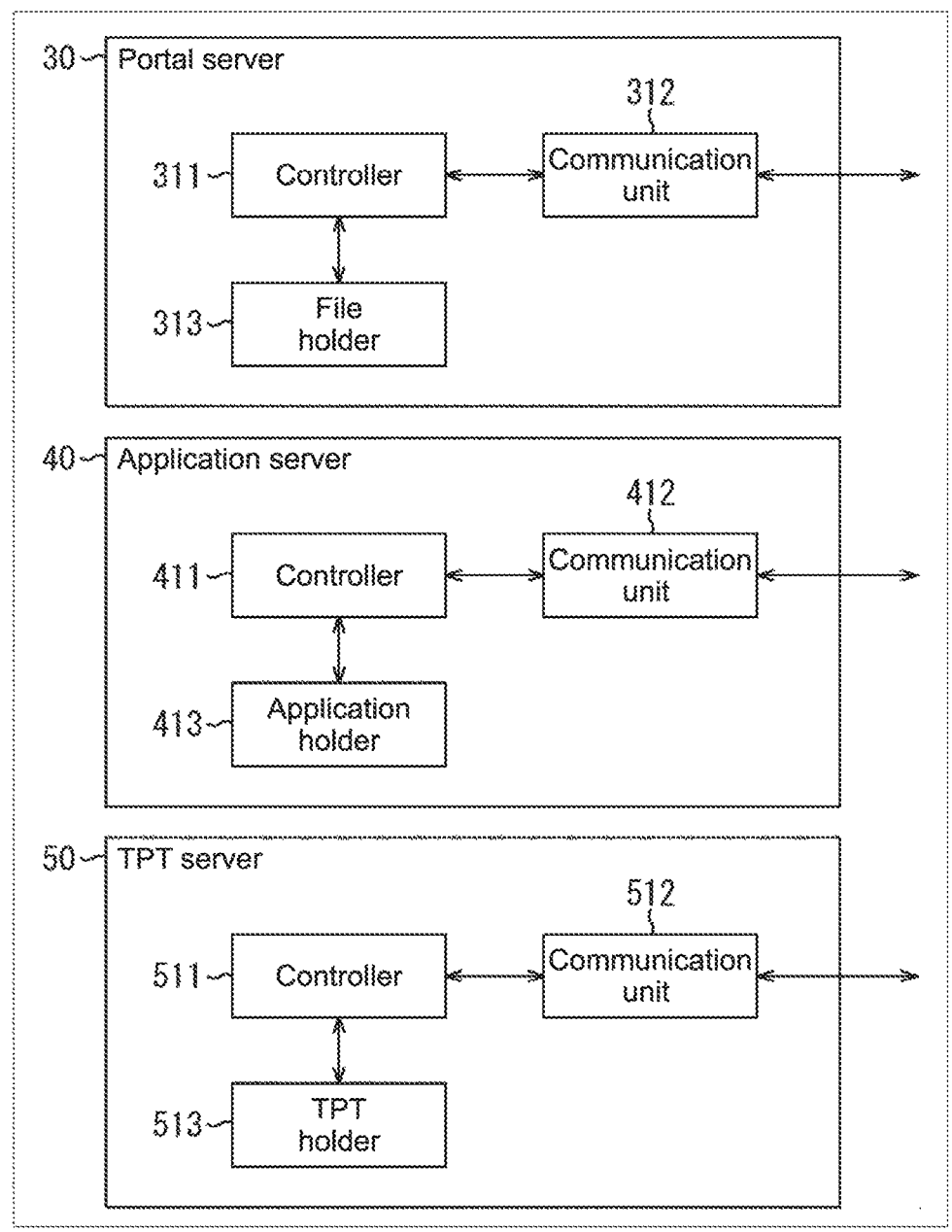
FIG. 24 A diagram showing configuration examples of the servers.

FIG. 24 is a diagram showing configuration examples of the servers of FIG. 20. FIG. 24 shows configuration examples of the portal server 30, the application server 40, and the TPT server 50.

In FIG. 24, the portal server 30 includes the controller 311, the communication unit 312, and the file holder 313. The controller 311 controls the operations of the respective units of the portal server 30. The communication unit 312 is controlled by the controller 311, and thereby communicates with the reception apparatus 20 via the network 90. The file holder 313 holds various files (for example, HTML file, JPEG file, and the like) of the web page of the portal site. Note that the controller 311 may generate the web page of the portal site, or the communication unit 312 may obtain the web page of the portal site from an external server or the like via the network 90.

The controller 311 always monitors the communication status of the communication unit 312. When the reception apparatus 20 requests a portal site, the controller 311 obtains the web page of the portal site from the file holder 313, and supplies the web page to the communication unit 312. The communication unit 312 is controlled by the controller 311, and thereby transmits the web page of the portal site to the reception apparatus 20, which has output the request, via the network 90.

The portal server 30 is configured as described above.

In FIG. 24, the application server 40 includes the controller 411, the communication unit 412, and the application holder 413. The controller 411 controls the operations of the respective units of the application server 40. The communication unit 412 is controlled by the controller 411, and thereby communicates with the reception apparatus 20 via the network 90. The application holder 413 holds data such as various files (for example, HTML file, JPEG file, and the like) of the broadcast independent app. Note that the controller 411 may generate the broadcast independent app, or the communication unit 412 may obtain the broadcast independent app from an external server or the like via the network 90.

The controller 411 always monitors the communication status of the communication unit 412. When the reception apparatus 20 requests the broadcast independent app, the controller 411 obtains the broadcast independent app from the application holder 413, and supplies the broadcast independent app to the communication unit 412. The communication unit 412 is controlled by the controller 411, and thereby transmits the broadcast independent app to the reception apparatus 20, which has output the request, via the network 90.

The application server 40 is configured as described above.

In FIG. 24, the TPT server 50 includes the controller 511, the communication unit 512, and the TPT holder 513. The controller 511 controls the operations of the respective units of the TPT server 50. The communication unit 512 is controlled by the controller 511, thereby communicates with the reception apparatus 20 via the network 90. The TPT holder 513 holds files of TPT (for example, XML file). Note that the controller 511 may generate the files of TPT, or the communication unit 512 may obtain the files of TPT from an external server or the like via the network 90.

The controller 511 always monitors the communication status of the communication unit 512. When the reception apparatus 20 requests the TPT, the controller 511 obtains the TPT from the TPT holder 513, and supplies the TPT to the communication unit 512. The communication unit 512 is controlled by the controller 511, and thereby transmits the TPT to the reception apparatus 20, which has output the request, via the network 90.

Note that, in the above description, to make the description simple, the TPT server 50-1 and the TPT server 50-2 have been collectively referred to as the TPT server 50. The TPT holder 513-1 of the TPT server 50-1 holds the file of the TPT for broadcast independent app. Further, the TPT holder 513-2 of the TPT server 50-2 holds the TPT for broadcast related app.

The TPT server 50 is configured as described above.

<4. Flows of Processing Executed by Apparatuses>

Next, with reference to the flowcharts of FIG. 25 to FIG. 30, the processing flows executed by the respective apparatuses of the broadcast communication system of FIG. 20 will be described.

(Digital Broadcasting Signal Transmission Processing)

Figure 25:
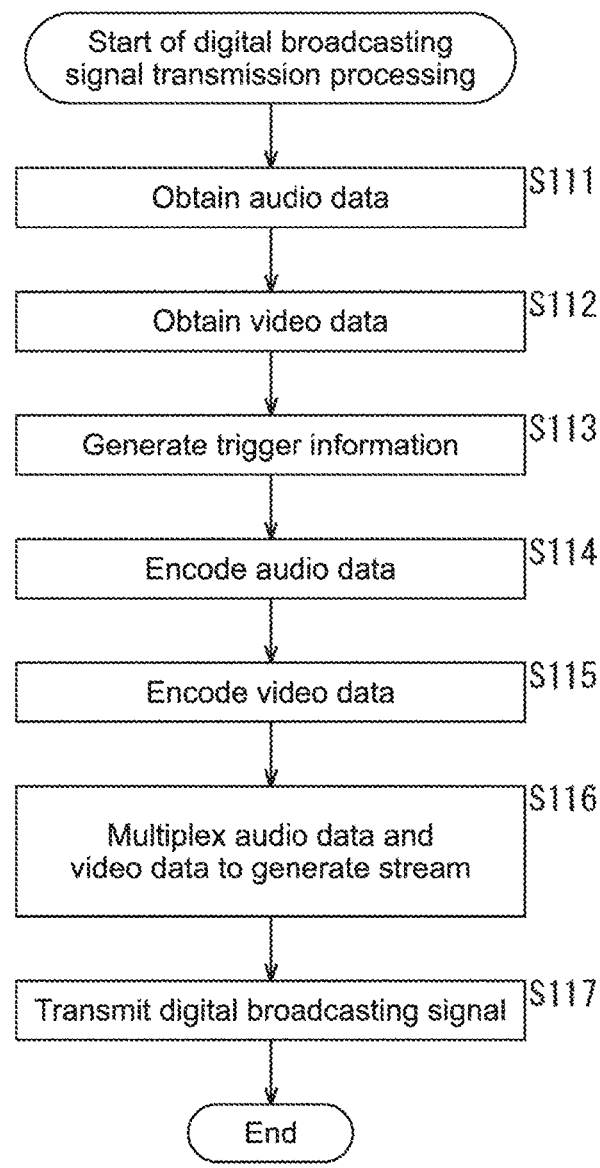
FIG. 25 A flowchart illustrating the digital broadcasting signal transmission processing.

First, with reference to the flowchart of FIG. 25, the flow of the digital broadcasting signal transmission processing executed by the transmission apparatus 10 of FIG. 20 will be described.

In Step S111, the audio data obtaining unit 111 obtains audio data of AV content from an external server or the like, and supplies the obtained audio data to the audio encoder 112. Further, in Step S112, the video data obtaining unit 113 obtains video data of AV content from an external server or the like, and supplies the obtained video data to the video encoder 114 and the trigger information generator 115.

In Step S113, the trigger information generator 115 generates trigger information with progress of AV content corresponding to the video data supplied from the video data obtaining unit 113, and supplies the generated trigger information to the video encoder 114.

In Step S114, the audio encoder 112 encodes the audio data supplied from the audio data obtaining unit 111 in compliant with an encoding system such as MPEG, and supplies the encoded audio data to the multiplexer 116.

In Step S115, the video encoder 114 encodes the video data supplied from the video data obtaining unit 113 in compliant with an encoding system such as MPEG, and supplies the encoded video data to the multiplexer 116. Further, when encoding video data, the video encoder 114 embeds trigger information supplied from the trigger information generator 115 in the video data, and encodes the video data.

In Step S116, the multiplexer 116 multiplexes the audio data from the audio encoder 112 and the video data from the video encoder 114, and supplies a stream obtained as the result to the transmission unit 117.

In Step S117, the transmission unit 117 transmits the stream supplied from the multiplexer 116 via the antenna 118 as a digital broadcasting signal. When the processing of Step S117 is terminated, the digital broadcasting signal transmission processing of FIG. 25 is terminated.

Hereinabove, the digital broadcasting signal transmission processing has been described. Note that, in the description of the example of the digital broadcasting signal transmission processing of FIG. 25, to make the description simple, trigger information is embedded in video data.

(Digital Broadcasting Signal Reception Processing)

Next, with reference to the flowchart of FIG. 26, the flow of the digital broadcasting signal reception processing executed by the reception apparatus 20 of FIG. 20 will be described.

In Step S211, the tuner 212 selects/demodulates a digital broadcasting signal received via the antenna 211. Further, in Step S212, the demultiplexer 213 demultiplexes the stream demodulated by the tuner 212, and thereby obtains audio data and video data.

In Step S213, the audio decoder 214 decodes the audio data obtained as the result of demulplexing by the demultiplexer 213 in compliant with a decoding system corresponding to the encoding system of the audio encoder 112 (FIG. 21), and supplies the audio data obtained as the result to the audio output unit 215.

In Step S214, the video decoder 216 decodes the video data supplied from the demultiplexer 213 in compliant with a decoding system corresponding to the encoding system of the video encoder 114 (FIG. 21), and supplies the video data obtained as the result to the video output unit 217.

In Step S215, the audio output unit 215 outputs the audio data supplied from the audio decoder 214 to a speaker (not shown). Further, in Step S216, the video output unit 217 outputs the video data supplied from the video decoder 216 to a display (not shown). As a result, the display displays images of the AV content, and the speaker outputs sounds in sync with the images.

Figure 26:
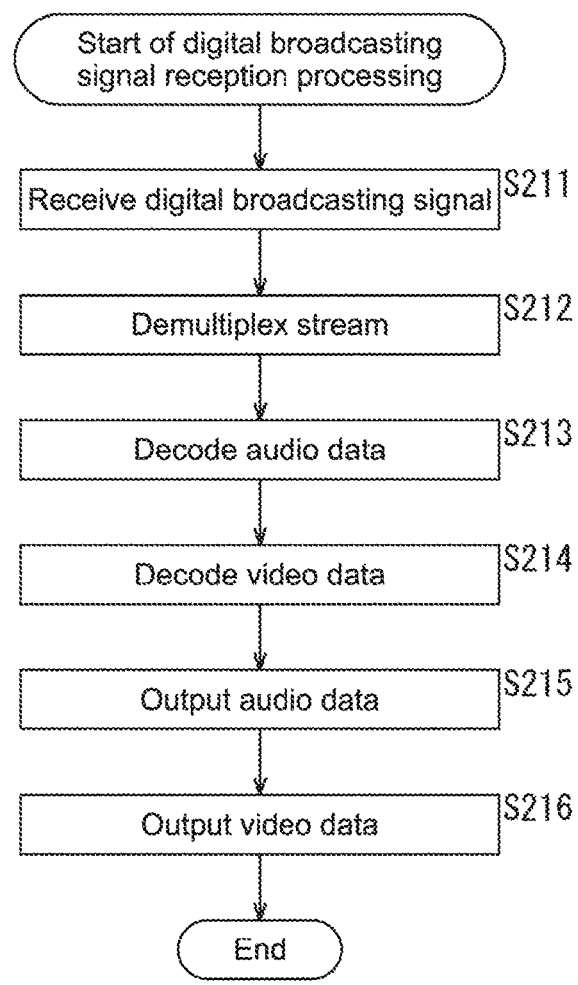
FIG. 26 A flowchart illustrating the digital broadcasting signal reception processing.

When the processing of Step S216 is terminated, the digital broadcasting signal reception processing of FIG. 26 is terminated.

Hereinabove, the digital broadcasting signal reception processing has been described.

(First Processing for Supporting Broadcast Independent App)

Next, with reference to the flowchart of FIG. 27, the flow of the first processing for supporting the broadcast independent app executed by the reception apparatus 20 of FIG. 20 will be described. Note that the first processing for supporting the broadcast independent app corresponds to the above-mentioned first embodiment.

When the "portal screen" (FIG. 7) is displayed in the processing of Step S231, in Step S232, the controller 219 determines whether a user selects the broadcast independent app on the "portal screen" or not on the basis of an operation signal from the input unit 221.

In Step S232, when it is determined that the broadcast independent app is not selected, the determining process of Step S232 is repeated. When the broadcast independent app is selected by a user in Step S232, the processing proceeds to Step S233.

In Step S233, the TPT obtaining unit 251 controls the communication unit 222, thereby accesses the TPT server 50-1 via the network 90, and obtains the TPT for broadcast independent app. The TPT for broadcast independent app is recorded in the memory 220.

In Step S234, the TPT analyzer 252 analyzes the TPT for broadcast independent app obtained in the processing of Step S233, and supplies the analysis result to the application controller 253.

In Step S235, the application controller 253 controls the application engine 223 on the basis of the result of analyzing the TPT obtained in the processing of Step S234, thereby accesses the application server 40 via the network 90, and obtains the broadcast independent app. Note that, when accessing the application server 40, URL specified for URL element of Application element described in the TPT for broadcast independent app (FIG. 12) is used.

In Step S236, the application controller 253 controls the application engine 223, and thereby activates the broadcast independent app obtained in the processing of Step S235. As a result, the reception apparatus 20 executes the broadcast independent app, and the "app screen" (FIG. 7) is displayed.

In Step S237, the application controller 253 determines whether the broadcast independent app being executed has selected a broadcast service (for example, broadcast program) or not. When it is determined that the broadcast independent app has not selected a broadcast service in Step S237, the determining process of Step S237 is repeated. When the broadcast independent app selects a broadcast service in Step S237, the processing proceeds to Step S238.

In Step S238, the trigger information obtaining unit 218 obtains trigger information embedded in video data supplied from the video decoder 216, and supplies the obtained trigger information to the trigger information analyzer 254.

In Step S239, the trigger information analyzer 254 analyzes the trigger information obtained in the processing of Step S238.

In Step S240, the TPT obtaining unit 251 controls the communication unit 222 on the basis of the result of analyzing the trigger information obtained in the processing of Step S239, accesses the TPT server 50-2 via the network 90, and obtains the TPT for broadcast related app. The TPT for broadcast related app is recorded in the memory 220.

In Step S241, the TPT analyzer 252 analyzes the TPT for broadcast related app obtained in the processing of Step S240.

In Step S242, the TPT analyzer 252 determines whether continuation of the operation using broadcast resources by the broadcast independent app is permitted or not on the basis of the result of analyzing the TPT for broadcast independent app obtained in the processing of Step S234 and on the basis of the result of analyzing the TPT for broadcast related app obtained in the processing of Step S241.

Specifically, use of broadcast resources by the broadcast independent app is permitted when the broadcast related app is described in the TPT for broadcast related app (FIG. 6), where the global ID value of the broadcast related app is the same as the global ID value of the broadcast independent app being executed, where the value of a URL (where entry="true") from which the broadcast related app is obtained is the same as the value of a URL from which the broadcast independent app is obtained, and where execute command ("exec") is specified for an event of the broadcast related app at this time. In short, it is determined whether continuation of the operation using broadcast resources by the broadcast independent app is permitted or not on the basis of the result of determining whether use of broadcast resources by the broadcast independent app is permitted or not.

When it is determined that continuation of the operation using broadcast resources by the broadcast independent app is permitted in Step S242, the processing proceeds to Step S243. In this case, since use of broadcast resources by the broadcast independent app is permitted and the broadcast independent app continues the operation, the "app+broadcast screen" (FIG. 7) is displayed in Step S243.

Note that the above-mentioned broadcast independent app, which is permitted to continue the operations using broadcast resources on the basis of the TPT for broadcast related app, is, in other words, the broadcast related app, which is permitted to continue the operations by a broadcaster. So, after that, the broadcast independent app will operate as the broadcast related app.

Further, when continuation of the operation using broadcast resources by the broadcast independent app is not permitted in Step S242, the processing proceeds to Step S244. In Step S244, it is determined whether the Case A or the Case B is to be executed on the basis of context attribute of Application element described in the TPT for broadcast independent app (FIG. 12).

When it is determined to execute the Case A in Step S244, the processing proceeds to Step S245. In this case, although continuation of the operation using broadcast resources is not permitted, the broadcast independent app continues the operation without using broadcast resources. So, in Step S245, the "app-only display screen" (FIG. 7) is displayed.

Further, when it is determined to execute the Case B in Step S244, the processing proceeds to Step S246. In this case, since continuation of the operation using broadcast resources is not permitted, the broadcast independent app terminates the operation. So, in Step S246, the "broadcast full screen" (FIG. 7) is displayed.

Figure 27:
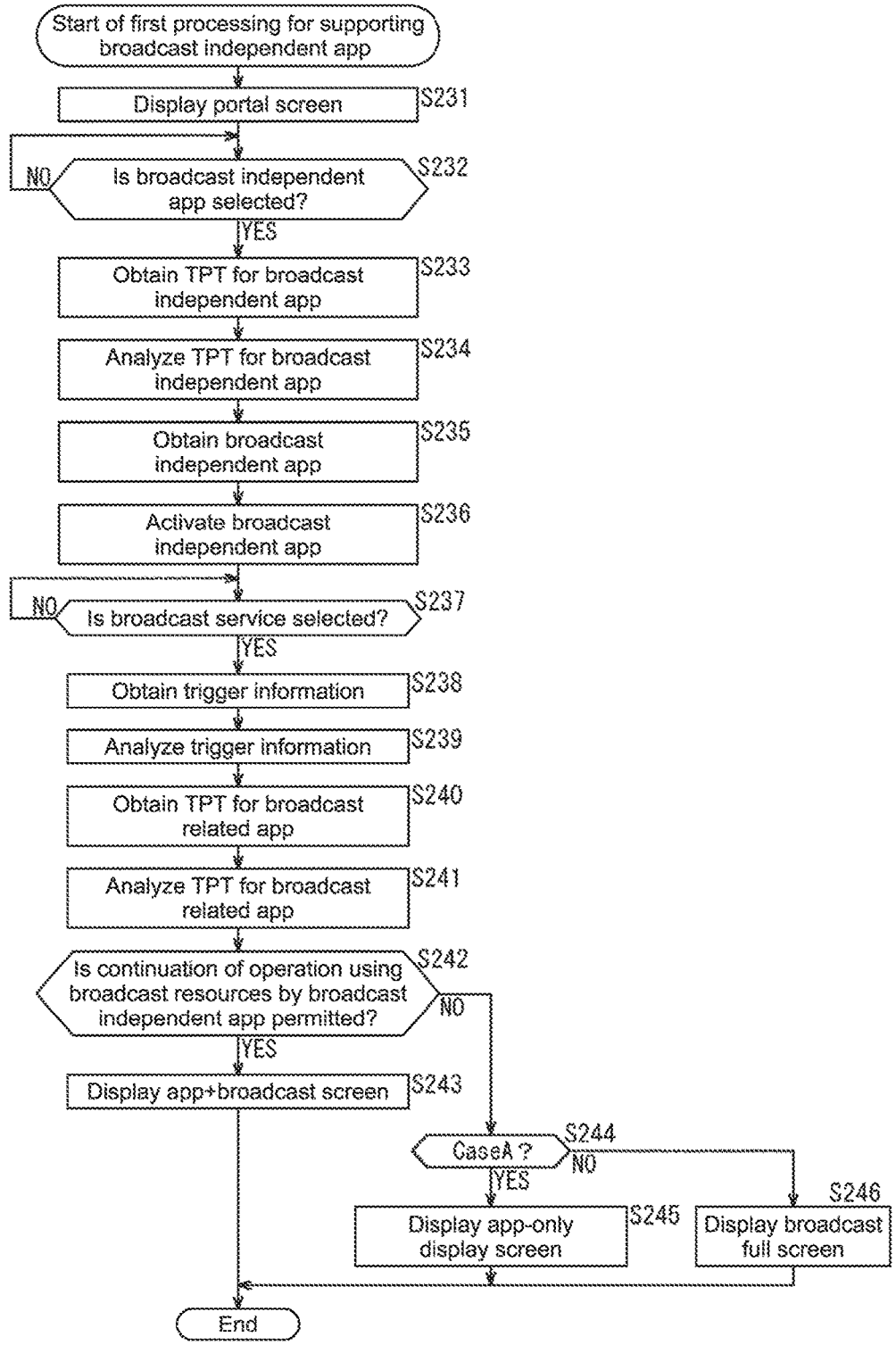
FIG. 27 A flowchart illustrating the first processing for supporting the broadcast independent app.

When the screen depending on the above-mentioned determination result is displayed in the processing of Step S243, S245, or S246, the first processing for supporting the broadcast independent app of FIG. 27 is terminated.

Hereinabove, the first processing for supporting the broadcast independent app has been described. In the first processing for supporting the broadcast independent app, when broadcast resources are to be used by the broadcast independent app, the content described in the TPT for broadcast independent app is checked against the content described in the TPT for broadcast related app. Then, depending on the check result, the "app+broadcast screen" (FIG. 7) is displayed when use of broadcast resources is permitted, and the "app-only display screen" (FIG. 7) or the "broadcast full screen" (FIG. 7) is displayed when use of broadcast resources is not permitted.

(Second Processing for Supporting Broadcast Independent App)

Next, with reference to the flowchart of FIG. 28, the flow of the second processing for supporting the broadcast independent app executed by the reception apparatus 20 of FIG. 20 will be described. Note that the second processing for supporting the broadcast independent app corresponds to the above-mentioned second embodiment.

When the "portal screen" (FIG. 7) is displayed in the processing of Step S261, in Step S262, the controller 219 determines whether a user selects the broadcast independent app on the "portal screen" or not on the basis of an operation signal from the input unit 221.

In Step S262, when it is determined that the broadcast independent app is not selected, the determining process of Step S262 is repeated. When the broadcast independent app is selected by a user in Step S262, the processing proceeds to Step S263.

In Step S263, the TPT obtaining unit 251 controls the communication unit 222, thereby accesses the TPT server 50-1 via the network 90, and obtains the TPT for broadcast independent app. The TPT for broadcast independent app is recorded in the memory 220.

In Step S264, the TPT analyzer 252 analyzes the TPT for broadcast independent app obtained in the processing of Step S263, and supplies the analysis result to the application controller 253.

In Step S265, the TPT analyzer 252 verifies the electronic signature described in the TPT for broadcast independent app by using the broadcasting station public key certificate that the memory 220 holds in advance. Note that the electronic signature is specified for Signature element of the TPT for broadcast independent app (FIG. 17). Further, when the memory 220 does not hold a broadcasting station public key certificate, for example, the TPT analyzer 252 waits for the file of the required broadcasting station public key certificate until the transmission apparatus 10 transmits the file in a FLUTE session, and the verification process of Step S265 is executed after the required broadcasting station public key certificate is obtained.

In Step S266, it is determined whether the electronic signature is verified or not in the verification process of Step S265. When it is determined that the electronic signature is not verified in Step S266, the broadcast independent app is not activated and the second processing for supporting the broadcast independent app of FIG. 28 is terminated. Further, when it is determined that the electronic signature is verified in Step S266, the processing proceeds to Step S267.

In Step S267, the application controller 253 controls the application engine 223 on the basis of the result of analyzing the TPT obtained in the processing of Step S264, thereby accesses the application server 40 via the network 90, and obtains the broadcast independent app. Note that, when accessing the application server 40, URL specified for URL element of Application element described in the TPT for broadcast independent app (FIG. 17) is used.

In Step S268, the application controller 253 controls the application engine 223, and thereby activates the broadcast independent app obtained in the processing of Step S267. As a result, the reception apparatus 20 executes the broadcast independent app, and the "app screen" (FIG. 7) is displayed.

In Step S269, the application controller 253 determines whether a request to access broadcast resources by the broadcast independent app being executed has generated or not. When it is determined that a request to access broadcast resources has not generated in Step S269, the determining process of Step S269 is repeated. When a request to access broadcast resources by the broadcast independent app being executed is generated in Step S269, the processing proceeds to Step S270.

In Step S270, the TPT analyzer 252 determines whether the broadcast independent app has authority to access broadcast resources or not on the basis of the TPT for broadcast independent app recorded in the memory 220. Specifically, access authority is described for each broadcasting station (broadcast service) in the TPT for broadcast independent app (FIG. 17). On the basis of the broadcast permission information, it is determined whether the broadcast independent app has authority to access broadcast resources (for example, a broadcast service, of which selection is instructed) or not.

When it is determined that the broadcast independent app has authority to access broadcast resources in Step S270, the processing proceeds to Step S271. In this case, since use of broadcast resources by the broadcast independent app is permitted and the broadcast independent app continues the operation, the "app+broadcast screen" (FIG. 7) is displayed in Step S271.

Further, when it is determined that the broadcast independent app does not have authority to access broadcast resources in Step S270, the processing proceeds to Step S272. In Step S272, it is determined whether the Case A or the Case B is to be executed on the basis of context attribute of Application element described in the TPT for broadcast independent app (FIG. 17).

When it is determined to execute the Case A in Step S272, the processing proceeds to Step S273. In this case, although the broadcast independent app does not have authority to access broadcast resources, the broadcast independent app continues the operation without using broadcast resources. So, in Step S273, the "app-only display screen" (FIG. 7) is displayed.

Further, when it is determined to execute the Case B in Step S272, the processing proceeds to Step S274. In this case, since the broadcast independent app does not have authority to access broadcast resources, the broadcast independent app terminates the operation. So, in Step S274, the "broadcast full screen" (FIG. 7) is displayed.

Figure 28:
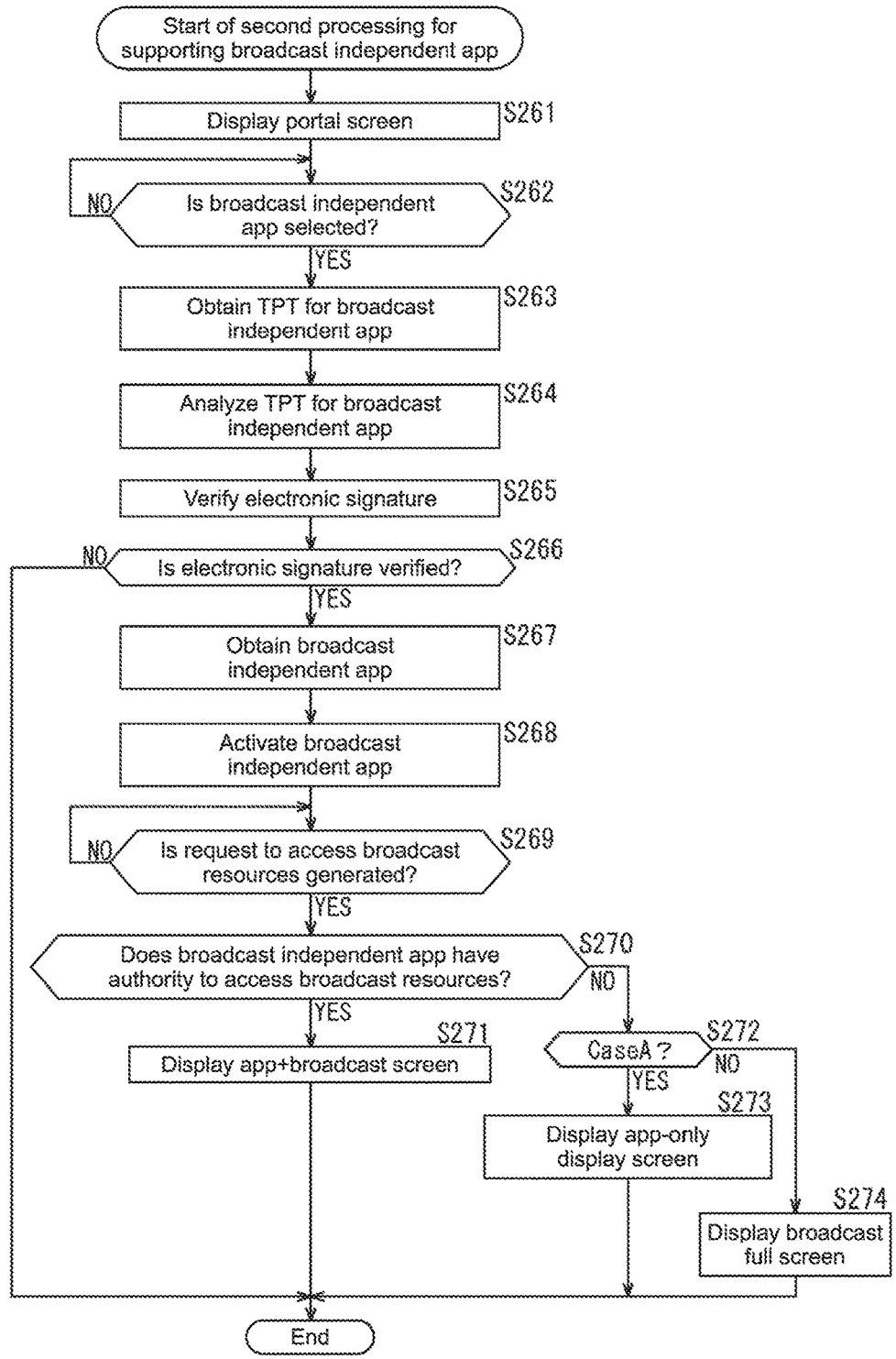
FIG. 28 A flowchart illustrating the second processing for supporting the broadcast independent app.

When the screen depending on the above-mentioned determination result is displayed in the processing of Step S271, S273, or S274, the second processing for supporting the broadcast independent app of FIG. 28 is terminated.

Hereinabove, the second processing for supporting the broadcast independent app has been described. In the second processing for supporting the broadcast independent app, when broadcast resources are to be used by the broadcast independent app, it is determined whether the broadcast independent app has authority to access a broadcast service or not by using broadcast permission information described in the TPT for broadcast independent app. Further, the "app+broadcast screen" (FIG. 7) is displayed when the broadcast independent app has authority to access broadcast resources, and the "app-only display screen" (FIG. 7) or the "broadcast full screen" (FIG. 7) is displayed when the broadcast independent app does not have authority to access broadcast resources.

(Broadcast Independent App Providing Processing)

Figure 29:
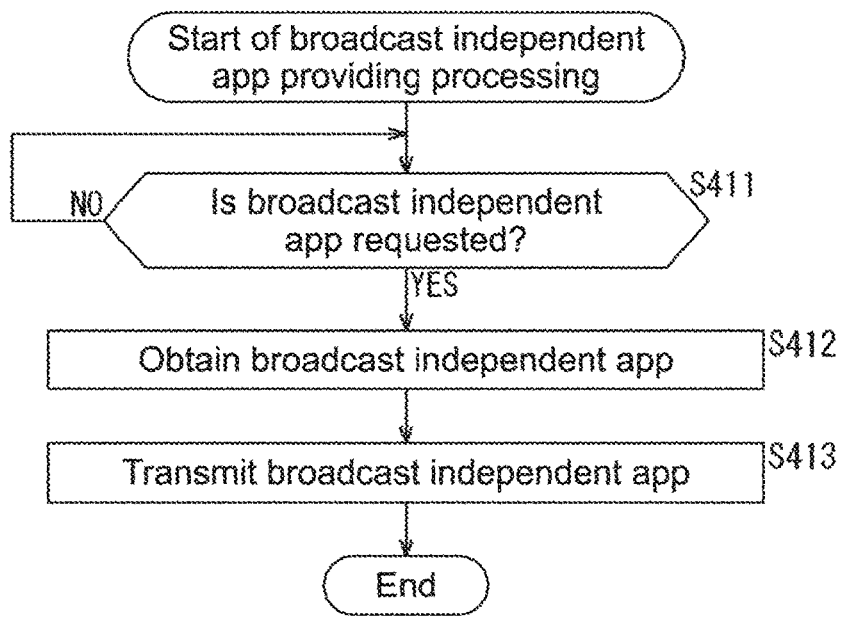
FIG. 29 A flowchart illustrating the broadcast independent app providing processing.

Next, with reference to the flowchart of FIG. 29, the flow of the broadcast independent app providing processing executed by the application server 40 of FIG. 20 will be described. Note that, in advance of the broadcast independent app providing processing of FIG. 29, the application holder 413 holds the broadcast independent app generated by the controller 411.

In Step S411, the controller 411 always monitors the communication status of the communication unit 412, and determines whether the reception apparatus 20 has requested the broadcast independent app or not. When it is determined that the broadcast independent app is not requested in Step S411, the processing of Step S411 is repeated. In other words, when the reception apparatus 20 requests the broadcast independent app in Step S411, the processing proceeds to Step S412.

In Step S412, the controller 411 obtains the broadcast independent app from the application holder 413, and supplies the obtained broadcast independent app to the communication unit 412. Further, in Step S413, the communication unit 412 is controlled by the controller 411, and thereby transmits the broadcast independent app to the reception apparatus 20, which has output the request, via the network 90. When the processing of Step S413 is terminated, the broadcast independent app providing processing of FIG. 29 is terminated.

Hereinabove, the broadcast independent app providing processing has been described.

(TPT Providing Processing)

Figure 30:
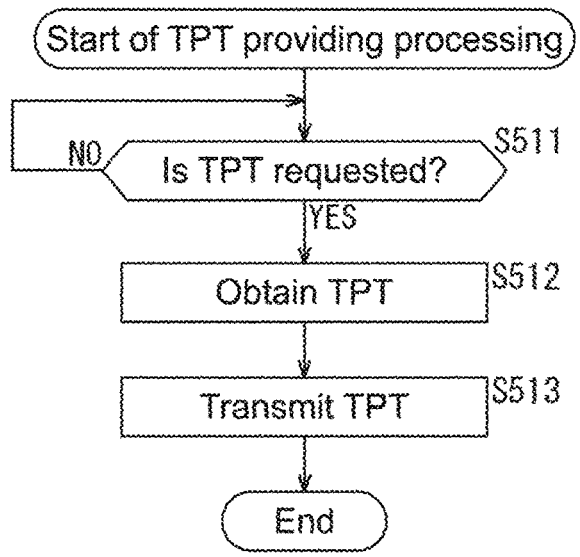
FIG. 30 A flowchart illustrating the TPT providing processing.

Finally, with reference to the flowchart of FIG. 30, the flow of the TPT providing processing executed by the TPT server 50 of FIG. 20 will be described. Note that, in advance of the TPT providing processing of FIG. 30, the TPT holder 513 holds the TPT for broadcast independent app or the TPT for broadcast related app generated by the controller 511.

In Step S511, the controller 511 always monitors the communication status of the communication unit 512, and determines whether the reception apparatus 20 requests the TPT or not. When it is determined that the TPT is not requested in Step S511, the processing of Step S511 is repeated. In other words, when the reception apparatus 20 requests the TPT in Step S511, the processing proceeds to Step S512.

In Step S512, the controller 511 obtains the TPT from the TPT holder 513, and supplies the TPT to the communication unit 512. Further, in Step S513, the communication unit 512 is controlled by the controller 511, and thereby transmits the TPT to the reception apparatus 20, which has output the request, via the network 90. When the processing of Step S513 is terminated, the TPT providing processing of FIG. 30 is terminated.

Hereinabove, the TPT providing processing has been described. Note that, in the TPT providing processing, the TPT providing processing by the TPT server 50-1 and by the TPT server 50-2 is described as a whole. Actually, when the TPT server 50-1 executes the TPT providing processing of FIG. 30, the TPT server 50-1 provides the TPT for broadcast independent app to the reception apparatus 20, which has output the request. Further, when the TPT server 50-2 executes the TPT providing processing of FIG. 30, the TPT server 50-2 provides the TPT for broadcast related app to the reception apparatus 20, which has output the request.

<5. Modification Example>

(Another Configuration Example of Broadcast Communication System)

Figure 31:
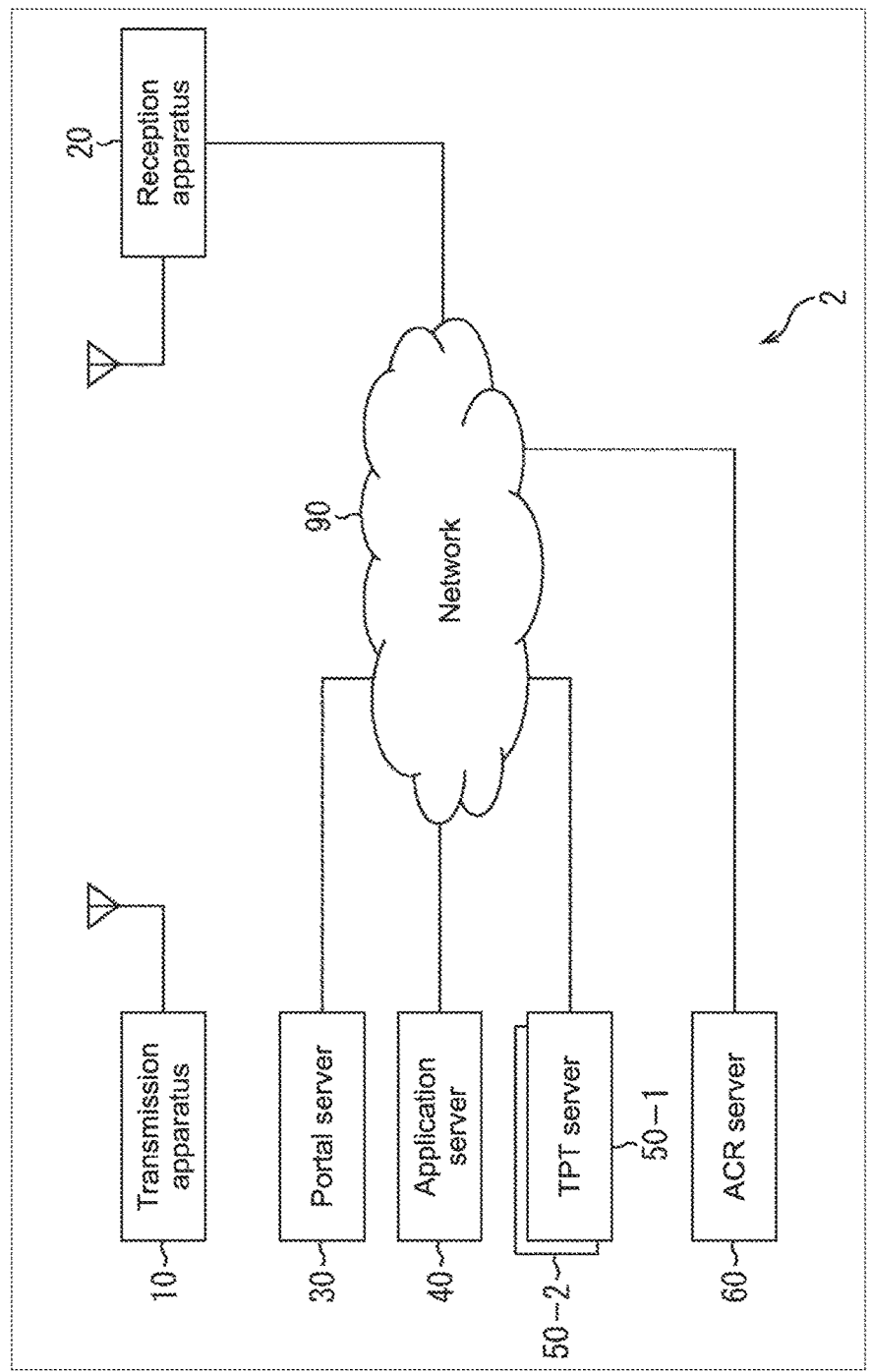
FIG. 31 A diagram showing another configuration example of the broadcast communication system.

FIG. 31 is a diagram showing another configuration example of the broadcast communication system.

The broadcast communication system 2 includes the transmission apparatus 10, the reception apparatus 20, the portal server 30, the application server 40, the TPT server 50, and the ACR server 60.

In short, the broadcast communication system 2 of FIG. 31 is similar to the broadcast communication system 1 of FIG. 20 except for the newly-provided ACR server 60. Since the configuration of the broadcast communication system 2 is similar to the configuration of the broadcast communication system 1 of FIG. 20 except for the ACR server 60, the description thereof will be omitted arbitrarily.

The ACR server 60 is connected to the reception apparatus 20 via the network 90. The reception apparatus 20 accesses the ACR server 60 via the network 90, and makes an inquiry to the ACR server 60 about trigger information. At this time, the amount of characteristic (hereinafter also referred to as fingerprint information (FingerPrint)) extracted from at least one of video data and audio data of AV content such as a broadcast program is transmitted to the ACR server 60.

The ACR server 60 is provided by a broadcaster such as a AV content provider, for example. The ACR server 60 has a database in which the amount of characteristic extracted from video data and audio data of arbitrary AV content is registered, and identifies AV content by using an ACR (Automatic Content Recognition) technology in response to an inquiry from the reception apparatus 20 via the network 90.

Specifically, the ACR server 60 checks fingerprint information from the reception apparatus 20 against the database to thereby identify the AV content, and generates trigger information depending on the identification result. The ACR server 60 transmits the generated trigger information to the reception apparatus 20 via the network 90.

The reception apparatus 20 accesses the TPT server 50-2 via the network 90 on the basis of the trigger information received from the ACR server 60, and obtains the TPT for broadcast related app. Further, as described above in the first embodiment, the reception apparatus 20 performs the operation-continuance permissibility determining process. In the operation-continuance permissibility determining process, the reception apparatus 20 determines whether continuation of the operation using broadcast resources by the broadcast independent app is permitted or not on the basis of the TPT for broadcast independent app and the TPT for broadcast related app. The reception apparatus 20 displays a screen depending on the determination result (for example, the "app+broadcast screen", the "app-only display screen", or the "broadcast full screen" of FIG. 7).

The broadcast communication system 2 is configured as described above.

(Operations of Receiver Apparatus that Uses Fingerprint Information)

Figure 32:
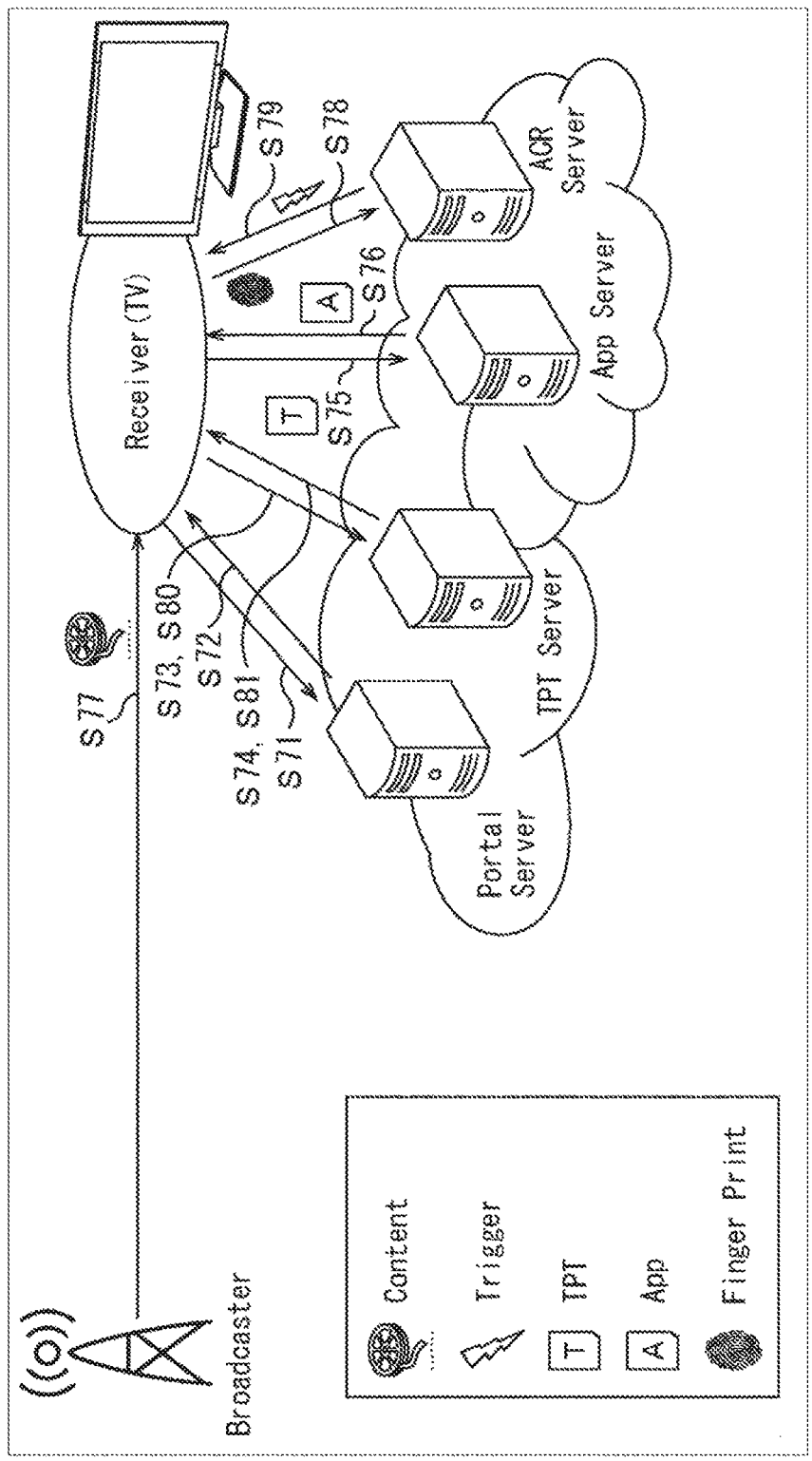
FIG. 32 A diagram showing the operations of the receiver apparatus when fingerprint information is used.

FIG. 32 is a diagram showing the operations of the receiver apparatus when fingerprint information is used.

In FIG. 32, when the reception apparatus 20 (FIG. 31) is instructed to display a portal site, the receiver apparatus accesses the portal server 30 (FIG. 31) via the network 90, and requests a web page of the portal site (S71). In response to the request from the reception apparatus 20, the portal server 30 transmits the web page of the portal site to the reception apparatus 20 via the network 90 (S72). The reception apparatus 20 displays the web page of the portal site received from the portal server 30.

When the broadcast independent app is selected on the portal site, the reception apparatus 20 (FIG. 31) accesses the TPT server 50-1 (FIG. 31) via the network 90, and requests the TPT for broadcast independent app (S73). In response to the request from the reception apparatus 20, the TPT server 50-1 transmits the TPT for broadcast independent app ("TPT" of FIG. 32) to the reception apparatus 20 via the network 90 (S74). The reception apparatus 20 receives and holds the TPT for broadcast independent app transmitted from the TPT server 50-1.

Further, the reception apparatus 20 (FIG. 31) accesses the application server 40 (FIG. 31) via the network 90 on the basis of the TPT for broadcast independent app, and requests the broadcast independent app (S75). In response to the request from the reception apparatus 20, the application server 40 transmits the broadcast independent app ("App" of FIG. 32) to the reception apparatus 20 via the network 90 (S76). The reception apparatus 20 receives and activates the broadcast independent app transmitted from the application server 40.

Here, when a broadcast service (for example, AV content such as broadcast program) is selected by the broadcast independent app being executed, the reception apparatus 20 (FIG. 31) transmits the amount of characteristic extracted from video data and audio data of AV content ("Content" of FIG. 32) by the transmission apparatus 10 (FIG. 31) of the broadcasting station to the ACR server 60 (FIG. 31) as fingerprint information, and requests trigger information (S78).

The ACR server 60 performs ACR identification processing. In the ACR identification processing, the ACR server 60 checks the fingerprint information from the reception apparatus 20 against the database, and the reception apparatus 20 thereby identifies a broadcast service (for example, AV content such as broadcast program) selected by the broadcast independent app.

Figure 33:
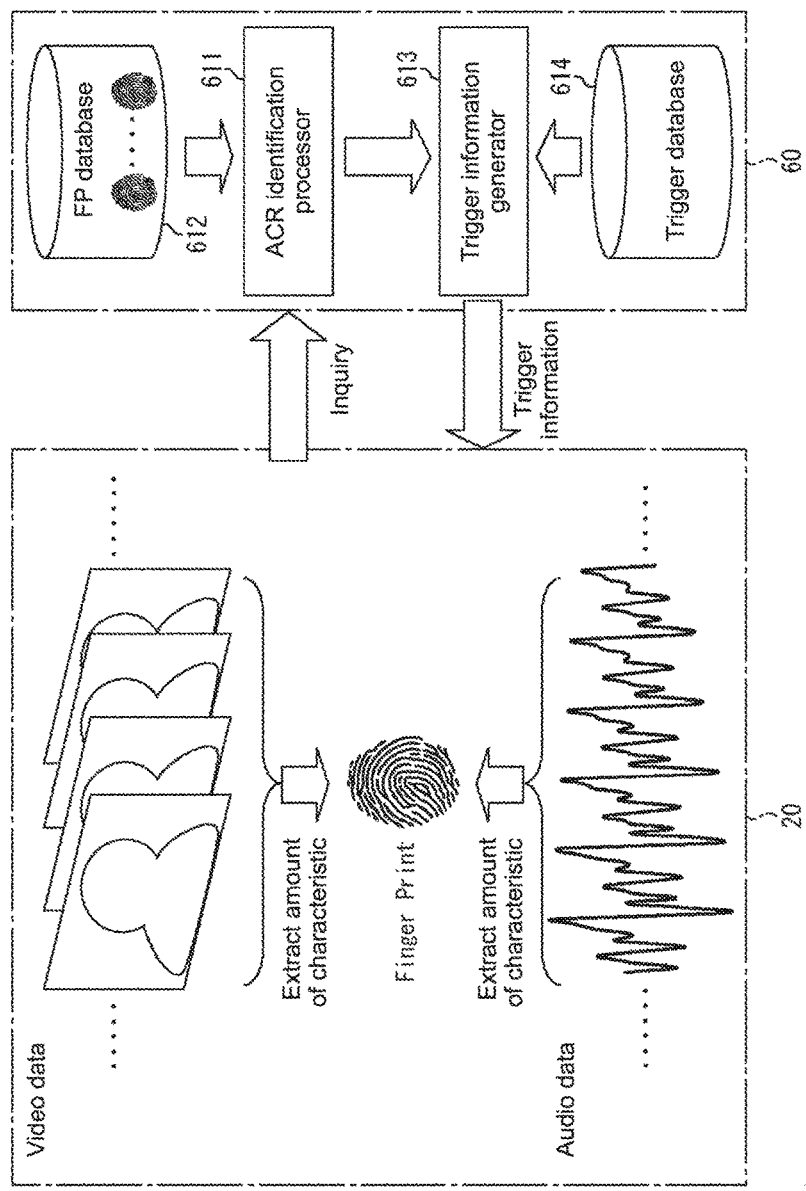
FIG. 33 A diagram schematically illustrating the ACR technology.

Specifically, as shown in FIG. 33, when the ACR server 60 receives a fingerprint information inquiry from the reception apparatus 20, the ACR identification processor 611 checks the fingerprint information against the FP database 612 prepared in advance, and identifies AV content selected by the broadcast independent app. The identification result is supplied to the trigger information generator 613. The trigger information generator 613 generates trigger information on the basis of the identification result from the ACR identification processor 611 and various kinds of information registered in the trigger database 614.

Note that the fingerprint information (amount of characteristic) is unique information of the entire AV content or a configuration element of the AV content, for example. Unique information of many AV contents is registered in the FP database 612 in advance. For example, the degree of similarity or the degree of consistency of each unique information is determined in the ACR identification processing. Note that any known technology disclosed in various documents may be used as a method of determining the degree of similarity or the degree of consistency. According to the ACR technology, it is possible to identify the AV content on the basis of the amount of characteristic of video data and audio data independent of information such as the resolution, the aspect ratio, the bit rate, or the format of the AV content.

With reference to FIG. 32 again, the ACR server 60 transmits the generated trigger information ("Trigger" of FIG. 32) to the reception apparatus 20, which has sent the inquiry (S79). The reception apparatus 20 accesses the TPT server 50-2 (FIG. 31) via the network 90 on the basis of the trigger information from the ACR server 60, and requests the TPT for broadcast related app (S80). In response to the request from the reception apparatus 20, the TPT server 50-2 transmits the TPT for broadcast related app ("TPT" of FIG. 32) to the reception apparatus 20 via the network 90 (S81). The reception apparatus 20 receives and obtains the TPT for broadcast related app transmitted from the TPT server 50-2.

Then the reception apparatus 20 performs the operation-continuance permissibility determining process. In the operation-continuance permissibility determining process, the reception apparatus 20 determines whether continuation of the operation using broadcast resources by the broadcast independent app is permitted or not on the basis of the TPT for broadcast independent app and the TPT for broadcast related app.

When use of broadcast resources by the broadcast independent app is permitted in the operation-continuance permissibility determining process, the reception apparatus 20 makes a transition to the "broadcast reception (AV reproduction+broadcast related app execution)" status of FIG. 9, and the broadcast independent app continues the operations as the broadcast related app. In this case, the reception apparatus 20 displays the "app+broadcast screen" (FIG. 7).

To the contrary, when use of broadcast resources by the broadcast independent app is not permitted, the reception apparatus 20 makes a transition to the "broadcast independent app execution" status of FIG. 9 or the "broadcast reception (AV-only reproduction)" status of FIG. 9, and displays the "app-only display screen" (FIG. 7) of the Case A or the "broadcast full screen" (FIG. 7) of the Case B.

Note that, in the above description, AV content is broadcast content such as a broadcast program. Alternatively, a streaming server (not shown) may streaming-distribute communication content via the network 90 instead of the broadcast content.

<6. Configuration of Computer>

Figure 34:
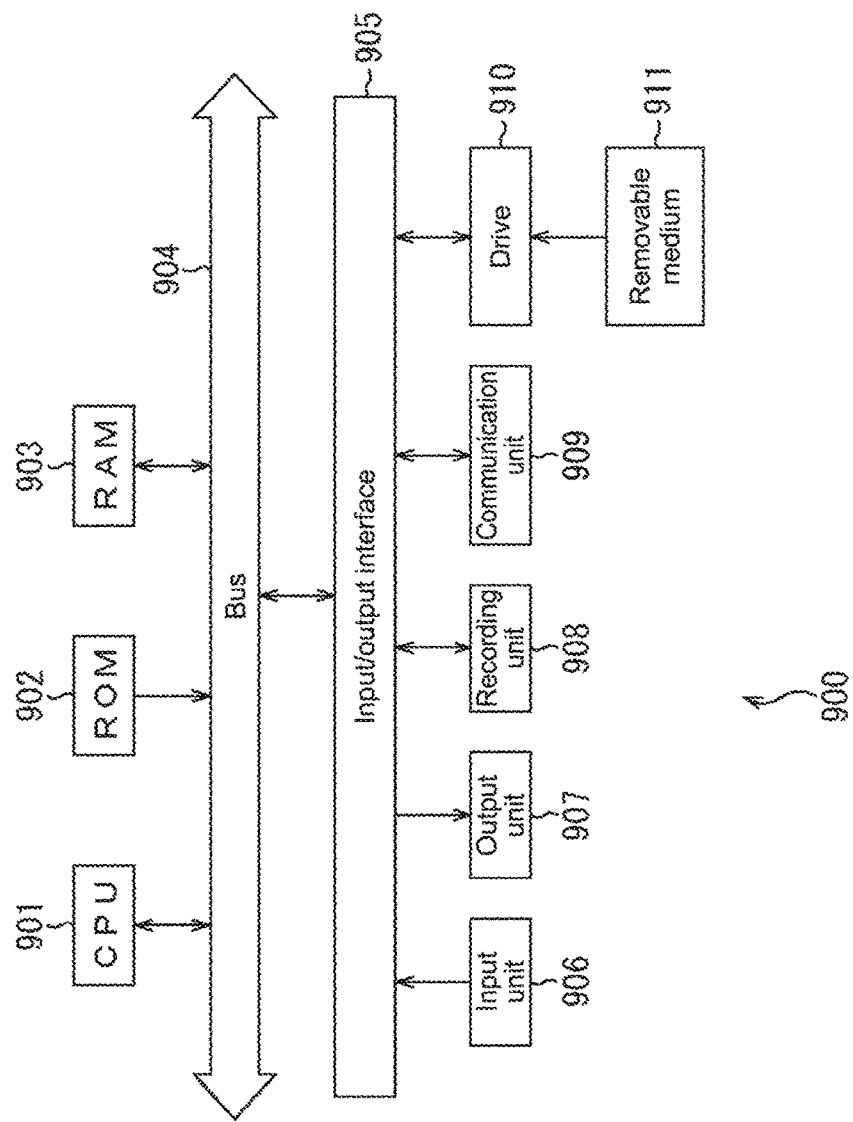
FIG. 34 A diagram showing a configuration example of a computer.

The above-mentioned series of processing may be executed by hardware or may be executed by software. If the series of processing is executed by software, programs configuring that software are installed into a computer. FIG. 34 is a diagram showing a configuration example of hardware of a computer that executes the above-mentioned series of processing according to the programs.

In a computer 900, a CPU (Central Processing Unit) 901, a ROM (Read Only Memory) 902, and a RAM (Random Access Memory) 903 are connected to one another via a bus 904. An input/output interface 905 is further connected to the bus 904. An input unit 906, an output unit 907, a recording unit 908, a communication unit 909, and a drive 910 are connected to the input/output interface 905.

The input unit 906 is constituted of a keyboard, a mouse, a microphone, and the like. The output unit 907 is constituted of a display, a speaker, and the like. The recording unit 908 is constituted of a hard disk, a nonvolatile memory, and the like. The communication unit 909 is constituted of a network interface and the like. The drive 910 drives a removable medium 911 such as a magnetic disk, an optical disc, a magneto-optical disk, and a semiconductor memory.

In the thus configured computer 900, the above-mentioned series of processing is performed by the CPU 901 loading programs stored in the ROM 902 and the recording unit 908 into the RAM 903 via the input/output interface 905 and the bus 904 and executing them.

The programs executed by the computer 900 (CPU 901) can be recorded and provided on the removable medium 911 as a package medium, for example. Further, the programs can be provided via a wired or wireless transmission medium such as a local-area network, the Internet, and digital satellite broadcasting.

In the computer 900, the programs can be installed into the recording unit 908 via the input/output interface 905 by the removable medium 911 being mounted on the drive 910. Further, the programs can be received by the communication unit 909 via the wired or wireless transmission medium and installed into the recording unit 908. Otherwise, the programs can be installed into the ROM 902 or the recording unit 908 in advance.

In the present specification, the processing executed by the computer according to the programs does not necessarily need to be performed in a time sequence in the order described as the flowchart. That is, the processing executed by the computer according to the programs includes processes executed in parallel or individually (e.g., parallel processing or processing by objects). Further, the programs may be processed by a single computer (processor) or may be processed by a plurality of computers in a distributed manner.

Note that embodiments of the present technology are not limited to the above-mentioned embodiments and various modifications can be made without departing from the gist of the present technology.

It should be noted that the present technology may take the following configurations.

(1)

A reception apparatus, including:

a reception unit that receives a digital broadcasting signal;

an application obtaining unit that obtains a first application, the first application being capable of requesting use of a broadcast resource transmitted via the digital broadcasting signal;

a control information obtaining unit that obtains first control information for controlling an operation of the first application; and an application controller that controls, when the first application requests use of the broadcast resource, the use of the broadcast resource by the first application on the basis of the first control information.

(2)

The reception apparatus according to (1), in which the control information obtaining unit further obtains second control information for controlling an operation of a second application, the second application being activated in a broadcast service, and the application controller limits the use of the broadcast resource by the first application when continuation of the operation using the broadcast resource by the first application is not permitted on the basis of a result of checking the first control information against the second control information.

(3)

The reception apparatus according to (2), in which the application controller continues the operation of the first application and does not display the broadcast resource when the continuation of the operation using the broadcast resource by the first application is not permitted.

(4)

The reception apparatus according to (2), in which the application controller terminates the operation of the first application and displays the broadcast resource in a normal status when the continuation of the operation using the broadcast resource by the first application is not permitted.

(5)

The reception apparatus according to any one of (2) to (4), in which the application controller continues the operation of the first application when the continuation of the operation using the broadcast resource by the first application is permitted, the first application being operated as the second application.

(6)

The reception apparatus according to any one of (2) to (5), further including:

a trigger information obtaining unit that obtains trigger information for controlling the operation of the second application, in which the control information obtaining unit obtains the second control information on the basis of the trigger information.

(7)

The reception apparatus according to (2), in which the application controller limits the use of the broadcast resource by the first application when the first application has no authority to access the broadcast resource on the basis of broadcast permission information indicating authority to access each broadcast service, the first control information including the broadcast permission information.

(8)

The reception apparatus according to (7), in which the application controller continues the operation of the first application and does not display the broadcast resource when the first application has no authority to access the broadcast resource.

(9)

The reception apparatus according to (7), in which the application controller terminates the operation of the first application and displays the broadcast resource in a normal status when the first application has no authority to access the broadcast resource.

(10)

The reception apparatus according to any one of (7) to (9), in which the application obtaining unit obtains the first application when signature information is verified by using a predetermined certificate, the first control information including the signature information.

(11)

The reception apparatus according to any one of (7) to (10), in which the broadcast permission information is specified for each broadcast service in a bitmap format.

(12)

A reception method for a reception apparatus, including the steps of:

by the reception apparatus, receiving a digital broadcasting signal;

obtaining a first application, the first application being capable of requesting use of a broadcast resource transmitted via the digital broadcasting signal;

obtaining first control information for controlling an operation of the first application; and controlling the use of the broadcast resource by the first application on the basis of the first control information when the first application requests use of the broadcast resource.

(13)

A transmission apparatus, including:

a control information generator that generates first control information for controlling an operation of a first application, the first application being capable of requesting use of a broadcast resource transmitted via a digital broadcasting signal, the first control information being used when the broadcast resource is used by the first application; and a transmission unit that transmits the first control information via a network in response to a request from a receiver apparatus.

(14)

The transmission apparatus according to (13), in which the first control information is used for checking against second control information for controlling an operation of a second application when the broadcast resource is used by the first application, the second application being activated in a broadcast service.

(15)

The transmission apparatus according to (14), in which the first control information includes information indicating, when continuation of the operation using the broadcast resource by the first application is not permitted, to continue the operation of the first application and not to display the broadcast resource or to terminate the operation of the first application and display the broadcast resource in a normal status.

(16)

The transmission apparatus according to (13), in which the first control information includes broadcast permission information indicating authority to access each broadcast service.

(17)

The transmission apparatus according to (16), in which the first control information includes information indicating, when the first application has no authority to access the broadcast resource, to continue the operation of the first application and not to display the broadcast resource or to terminate the operation of the first application and display the broadcast resource in a normal status.

(18)

The transmission apparatus according to (16) or (17), in which the first control information includes signature information, the signature information being used for verification using a predetermined certificate when obtaining the first application.

(19)

The transmission apparatus according to any one of (16) to (18), in which the broadcast permission information is specified for each broadcast service in a bitmap format.

(20)

A transmission method for a transmission apparatus, including the steps of:

by the transmission apparatus, generating first control information for controlling an operation of a first application, the first application being capable of requesting use of a broadcast resource transmitted via a digital broadcasting signal, the first control information being used when the broadcast resource is used by the first application; and transmitting the first control information via a network in response to a request from a receiver apparatus.

DESCRIPTION OF REFERENCE NUMERALS 1, 2 broadcast communication system, 10 transmission apparatus, 20 reception apparatus, 30 portal server, 40 application server, 50, 50-1, 50-2 the TPT server, 60 ACR server, 90 network, 111 audio data obtaining unit, 113 video data obtaining unit, 115 trigger information generator, 117 transmission unit, 212 tuner, 218 trigger information obtaining unit, 219 controller, 222 communication unit, 223 application engine, 251 TPT obtaining unit, 252 TPT analyzer, 253 application controller, 254 trigger information analyzer, 311 controller, 312 communication unit, 411 controller, 412 communication unit, 511 controller, 512 communication unit, 613 trigger information generator, 900 computer, 901 CPU

The invention claimed is:

1. A reception apparatus, comprising:

circuitry configured to:

obtain a first application, the first application when executed being capable of requesting use of a broadcast resource transmitted via a digital broadcasting signal;

obtain first control information for controlling an operation of the first application, the first control information including a first identifier corresponding to using the broadcast resource;

obtain second control information for controlling an operation of a second application that has been associated with the broadcast resource, the second control information including a second identifier corresponding to using the broadcast resource; and control the operation of the first application with respect to the use of the broadcast resource, the control including a comparison of the first identifier and the second identifier, a determination that the use of the broadcast resource by the first application is permitted in response to a case that the first identifier matches the second identifier, when the use of the broadcast resource by the first application is determined to be permitted, synthesis of first image data corresponding to the first application and second image data corresponding to the broadcast resource to obtain third image data, and output of the third image data for display, and when the use of the broadcast resource by the first application is determined to be not permitted, output of message information along with the first image data corresponding to the first application for display, the message information indicating unavailability of the broadcast resource.

2. The reception apparatus according to claim 1, wherein the circuitry is configured to:

limit the use of the broadcast resource by the first application after the second application is activated in a broadcast service when using the broadcast resource by the first application is determined as not permitted in response to a case that the first identifier does not match the second identifier.

3. The reception apparatus according to claim 2, wherein the circuitry is configured to:

continue the operation of the first application and not display the broadcast resource when using the broadcast resource by the first application is determined as not permitted.

4. The reception apparatus according to claim 2, wherein the circuitry is configured to:

terminate the operation of the first application and display the broadcast resource when using the broadcast resource by the first application is determined as not permitted.

5. The reception apparatus according to claim 2, wherein the circuitry is configured to:

continue the operation of the first application when the using the broadcast resource by the first application is determined as permitted.

6. The reception apparatus according to claim 5, wherein the circuitry is configured to:

obtain trigger information for controlling the operation of the second application, and obtain the second control information based on the trigger information.

7. The reception apparatus according to claim 2, wherein the circuitry is configured to:

limit the use of the broadcast resource by the first application when the first application has no authority to access the broadcast resource based on broadcast permission information indicating authority to access one or more broadcast services, the first control information including the broadcast permission information.

8. The reception apparatus according to claim 7, wherein the circuitry is configured to:

continue the operation of the first application and not display the broadcast resource when the first application has no authority to access the broadcast resource.

9. The reception apparatus according to claim 7, wherein the circuitry is configured to:

terminate the operation of the first application and display the broadcast resource when the first application has no authority to access the broadcast resource.

10. The reception apparatus according to claim 7, wherein the circuitry is configured to:
obtain the first application when signature information is verified by using a predetermined certificate, the first control information including the signature information.

11. The reception apparatus according to claim 7, wherein the broadcast permission information is specified for each broadcast service in a bitmap format.

12. A reception method for a reception apparatus, comprising:
obtaining, by circuitry of the reception apparatus, a first application, the first application when executed being capable of requesting use of a broadcast resource transmitted via a digital broadcasting signal;
obtaining, by the circuitry of the reception apparatus, first control information for controlling an operation of the first application, the first control information including a first identifier corresponding to using the broadcast resource;
obtaining, by the circuitry of the reception apparatus, second control information for controlling an operation of a second application that has been associated with the broadcast resource, the second control information including a second identifier corresponding to using the broadcast resource; and
controlling, by the circuitry of the reception apparatus, the operation of the first application with respect to the use of the broadcast resource, including
comparing the first identifier and the second identifier,
determining that the use of the broadcast resource by the first application is permitted in response to a case that the first identifier matches the second identifier,
when the use of the broadcast resource by the first application is determined to be permitted,
synthesizing first image data corresponding to the first application and second image data corresponding to the broadcast resource to obtain third image data, and
outputting the third image data for display, and
when the use of the broadcast resource by the first application is determined to be not permitted, outputting message information along with the first image data corresponding to the first application for display, the message information indicating unavailability of the broadcast resource.

13. The reception method according to claim 12, further comprising:
when using the broadcast resource by the first application is determined to be not permitted, continuing the operation of the first application without using the broadcast resource, or terminating the operation of the first application, consistent with indication of an indicator included in the first control information.

14. A transmission apparatus, comprising:
circuitry configured to:
generate first control information for controlling an operation of a first application based on second control information for controlling an operation of a second application,
the first application when executed being capable of requesting use of a broadcast resource transmitted via a digital broadcasting signal,
the second application having been associated with the broadcast resource,
the first control information including a first identifier corresponding to using the broadcast resource, and
the second control information including a second identifier corresponding to using the broadcast resource; and
transmit the first control information and the second control information via a network in response to a request from a receiver apparatus,
wherein the first identifier is set to match the second identifier when the use of the broadcast resource by the first application is permitted, and
wherein the control of the operation of the first application includes
when the use of the broadcast resource by the first application is permitted,
synthesis of first image data corresponding to the first application and second image data corresponding to the broadcast resource to obtain third image data, and
output of the third image data for display, and
when the use of the broadcast resource by the first application is not permitted, output of message information along with the first image data corresponding to the first application for display, the message information indicating unavailability of the broadcast resource.

15. The transmission apparatus according to claim 13, wherein
the first control information includes information indicating, when using the broadcast resource by the first application is not permitted, whether to continue the operation of the first application and not to display the broadcast resource, or to terminate the operation of the first application and display the broadcast resource.

16. The transmission apparatus according to claim 13, wherein
the first control information includes broadcast permission information indicating authority to access one or more broadcast services by the first application.

17. The transmission apparatus according to claim 16, wherein
the first control information includes information indicating, when the first application has no authority to access the broadcast resource, whether to continue the operation of the first application and not to display the broadcast resource, or to terminate the operation of the first application and display the broadcast resource.

18. The transmission apparatus according to claim 16, wherein
the first control information includes signature information, the signature information being used for verification using a predetermined certificate when obtaining the first application.

19. The transmission apparatus according to claim 16, wherein
the broadcast permission information is specified for each broadcast service in a bitmap format.

20. A transmission method for a transmission apparatus, comprising:
generating, by circuitry of the transmission apparatus, first control information for controlling an operation of a first application based on second control information for controlling an operation of a second application, the first application when executed being capable of requesting use of a broadcast resource transmitted via a digital broadcasting signal, the second application having been associated with the broadcast resource, the first control information including a first identifier corresponding to using the broadcast resource, and the second control information including a second identifier corresponding to using the broadcast resource; and transmitting the first control information and the second control information via a network in response to a request from a receiver apparatus, wherein the first identifier is set to match the second identifier when the use of the broadcast resource by the first application is permitted, and wherein the control of the operation of the first application includes when the use of the broadcast resource by the first application is permitted, synthesis of first image data corresponding to the first application and second image data corresponding to the broadcast resource to obtain third image data, and output of the third image data for display, and when the use of the broadcast resource by the first application is not permitted, output of message information along with the first image data corresponding to the first application for display, the message information indicating unavailability of the broadcast resource.

* * * * *